US009463669B2

United States Patent
Yokokura et al.

(10) Patent No.: US 9,463,669 B2
(45) Date of Patent: Oct. 11, 2016

(54) TIRE

(75) Inventors: Hiroyuki Yokokura, Kodaira (JP);
Daisuke Ozaki, Matsuyama (JP);
Shintaro Shimada, Ibaraki (JP);
Fuyuki Terasaka, Matsuyama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 262 days.

(21) Appl. No.: 14/008,294

(22) PCT Filed: Mar. 30, 2012

(86) PCT No.: PCT/JP2012/058535
§ 371 (c)(1),
(2), (4) Date: Sep. 27, 2013

(87) PCT Pub. No.: WO2012/133745
PCT Pub. Date: Oct. 4, 2012

(65) Prior Publication Data
US 2014/0020809 A1   Jan. 23, 2014

(30) Foreign Application Priority Data

| Mar. 31, 2011 | (JP) | ................................ | 2011-081083 |
| Mar. 31, 2011 | (JP) | ................................ | 2011-081084 |
| Mar. 31, 2011 | (JP) | ................................ | 2011-081085 |
| Mar. 31, 2011 | (JP) | ................................ | 2011-081086 |
| Mar. 31, 2011 | (JP) | ................................ | 2011-081087 |
| Mar. 31, 2011 | (JP) | ................................ | 2011-081088 |
| Mar. 31, 2011 | (JP) | ................................ | 2011-081089 |
| Mar. 31, 2011 | (JP) | ................................ | 2011-081090 |
| Mar. 31, 2011 | (JP) | ................................ | 2011-081091 |

(51) Int. Cl.
*B60C 9/00*      (2006.01)
*D01F 6/62*      (2006.01)
(Continued)

(52) U.S. Cl.
CPC ............... *B60C 9/0042* (2013.04); *B60C 9/09* (2013.01); *B60C 15/0628* (2013.04); *B60C 17/0009* (2013.04); *D01F 6/62* (2013.01); *Y10T 152/1081* (2015.01)

(58) Field of Classification Search
CPC .............. B60C 9/0042; B60C 9/2003; B60C 2009/0416; B60C 2009/0475; B60C 2009/2074; B60C 2009/0071
See application file for complete search history.

(56) References Cited

U.S. PATENT DOCUMENTS 3,616,184 A * 10/1971 Katagiri ................... C08K 3/22
428/372
4,715,418 A * 12/1987 Miyoshi ................ B60C 9/0042
152/451

(Continued)

FOREIGN PATENT DOCUMENTS

EP      0 450 607 A2   10/1991
EP      0494371 A1     7/1992
(Continued)

OTHER PUBLICATIONS

English machine translation of JP2007-291170, dated Nov. 2007.*
(Continued)

*Primary Examiner* — Justin Fischer
*Assistant Examiner* — Robert Dye
(74) *Attorney, Agent, or Firm* — Sughrue Mion, PLLC

(57) ABSTRACT

Provided is a tire whose durability is improved by using, as a reinforcing member, a polyester cord having an improved heat resistant adhesive property to rubber. Provided is a tire in which a rubber-cord complex composed of a polyester cord and a rubber is used as a reinforcing member. The polyester cord is formed by twisting polyester filaments, and then subjecting the twisted filaments to an adhesive agent treatment. The polyester filament is made of a polyester fiber which is composed of a polyester having ethylene terephthalate as a main repeating unit and having an intrinsic viscosity of 0.85 or higher, wherein the amount of terminal carboxy group in the fiber is 20 equivalent/ton or larger, the long period according to small-angle X-ray diffraction is 9 to 12 nm, and a surface treatment agent having an epoxy group is attached to the surface of the fiber.

44 Claims, 5 Drawing Sheets

(51) Int. Cl.
*B60C 17/00* (2006.01)
*B60C 15/06* (2006.01)
*B60C 9/09* (2006.01)

(56) References Cited

U.S. PATENT DOCUMENTS

| | | | | |
|---|---|---|---|---|
| 4,827,999 | A * | 5/1989 | Yabuki | D01F 6/62 152/451 |
| 4,867,936 | A * | 9/1989 | Buyalos | D01F 6/62 159/6.2 |
| 4,956,446 | A * | 9/1990 | Takahashi | D01F 6/62 264/177.17 |
| 5,472,781 | A * | 12/1995 | Kim | B60C 9/0042 428/359 |
| 5,863,987 | A * | 1/1999 | Nakamura | B60C 1/00 525/92 D |
| 6,774,172 | B1 * | 8/2004 | Nakamura | B60C 1/00 428/361 |
| 2002/0062893 | A1 * | 5/2002 | Jacobus Hofs | B60C 9/0042 152/451 |
| 2005/0104030 | A1 | 5/2005 | Kato et al. | |
| 2007/0006957 | A1 | 1/2007 | Nakajima | |
| 2009/0056849 | A1 * | 3/2009 | Imaoka | B60C 9/0042 152/451 |
| 2011/0056605 | A1 * | 3/2011 | Hottebart | B60C 9/14 152/517 |

FOREIGN PATENT DOCUMENTS

| | | |
|---|---|---|
| EP | 0 546 859 A2 | 6/1993 |
| GB | 1363935 | 8/1974 |
| JP | 61-245330 A | 10/1986 |
| JP | 64-014334 A | 1/1989 |
| JP | 04-222215 A | 8/1992 |
| JP | 06-065812 A | 3/1994 |
| JP | 11-254920 A | 9/1999 |
| JP | 2000-248254 A | 9/2000 |
| JP | 2000-355875 A | 12/2000 |
| JP | 2001-19927 A | 1/2001 |
| JP | 2001-098245 A | 4/2001 |
| JP | 2001-191743 A | 7/2001 |
| JP | 2002-069776 A | 3/2002 |
| JP | 2003-342356 A | 12/2003 |
| JP | 2004-277933 A | 10/2004 |
| JP | 2005-068604 A | 3/2005 |
| JP | 2005-112065 A | 4/2005 |
| JP | 2005-206062 A | 8/2005 |
| JP | 2005-220457 A | 8/2005 |
| JP | 2007-131223 A | 5/2007 |
| JP | 2007291170 | * 11/2007 |
| JP | 2008-31576 A | 2/2008 |
| JP | 2008-38295 A | 2/2008 |
| JP | 2008-273454 A | 11/2008 |
| JP | 2009-52158 A | 3/2009 |
| JP | 2010-137600 A | 6/2010 |
| JP | 2011-58116 A | 3/2011 |
| WO | 2010/011086 A2 | 1/2010 |

OTHER PUBLICATIONS

English machine translation of JP2005-220457, dated Aug. 2005.*
English machine translation of JP2008-273454, dated Nov. 2008.*
Notice of Reasons for Refusal issued Dec. 16, 2014 in corresponding Japanese Patent Application No. 2011-081084 with partial translation.
Notice of Reasons for Refusal issued Dec. 16, 2014 in corresponding Japanese Patent Application No. 2011-081086 with partial translation.
Extended European Search Report issued Feb. 9, 2015 in corresponding European Patent Application No. 12763347.7.
Extended European Search Report issued Feb. 9, 2015 in corresponding European Patent Application No. 12763347.4.
Notice of Reasons for Refusal issued Sep. 9, 2014 in Japanese Patent Application No. 2011-081091 with partial English Translation.
Notice of Reasons for Refusal issued Sep. 16, 2014 in Japanese Patent Application No. 2011-081089 with partial English translation.

* cited by examiner

TIRE

TECHNICAL FIELD

The present invention relates to a tire, and more particularly, to a tire related to the improvement of the heat resistant adhesive property in a reinforcing material.

BACKGROUND ART

Since polyethylene terephthalate (PET) has a high strength per weight and is inexpensive, it is used for a reinforcing member or the like of a tire for a multipurpose cord. When a cord composed of an organic fiber such as PET is used as a reinforcing member of a tire, generally, the cord is subjected to a dipping treatment by an adhesive agent such as a resorcin-formalin-latex (RFL)-based adhesive agent, then rubberized, and the obtained cord is applied to a tire as a rubber-cord complex. However, since there are few reaction active sites on the surface of polyester fiber such as PET due to its chemical structure, it has been difficult to ensure the adhesive strength between a filament and an adhesive agent in a step of combining the cord and the rubber.

As a technique for improving the adhesive property between PET and rubber, for example, Patent Document 1 discloses a two-bath treatment in which PET is dipped in an epoxy-based adhesive agent, and then in an RFL-based adhesive agent. A studies on the improvement of the epoxy-based adhesive agent is also conducted, and for example, Patent Document 2 discloses an epoxy-based adhesive agent composition comprising: a water-soluble polymer; and an aqueous urethane compound obtained by reacting organic polyisocyanates containing a structure in which aromatics are bonded by methylene with a compound having a plurality of active hydrogen atoms and a thermally dissociating blocking agent.

Here, by a two-bath treatment proposed in the above-mentioned Patent Document 1 and an epoxy-based adhesive agent composition proposed in Patent Document 2, the adhesive property between PET and rubber can be improved. However, since, when a tire is used under a high-speed environment and a high-load environment, a more rigid adhesive property between a polyester fiber and a rubber under an input of a dynamic strain, in particular, a heat resistant adhesive property is demanded, the establishment of a new technique has been expected.

Conventionally, when a high-speed durability performance test is performed in a state in which a camber angle is provided, on a tire in which a polyester fiber is applied to a carcass ply, in particular, on a tire for automobile, a separation of a carcass ply may occur at the tire side portion, leading to a failure of a tire at an early stage. This is because the adhesive strength between a polyester fiber and a rubber is insufficient.

By a two-bath treatment proposed in the above-mentioned Patent Document 1 and an epoxy-based adhesive agent composition proposed in Patent Document 2, the adhesive property between PET and rubber can be improved. However, since the adhesive property is insufficient when a tire is used under a high-speed environment and a high-load environment, it has been demanded that a more rigid adhesive property between a polyester fiber and a rubber under an input of a dynamic strain is attained, and that a tire whose high-speed durability performance is improved is attained.

Further, conventionally, in a run-flat tire in which a polyester fiber is applied to a carcass ply, a separation failure of a carcass ply may occur at the tire side portion during run-flat travering, leading to a failure of a tire at an early stage. This is because the adhesive strength between a polyester fiber and a rubber is insufficient.

By a two-bath treatment proposed in the above-mentioned Patent Document 1 and an epoxy-based adhesive agent composition proposed in Patent Document 2, the adhesive property between PET and rubber can be improved. However, since the adhesive property is insufficient when a tire is used under a high-speed environment and a high-load environment, it has been demanded that a more rigid adhesive property between a polyester fiber and a rubber under an input of a dynamic strain is attained, and that a run-flat tire whose run-flat durability performance is improved is attained.

Still further, conventionally, as one method of improving the run-flat durability of a run-flat tire, a method in which a reinforcing cord layer is applied from a shoulder portion to a side portion of a tread is proposed. However, when a polyester fiber is used for cord material of the reinforcing cord layer, a separation failure of a reinforcing cord may occur during run-flat traveling, leading to a failure of a tire at an early stage. This is because the adhesive strength between a polyester fiber and a rubber is insufficient.

By a two-bath treatment proposed in the above-mentioned Patent Document 1 and an epoxy-based adhesive agent composition proposed in Patent Document 2, the adhesive property between PET and rubber can be improved. However, since the adhesive property is insufficient when a tire is used under a high-speed environment and a high-load environment, it has been demanded that a more rigid adhesive property between a polyester fiber and a rubber under an input of a dynamic strain is attained, and that a run-flat tire whose run-flat durability performance is improved is attained.

RELATED ART DOCUMENTS

Patent Documents

Patent Document 1: Japanese Unexamined Patent Application Publication No. 2000-355875
Patent Document 2: Japanese Unexamined Patent Application Publication No. 2001-98245

SUMMARY OF THE INVENTION

Problems to be Solved by the Invention

Accordingly, an object of the present invention is to provide a tire whose durability is improved by using, as a reinforcing member, a polyester cord having an improved heat resistant adhesive property to rubber.

Another object of the present invention is to provide a tire whose high-speed durability performance is improved by improving a polyester cord to be used for a reinforcing member of a carcass ply.

Further, still another object of the present invention is to provide a run-flat tire whose run-flat durability performance is improved by improving a polyester cord to be used for a reinforcing member of a carcass ply.

Further, still another object of the present invention is to provide a run-flat tire whose run-flat durability performance is improved by improving a polyester cord to be used for a reinforcing member of a reinforcing cord layer.

Means for Solving the Problems

In order to solve the above-mentioned problems, the present inventor intensively studied to discover that, by twisting a predetermined polyester filament to obtain a cord, and then allowing the cord to be subjected to an adhesive agent treatment, a dramatic improvement which can not be obtained previously in the dynamic adhesive property (heat resistant adhesive property) of the obtained polyester cord can be attained, and that, by using the polyester cord as a reinforcing member of a tire, the durability of a tire can be improved, thereby completing the present invention.

In other words, the present invention is a tire in which a rubber-cord complex composed of a polyester cord and a rubber is used as a reinforcing member, characterized in that the polyester cord is formed by twisting polyester filaments, and then subjecting the twisted filaments to an adhesive agent treatment by using an adhesive agent composition, and that the polyester filament is made of a polyester fiber which is composed of a polyester having ethylene terephthalate as a main repeating unit and having an intrinsic viscosity of 0.85 or higher, wherein the amount of terminal carboxy group in the fiber is 20 equivalent/ton or larger, the long period according to small-angle X-ray diffraction is 9 to 12 nm, and a surface treatment agent having an epoxy group is attached to the surface of the fiber.

In the present invention, the amount of terminal carboxy group on the surface of the polyester fiber is preferably 10 equivalent/ton or smaller; and also, the crystal size of the polyester fiber in the fiber lateral axis direction is preferably 35 to 80 nm$^2$. The amount of terminal methyl group in the polyester fiber is preferably 2 equivalent/ton or smaller; the titanium oxide content in the polyester fiber is preferably 0.05 to 3.0% by mass; and the epoxy index on the surface of the polyester fiber is preferably $1.0 \times 10^{-3}$ equivalent/kg or lower.

In the present invention, for the adhesive agent composition, those containing (A) a thermoplastic high molecular weight polymer composed of an ethylene addition polymer containing a 2-oxazoline group or a (blocked)isocyanate group, or a urethane-based high molecular weight polymer containing a hydrazino group, (B) a water-soluble polymer composed of a copolymer containing a maleic anhydride unit and an isobutylene unit or derivatives thereof, (C) a reaction product of diphenylmethane diisocyanate and a thermally dissociating blocking agent for isocyanate groups, a condensate of resorcin and formaldehyde obtained by a novolac forming reaction, a condensate of chlorophenol, resorcin, and formaldehyde, a compound composed of an epoxycresol novolac resin, or an aqueous urethane compound obtained by reacting organic polyisocyanates having a structure in which aromatics are bonded by methylene, a compound having a plurality of active hydrogen atoms, and a thermally dissociating blocking agent for isocyanate groups, and (D) an aliphatic epoxide compound can be preferably used.

In this case, the polyester cord is preferably further subjected to an adhesive agent treatment by a resorcin-formaldehyde-latex adhesive agent composition. The adhesive agent composition preferably further contains at least one selected from the group consisting of (E) a metal salt, (F) a metal oxide, and (G) a rubber latex.

In the present invention, for the adhesive agent composition, those containing resorcin, formaldehyde, rubber latex, an emulsion-polymerized blocked isocyanate compound, and ammonia, wherein the content of the emulsion-polymerized blocked isocyanate compound is 15 to 45% by mass are also preferably used.

In this case, the ammonia is preferably contained in the adhesive agent composition at a rate of 0.5 to 5.0 mol with respect to 1.0 mol of the resorcin. Further, the rubber latex is preferably a copolymer rubber latex of vinylpyridine, styrene and butadiene, and in particular, the rubber latex is preferably a copolymer rubber latex having a double structure composed of a two-stage polymerization of vinylpyridine, styrene and butadiene.

The tire of the present invention is preferably a tire comprising a carcass ply extending toroidally between a pair of left-and-right bead portions as a skeleton, at least one belt arranged on the crown portion of the carcass outside in the tire radial direction, at least one belt reinforcing layer covering the whole width of the belt, and at least one pair of belt reinforcing layers covering both end portions of the belt in the width direction, wherein the reinforcing member is used for one of or both of the belt reinforcing layer and the belt reinforcing layers.

The tire of the present invention is also preferably a tire comprising a carcass ply extending toroidally between a pair of left-and-right bead portions as a skeleton, wherein the carcass ply is composed of the reinforcing member.

In this case, the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), $\rho$ represents the density of the cord (g/cm$^3$), D is the total decitex (dtex) of the cord) is preferably from 0.40 to 0.60. The total fineness of the polyester cord is preferably from 2000 dtex to 5100 dtex, and the melting point of the polyester cord is preferably 220° C. or higher.

Further, the tire of the present invention is also preferably a tire comprising a pair of left-and-right bead portions, a pair of side wall portions each continuing from the bead portion to the outside in the tire radial direction, a tread portion bridging between the pair of side wall portions to form a contacting portion, and further comprising a carcass composed of one or more carcass plies extending toroidally between the pair of bead portions to reinforce each of these portions, and a side reinforcing rubber layer having a crescent shaped cross-section arranged inside the carcass at the side wall portion, wherein the carcass ply is composed of the reinforcing member.

In this case, the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), $\rho$ represents the density of the cord (g/cm$^3$), D is the total decitex (dtex) of the cord) is preferably from 0.40 to 0.55. The total fineness of the polyester cord is preferably from 2000 dtex to 5100 dtex, and the melting point of the polyester cord is preferably 220° C. or higher.

Still further, the tire of the present invention is also preferably a tire comprising a pair of left-and-right bead portions, a pair of side wall portions each continuing from the bead portion to the outside in the tire radial direction, a tread portion bridging between the pair of side wall portions to form a contacting portion, and further comprising a carcass composed of one or more carcass plies extending toroidally between the pair of bead portions to reinforce each of these portions, at least one belt arranged on the crown portion of the carcass outside in the tire radial direction, and a side reinforcing rubber layer having a crescent shaped cross-section arranged inside the carcass at the side wall portion, wherein one or more reinforcing cord layers are arranged at least outside of the carcass in the tire width direction at the tire maximum width position, and the reinforcing cord layer is composed of the reinforcing member.

In this case, the cord angle of the reinforcing cord layer is preferably smaller than 10° with respect to the tire radial direction. The reinforcing cord layer preferably extends at least from the end portion of the belt along the carcass to the outside of the bead core in the tire radial direction, and also preferably extends from at least the end portion of the belt along the carcass to the outside of the bead core in the tire width direction. Further, the twisting coefficient Nt defined by the formula of the polyester cord below:

$$Nt=\tan\theta=0.001\times N\times(0.125\times D/\rho)^{1/2} \quad (1)$$

(wherein N represents the number of twist (/10 cm), $\rho$ represents the density of the cord ($g/cm^3$), D is the total decitex (dtex) of the cord) is preferably from 0.20 to 0.55. The total fineness of the polyester cord is preferably from 2000 dtex to 5100 dtex. Still further, the carcass ply is preferably composed of a rubberized cord layer, the cord being composed of a polyethylene terephthalate or cellulose fiber.

In the present invention, the term "tire maximum width position" herein refers to a position where the width in the tire width direction cross-section is maximum when a tire is mounted on a rim prescribed in an industrial standard effective in a region where a tire is manufactured and used such as JATMA (The Japan Automobile Tyre Manufacturers Association, Inc.) YEAR BOOK in Japan, ETRTO (European Tyre and Rim Technical Organisation) STANDARDS MANUAL in Europe, and TRA (THE TIRE and RIM ASSOCIATION INC.) YEAR BOOK in U.S., and when the tire is inflated to the maximum air pressure according to the tire size prescribed in a standard such as JATMA.

Effect of the Invention

According to the present invention, by employing the above-mentioned constitution, it becomes possible to attain a tire having an improved durability.

By performing an adhesive agent treatment by using a predetermined epoxy-based adhesive agent composition, the obtained cord may have a dramatically improved dynamic adhesive property (heat resistant adhesive property) which was not conventionally obtained. Therefore, by using the cord as a reinforcing member of a tire, in particular, as a reinforcing member of a carcass ply, a tire having an improved high-speed durability performance, and a run-flat tire having an improved run-flat durability performance can be attained. Also, by using the cord as a reinforcing member of a reinforcing cord layer, a run-flat tire having an improved run-flat durability performance can be attained.

Further, in a cord obtained by performing an adhesive agent treatment by using the above-mentioned adhesive agent composition formed by further adding a predetermined compound to an adhesive agent liquid (RFL adhesive agent liquid) containing resorcin, formaldehyde, and rubber latex, a dramatically improved dynamic adhesive property (heat resistant adhesive property) which was not conventionally obtained can be attained. Therefore, by using the cord as a reinforcing member of a tire, in particular, as a reinforcing member of a carcass ply, a tire having an improved high-speed durability performance, and a run-flat tire having an improved run-flat durability performance can be attained. Also, by using the cord as a reinforcing member of a reinforcing cord layer, a run-flat tire having an improved run-flat durability performance can be attained.

MODE FOR CARRYING OUT THE INVENTION

Embodiments of the present invention will now be described in detail.

First Embodiment

Figure 1:
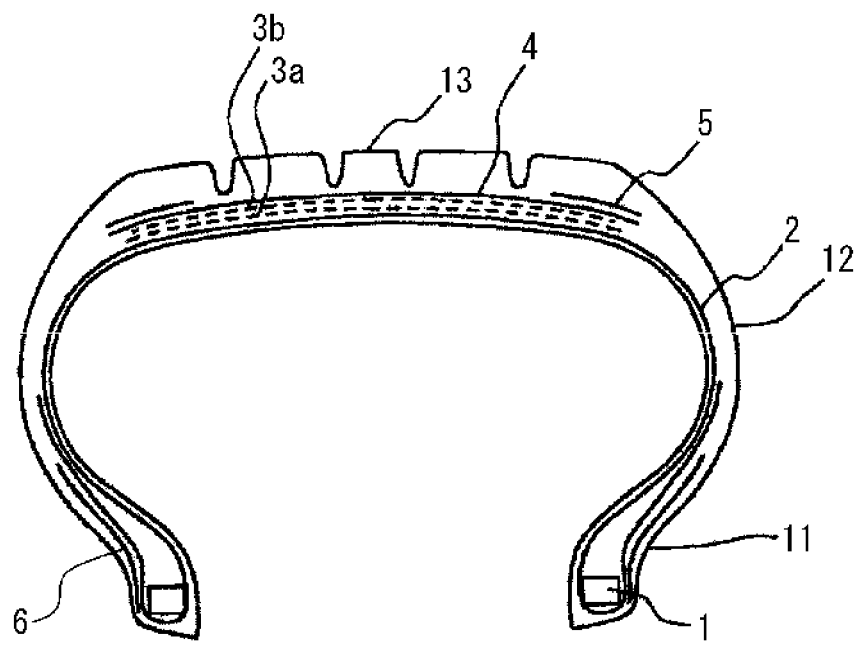
FIG. 1 is a cross-sectional view in the width direction illustrating one example of a tire of the present invention.

FIG. 1 is a cross-sectional view in the width direction illustrating one example of a tire of the present invention. The illustrated tire comprises a pair of left-and-right bead portions 11 in which a bead core 1 is embedded and a pair of side wall portions 12, and a tread portion 13 continuing to both side wall portions 12, and further comprises a carcass ply 2 toroidally extending between a pair of left-and-right bead cores 1 to reinforce these portions. On the outside of the crown portion of the carcass ply 2, two belts 3a, 3b made of a rubberized reinforcing cord layer in which the cords are arranged inclined with respect to the tire circumferential direction, and belt reinforcing layers 4, 5 made of a rubberized organic fiber cord layer in which the cords are arranged substantially parallel to the tire circumferential direction are arranged. On the outside of the carcass ply 2 at the bead portion 11, an insert 6 is arranged.

A tire of the present invention is characterized in that a rubber-cord complex composed of a polyester cord formed by twisting specific polyester filament and then subjecting the twisted filament to an adhesive agent treatment, and a rubber is used as a reinforcing member. Specifically, in the tire of the present invention, for a polyester filament used for a reinforcing member, a specific polyester filament in which a specific epoxy surface treatment agent is attached to the fiber surface is used. By employing such a constitution, a polyester cord having an improved adhesive property to rubber which was conventionally hard to be ensured can be obtained; in particular, the adhesive property between rubber/polyester cord at the time of high heat generation when a high-intensity dynamic strain is repeatedly applied can be dramatically improved. Accordingly, in the present invention, by applying the polyester cord to the reinforcing member, a tire having an improved durability can be attained.

<Polyester Filament>

A polyester filament used in the present invention will now be described.

The polyester filament used in the present invention is made of a polyester fiber which is composed of a polyester having ethylene terephthalate as a main repeating unit and having an intrinsic viscosity of 0.85 or higher, wherein the amount of terminal carboxy group in the fiber is 20 equivalent/ton or larger, the long period according to small-angle X-ray diffraction is 9 to 12 nm, and a surface treatment agent having an epoxy group is attached to the surface of the fiber.

The intrinsic viscosity of the above-mentioned polyester fiber is needed to be 0.85 or higher, and is preferably 1.10 or lower. More preferably, a polyester fiber whose intrinsic viscosity is in the range of 0.90 to 1.00 is used. When the intrinsic viscosity is lower than 0.85, the strength of the polyester fiber is insufficient; in particular, decrease in strength in a tire vulcanizing step can not be sufficiently suppressed.

In the above-mentioned polyester fiber, it is needed that the amount of terminal carboxy group of the total polymer is 20 equivalent/ton or higher and that, to the fiber surface, a surface treatment agent having an epoxy group is attached. Conventionally, in a polyester fiber used for reinforcing a tire, for the purpose of improving the heat deterioration resistance or the like, a method in which the carboxy group of the polymer is maintained at 15 equivalent/ton or smaller has been generally used. However, since a polyester fiber for reinforcing a tire highly needs to maintain the adhesive property to rubber in addition to maintain the strength retention, the present inventors found that in cases where the long period according to small-angle X-ray diffraction is as small as 9 to 12 nm, and the surface thereof has been subjected to an epoxy treatment, such as in the case of a polyester fiber of the present invention, the amount of carboxy group of 20 equivalent/ton or larger is optimal for reinforcing a tire. The upper limit of the amount of carboxy group in the polymer is preferably 40 equivalent/ton or smaller, and more preferably, in a range of 21 to 25 equivalent/ton.

Here, as a surface treatment agent having an epoxy group which is to be attached to the surface of the above-mentioned polyester fiber, those containing an epoxy compound which is a mixture of one, or two or more types of epoxy compounds having two or more epoxy groups in one molecule are suitable. More specifically, halogen-containing epoxy compounds are preferred, and examples thereof include those obtained by synthesis with epichlorohydrin polyhydric alcohol or polyvalent phenol. A compound such as glycerolpolyglycidylether is preferred. The amount of a surface treatment agent containing such an epoxy compound attached to the fiber surface is preferably in the range of 0.05 to 1.5% by mass, preferably, 0.10 to 1.0% by mass. Into the surface treatment agent, a smoothing agent, an emulsifier, an antistatic agent or other additives, or the like may be mixed as needed.

Further, in the above-mentioned polyester fiber, the long period according to small-angle X-ray diffraction needs to be 9 to 12 nm. The term "long period according to small-angle X-ray diffraction" herein refers to the interval between crystals in the polyester polymer in the fiber vertical axis direction. The long period in a polyester fiber of the present invention is characterized in that the period is short and the number of tie molecules connecting crystals is large. As the result, the strength retention rate when the polyester fiber is used for a tire reinforcing fiber can be maintained high. By making the long period in the above-mentioned range, the physical properties of the fiber can be made appropriate for a tire reinforcing fiber having high modulus and low degree of shrinkage. Usually, for the range of the long period, 9 nm is the lower limit. Preferably, the long period according to small-angle X-ray diffraction of the above-mentioned polyester fiber is in a range of 10 to 11 nm.

In the present invention, the amount of terminal carboxy group on the surface (original yarn surface) of the above-mentioned polyester fiber is preferably 10 equivalent/ton or smaller. The amount of carboxy group of whole polymer in the polyester fiber of the present invention is, as mentioned above, needed to be 20 equivalent/ton or higher; the amount of carboxy group on the fiber surface is preferably 10 equivalent/ton or smaller, which is smaller than that of the whole polymer due to the reaction with an epoxy compound attached to the fiber surface. As mentioned above, by the reaction of carboxy group in the polymer with an epoxy group on the fiber surface, a polyester resin of the present invention has a very excellent adhesion performance. At the same time, when a large amount of terminal carboxy group on the fiber surface is left, the heat resistance and adhesive property tend to deteriorate.

In the above-mentioned polyester fiber, the crystal size in the fiber lateral axis direction is preferably in the range of 35 to 80 $nm^2$. Although the polyester fiber of the present invention has a long period which is the interval of crystals in the fiber vertical axis of as short as 12 nm or shorter, since the size of the crystal needs to be large for obtaining a high strength fiber, in the present invention, the crystal size of the fiber in the lateral axis direction preferably grows to 35 $nm^2$ or larger. It is noted that since the fiber becomes rigid and the fatigue performance deteriorates when the crystal size is too large, the crystal size is preferably 80 $nm^2$ or smaller. The crystal size in the fiber lateral axis direction is more preferably in the range of 40 to 70 $nm^2$. As mentioned above, by the development of crystal of the fiber in the lateral axis direction, tie molecule is likely to develop also in the fiber lateral axis direction, and a three-dimensional structure is built in the longitudinal and lateral direction of the fiber, thereby obtaining a fiber which is particularly suitable for reinforcing a tire. Further, since the fiber has such a three-dimensional structure, the loss coefficient of the fiber tan δ becomes low. As the result, the amount of heat under a cyclic stress can be suppressed, and it becomes possible to highly keep the adhesion performance after providing a cyclic stress, thereby obtaining a fiber which is particularly preferred for reinforcing a tire.

Further, in the above-mentioned polyester fiber, the amount of terminal methyl group in the fiber is preferably 2 equivalent/ton or smaller; more preferably, terminal methyl group is not contained in the fiber. This is because, since the methyl group in polyester polymer has low reactivity and do not react with an epoxy group at all, a reaction between a carboxy group and an epoxy group which is effective for the improvement of the adhesive property is likely to be inhibited. When there are no terminal methyl group or a small amount of terminal methyl group in the polymer constituting the fiber, a high reactivity with an epoxy group in a surface treatment agent is ensured, and a high adhesive property and surface protecting ability can be ensured.

Still further, in the above-mentioned polyester fiber, the titanium oxide content in the fiber is preferably 0.05 to 3.0% by mass. When the titanium oxide content is smaller than 0.05% by mass, the smoothing effect for distributing a stress applied between a roller and the fiber in a drawing step or the like is likely to be insufficient, and may be disadvantageous for making the strength of the finally obtained fiber high. On the other hand, when the content of titanium oxide is larger than 3.0% by mass, titanium oxide functions as a foreign matter inside the polymer to inhibit the drawing property, and the strength of finally obtained fiber is likely to decrease.

Still further, in the above-mentioned polyester fiber, the epoxy index of the surface of the fiber is preferably $1.0 \times 10^{-3}$ equivalent/kg or smaller. Specifically, the epoxy index per 1 kg of polyester fiber is preferably $0.01 \times 10^{-3}$ to $0.5 \times 10^{-3}$ equivalent/kg. When the epoxy index of the fiber surface is high, there tend to be a large amount of unreacted epoxy compound. For example, a large amount of viscous scum on guides or the like in a twisting step is generated, and the passability of a fiber in a process decreases, and at the same time, a problem which causes decrease in the product quality such as twist unevenness occurs.

The strength of the above-mentioned polyester fiber is preferably in a range of 4.0 to 10.0 cN/dtex. Both when the strength is too low and when the strength is too high, the durability in rubber tends to deteriorate. For example, when the production of the fiber is performed at the highest strength, breaking of a thread in a spinning step tends to occur, which is likely to be detrimental to the quality stability in an industrial fiber. Degree of the dry heat shrinkage of the fiber at a temperature of 180° C. is preferably in a range of 1 to 15%. When the degree of the dry heat shrinkage is too high, the change in the size during processing tends to be large, and the dimensional stability of a molding for which the fiber is used tends to become poor.

<Adhesive Agent Treatment>

A polyester cord to be used in the present invention is formed by twisting the above-mentioned polyester filament and then subjecting the twisted filament to an adhesive agent treatment by using an adhesive agent composition. The adhesive agent composition to be used in the present invention is not particularly restricted, and, for example, a variety of adhesive agent compositions which are conventionally known in the field of organic fiber cord for a tire reinforcing member such as RFL formulations can be used.

An adhesive agent treatment in which the above-mentioned adhesive agent composition is used can be performed in accordance with a conventional method, but not particularly restricted thereto. Examples of a method of coating an adhesive agent composition on a cord include a method of dipping a cord in an adhesive agent composition, a method of applying an adhesive agent composition using a brush, and a method of spraying an adhesive agent composition, and an appropriate method can be selected as needed. The method of coating an adhesive agent composition on the cord surface is not particularly restricted. When the adhesive agent composition is coated on the cord surface, the viscosity of the adhesive agent composition is preferably reduced by resolving in a variety of solvents since the application thereof becomes easy. Such a solvent is preferably mainly composed of water from the environmental point of view.

The cord which has been coated with an adhesive agent composition may be dried at a temperature of, for example, 100° C. to 210° C. The subsequent heat treatment is preferably performed at a temperature not lower than the glass-transition temperature of a polymer made of a resin material constituting the cord, and preferably at a temperature in the range of from [the melting temperature −70° C.] of the polymer to [the melting temperature −10° C.] of the polymer. This is because the bonding strength between the adhesive agent composition and the resin material can not be obtained since, when the temperature is lower than the glass-transition temperature of the polymer, the molecular mobility of the polymer is poor, and a sufficient interaction between a component in the adhesive agent composition which accelerates adhesion and the polymer can not be obtained. Such a resin material may be subjected in advance to a preprocessing treatment by an electron beam, a microwave, a corona discharge, a plasma treatment or the like. The dry weight of the adhesive agent composition with which the cord is coated is preferably 0.5 to 6.0% by mass with respect to the weight of the cord.

By a method in which a polyester cord obtained by being subjected to an adhesive agent treatment as mentioned above is embedded in an unvulcanized rubber to be vulcanized, or the like, a rubber-cord complex in which the cord and the rubber are rigidly bonded to each other can be obtained.

<Epoxy-Based Adhesive Agent Composition>

Examples of adhesive agent compositions to be used for the adhesive agent treatment of a polyester cord of the present invention suitably include a specific epoxy-based adhesive agent composition described in detail below.

Examples of the epoxy-based adhesive agent composition of the present invention include those containing (A) a thermoplastic high molecular weight polymer composed of an ethylene addition polymer containing a 2-oxazoline group or a (blocked)isocyanate group, or a urethane-based high molecular weight polymer containing a hydrazino group, (B) a water-soluble polymer composed of a copolymer containing a maleic anhydride unit and an isobutylene unit or derivatives thereof, (C) a reaction product of diphenylmethane diisocyanate and a thermally dissociating blocking agent for isocyanate groups, a condensate of resorcin and formaldehyde obtained by a novolac forming reaction, a condensate of chlorophenol, resorcin, and formaldehyde, a compound composed of an epoxycresol novolac resin, or an aqueous urethane compound obtained by reacting organic polyisocyanates having a structure in which aromatics are bonded by methylene, a compound having a plurality of active hydrogen atoms, and a thermally dissociating blocking agent for isocyanate groups, and (D) an aliphatic epoxide compound.

(A) The thermoplastic high molecular weight polymer is an ethylene addition polymer whose principal chain is an acrylic polymer, a vinyl acetate polymer, a vinyl acetate ethylene polymer, or the like, or a urethane-based high molecular weight polymer composed mostly of a linear chain structure. When the principal chain of the thermoplastic high molecular weight polymer is composed of an ethylene addition polymer, it is preferred that the ethylene addition polymer is substantially composed of a monomer having one carbon-carbon double-bond, and that a carbon-carbon double-bond having a hydrogen group at a sulfur-reactive allylic position introduced by a conjugated diene monomer or the like is 10% or lower by the monomer composition ratio. Examples of a cross-linkable functional group as a pendant group of the thermoplastic high molecular weight polymer include an oxazoline group, and a (blocked)isocyanate group. The thermoplastic high molecular weight polymer is preferably a high molecular weight polymer which is composed mostly of a linear chain structure and having a relatively high molecular weight region, and particularly preferably, the weight-average molecular weight based on polystyrene is 10,000 or higher. Further, the thermoplastic high molecular weight polymer is preferably a molecular having a relatively low to intermediate molecular weight region, and particularly preferably, a molecular having a molecular weight of 9,000 or lower. Still further, the thermoplastic high molecular weight polymer is preferably composed of an ethylene addition polymer containing a 2-oxazoline group as a pendant group. Still further, the thermoplastic high molecular weight polymer is preferably a polyurethane-based polymer whose principal chain is composed mostly of a linear chain structure and which contains a hydrazino group as a pendant group.

The above-mentioned thermoplastic high molecular weight polymer is a thermoplastic resin to be contained in an adhesive agent composition for the purposed of increasing the flexibility of the adhesive agent composition matrix which tends to become hard by containing an aliphatic epoxide compound and a water-soluble polymer or an aqueous urethane compound. In the case of rubber articles containing sulfur, since, if the principal chain skeleton of the thermoplastic high molecular weight polymer has sulfur-reactivity, the heat deterioration of the adhesion accompanied by sulfur crosslinking becomes large, in the present invention, the thermoplastic high molecular weight polymer substantially does not have a carbon-carbon double-bond having a hydrogen atom at an allylic position. When the thermoplastic high molecular weight polymer contains a cross-linkable functional group which bonds as a pendant group in a principal chain skeleton, in particular, an active hydrogen on the synthetic resin surface or a cross-linkable group on a carbonyl group in an appropriate amount, a bond between a coat layer of an adhesive agent composition and the synthetic resin surface is obtained, and at the same time, molecular flow at high temperature is inhibited by intramolecular cross-linking and the adhesive strength at high temperature is improved, which is preferred. An excess amount of cross-linking group is not preferred since the chemical heat resistance is reduced. The amount of cross-linkable functional group contained in the thermoplastic high molecular weight polymer depends on the molecular weight of the principal chain skeleton of the thermoplastic high molecular weight polymer, the type of a cross-linkable functional group as a pendant group or the molecular weight. Usually, the amount of such a cross-linkable functional group is preferably in a range of 0.01 mmol/g to 6.0 mmol/g with respect to the total dry weight of the thermoplastic high molecular weight polymer.

As mentioned above, the above-mentioned thermoplastic high molecular weight polymer has, as a main skeleton, a thermoplastic organic polymer which is widely used for a variety of applications as an adhesive agent, a gluing agent, a paint, a binder, a resin modifying agent, a coating agent, or the like, and substantially does not contain in the principal chain structure a carbon-carbon double-bond having a hydrogen atom at an allylic position which is a reaction point of a cross-linking agent such as sulfur, and has a cross-linkable functional group as a pendant group. Although the thermoplastic high molecular weight polymer may have a carbon-carbon double-bond when the polymer has a structure such as a side chain other than a principal chain, the double-bond is preferably a carbon-carbon double-bond having a low reactivity with sulfur, for example, a carbon-carbon double-bond or the like of an aromatic which is stable due to its resonance structure. In particular, industrially, as the thermoplastic high molecular weight polymer, an ethylene addition polymer such as an acrylic polymer, a vinyl acetate polymer, and a vinyl acetate ethylene polymer can be preferably used. Also a thermoplastic organic polymer such as a urethane-based high molecular weight polymer having a relatively high molecular weight region composed mostly of a linear chain structure can be preferably used since the cohesive failure resistance by a urethane bond having a large cohesive energy present in the molecule or by an intermolecular secondary bond due to the urethane bond is high and the durability becomes favorable.

In the following, descriptions will be made for two cases: (i) where the principal chain of thermoplastic high molecular weight polymer is an ethylene addition polymer, and, (ii) where the principal chain of the thermoplastic high molecular weight polymer is a urethane-based high molecular weight polymer.

(i) When the principal chain of the thermoplastic high molecular weight polymer is composed of an ethylene addition polymer, the polymer is composed of a unit derived from an ethylenic unsaturated monomer having one carbon-carbon double-bond and a monomer containing two or more carbon-carbon double-bonds, and preferably, the amount of a carbon-carbon double-bond having an addition reactivity is 10 mol % or smaller by the monomer composition ratio based on the total amount of monomer to be added, and preferably 0 mol %.

When the polymer is a thermoplastic high molecular weight polymer whose principal chain is composed of an ethylene addition polymer, example of the monomer constituting the principal chain skeleton which is an ethylenic unsaturated monomer having one carbon-carbon double-bond include: an α-olefins such as ethylene, propylene, butylene, and isobutylene; α,β-unsaturated aromatic monomers such as styrene, α-methyl styrene, monochlorostyrene, vinyltoluene, vinylnaphthalene, styrene, and sodium sulfonate; ethylenic carboxylic acids such as an itaconic acid, a fumaric acid, a maleic acid, an acrylic acid, a methacrylic acid, and a butene tricarboxylic acid, and salts thereof; acid anhydrides such as maleic anhydride, and itaconic acid anhydride; esters of an unsaturated carboxylic acid such as (meth)acrylic acid methyl, (meth)acrylic acid ethyl, (meth)acrylic acid butyl, (meth)acrylic acid 2-ethyl hexyl, (meth)acrylic acid methoxy polyethylene glycol, (meth)acrylic acid 2-hydroxyethyl, and (meth)acrylic acid 2-amino ethyl; monoesters of an ethylenic dicarboxylic acid such as itaconic acid monoethyl ester, fumaric acid monobutyl ester, and maleic acid monobutyl ester; diesters of an ethylenic dicarboxylic acid such as itaconic acid diethylester, and fumaric acid dibutyl ester; amides of an α,β-ethylenic unsaturated acid such as acrylamide, maleic acid amide, N-methylol acrylamide, N-(2-hydroxyethyl)acrylamide, methacrylamide, N-methylol methacrylamide, N-(2-hydroxyethyl)methacrylamide, and maleic acid amide; hydroxyl group-containing monomers such as 2-hydroxyethyl(meth)acrylate, polyethylene glycol mono(meth)acrylate; unsaturated nitriles such as acrylonitrile, methacrylonitrile, fumaronitrile, and α-chloroacrylnitrile; vinylethers such as methyl vinylether, and ethyl vinylether; vinylketone; vinyl amide; halogen-containing α,β-unsaturated monomers such as vinyl chloride, vinylidene chloride, vinyl fluoride, and vinylidene fluoride; a vinyl compound such as vinyl acetate, vinyl valerate, vinyl caprylate, and vinylpyridine; addition polymerizable oxazolines such as 2-isopropenyl-2-oxazoline; heterocyclic vinyl compounds such as vinylpyrrolidone; and unsaturated bond-containing silane compounds such as vinylethoxy silane, and α-methacryloxypropyl trimethoxy silane. Any of these may be used singly or two or more of these may be used in combination.

It is preferred that a thermoplastic high molecular weight polymer is obtained by radical addition polymerization of these monomers.

Examples of a monomer constituting a principal chain skeleton which contains two or more carbon-carbon double-bonds include conjugated diene monomers such as a halogen-substituted butadiene of 1,3-butadiene, 2-methyl-1,3-butadiene, 2,3-dimethyl-1,3-butadiene, and chloroprene; examples of unconjugated diene monomer include unconjugated diene monomers such as vinyl norbornene, dicyclopentadiene, and 1,4-hexadiene. Any of these may be used singly or two or more of these may be used in combination.

The thermoplastic high molecular weight polymer whose principal chain is composed of an ethylene addition polymer is composed of a unit derived from an ethylenic unsaturated monomer having one carbon-carbon double-bond and a monomer containing two or more carbon-carbon double-bonds, and preferably, the amount of a carbon-carbon double-bond which is sulfur-reactive is 10 mol % or smaller by the monomer composition ratio based on the total amount of monomer to be added, and preferably 0 mol %.

The glass-transition temperature of the thermoplastic high molecular weight polymer obtained by radical addition polymerization of the above-mentioned monomer is preferably from −90° C. to 180° C., more preferably from −50° C. to 120° C., and still more preferably from 0° C. to 100° C. This is because, when the glass-transition temperature of the thermoplastic high molecular weight polymer is lower than −90° C., the creep when the polymer is used at a high temperature becomes large; and when the glass-transition temperature is 180° C. or higher, the polymer becomes too hard so that the stress relaxation which is specific to a soft thermoplastic resin becomes small, and the cord fatigability under a high strain environment such as when a tire is used becomes low.

Examples of the cross-linkable functional group which is introduced into a thermoplastic high molecular weight polymer obtained by radical addition polymerization as a pendant group include an oxazoline group, an epoxy group, an aziridine group, a carbodiimide group, a bismaleimide group, a blocked isocyanate group, a hydrazino group, and an epithio group. The reason why the cross-linkable functional group is introduced is that the adhesive property is improved by cross-linking reaction with other adhesive agent composition components or adherend components in contact with the thermoplastic high molecular weight polymer.

The method of obtaining a thermoplastic high molecular weight polymer by introducing a cross-linkable functional group into a polymer obtained by radical addition polymerization is not particularly restricted. For example, a method of copolymerizing an addition polymerizable monomer having oxazoline, an addition polymerizable monomer having an epoxy group, an addition polymerizable monomer having maleimide, an addition polymerizable monomer having a blocked isocyanate group, an addition polymerizable monomer having an epithio group, or the like when polymerizing a polymer obtained by the above-mentioned radical addition polymerization can be employed (Japanese Unexamined Patent Application Publication No. 2001-98245, [0061]).

The addition polymerizable monomer having oxazoline as a pendant group is represented by the formula below:

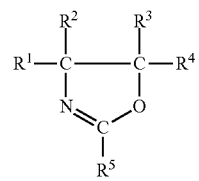

(wherein $R^1$, $R^2$, $R^3$, and $R^4$ each independently represents hydrogen, halogen, alkyl, aralkyl, phenyl or substituted phenyl, $R^5$ is a noncyclic organic group having an addition polymerizable unsaturated bond).

Examples of a monomer having oxazoline include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. Since, among these, 2-isopropenyl-2-oxazoline is suitable since it is easily available also industrially.

As an addition polymerizable monomer having as a pendant group a blocked isocyanate group, a compound represented by the formula below:

(wherein $R^6$ is a hydrogen atom or a methyl group; X is —OBO— (B is an alkylene group having 2 to 10 carbon atoms optionally substituted by a halogen atom or an alkyl group) or —NH—; Y is an isocyanate residue of aromatic diisocyanate; and Z is a hydrogen residue of ketoxime) is preferred.

The addition polymerizable monomer having as a pendant group a blocked isocyanate group is obtained by addition reaction of a polymerizable monomer having an isocyanate group such as 2-methacryloyloxyethyl isocyanate to a known blocking agent. Examples of the known blocking agent which blocks an isocyanate group include: phenols such as phenol, thiophenol, chlorophenol, cresol, resorcinol, p-sec-butylphenol, p-tert-butylphenol, p-sec-amylphenol, p-octylphenol, and p-nonylphenol; secondary or tertiary alcohols such as isopropyl alcohol, and tert-butyl alcohol; aromatic secondary amines such as diphenyl amine, and xylidine; phthalic imides; lactams such as ε-caprolactam, and δ-valerolactam; caprolactams such as ε-caprolactam; active methylene compounds such as malonic acid dialkylester, acetylacetone, acetoacetic acid alkylester; oximes such as acetoxime, methylethylketoxime, cyclohexanoneoxime; basic nitrogen compounds such as 3-hydroxypyridine; and acidic sodium sulfite.

As the above-mentioned thermoplastic high molecular weight polymer, a thermoplastic high molecular weight polymer having a oxazoline group in which a cross-linking functional group has a favorable preservation stability in the case of long-term storage, or the like is suitably used.

The above-mentioned thermoplastic high molecular weight polymer composed of an ethylene addition polymer is preferably water-dispersible or water-soluble since water which is harmless to environment can be used as a solvent. The polymer is particularly preferably a water-dispersible resin.

(ii) When the thermoplastic high molecular weight polymer is composed of a urethane-based high molecular weight polymer, in the present invention, the main structure of the thermoplastic high molecular weight polymer is a high molecular weight polymer having a large amount of bonds caused by a reaction between an isocyanate group and an active hydrogen mainly such as urethane bonds or urea bonds obtained by polyaddition reaction of polyisocyanate and a compound having two or more active hydrogen atoms. It is obvious that examples of the polymer include a polymer containing not only the bonds caused by the reaction between an isocyanate group and an active hydrogen but also an ester bond, an ether bond, and an amide bond contained in the molecule of the active hydrogen compound, and urethodione, carbodiimide generated by the reaction between isocyanate groups, or the like.

Examples of a cross-linking functional group to be introduced as a pendant group into a urethane-based high molecular weight polymer obtained by the above-mentioned polyaddition polymerization include a hydrazino group. The hydrazino group is preferred because the adhesive strength becomes preferable.

A thermoplastic high molecular weight polymer composed of the above-mentioned urethane-based high molecular weight polymer is preferably aqueous since water which is harmless to environment can be used as a solvent.

For the polyisocyanate to be used for the synthesis of a urethane-based high molecular weight polymer in the present invention, conventionally generally used aromatic, alicyclic organic polyisocyanate can be used, and examples thereof include isocyanate compounds such as toluene diisocyanate, diphenylmethane diisocyanate, 1,6-hexamethylene diisocyanate, 2,2,4(2,4,4)-trimethylhexamethylene diisocyanate, p-phenylene diisocyanate, 4,4'-dicyclohexylmethane diisocyanate, 3,3'-dimethyldiphenyl, 4,4'-diisocyanate, dianisidine isocyanate, m-xylene diisocyanate, hydrogenated xylene diisocyanate, 1,3-bis(isocyanatomethyl)cyclohexane, tetramethylxylene diisocyanate, isoholon diisocyanate, 1,5-naphthalene diisocyanate, 1,4-cyclohexyl diisocyanate, lysine isocyanate, dimethyltriphenylmethane tetraisocyanate, triphenylmethane triisocyanate, tris(isocyanate phenyl)thiophosphate, urethane modified toluene diisocyanate, allophanate modified toluene diisocyanate, biuret modified toluene diisocyanurate, isocyanurate modified toluenediisocyanate, urethane modified diphenylmethanediisocyanate, carbodiimide modified diphenylmethanediisocyanate, acyl ureide modified diphenylmethane diisocyanate, and polymeric diphenylmethane diisocyanate, but not limited thereto. Any of these may be used singly or two or more of these may be used in combination.

Examples of a compound having two or more active hydrogen atoms to be used in the synthesis of urethane-based high molecular weight polymer in the present invention include those having, on the terminal of the molecule or in the molecule, two or more hydroxyl groups, carboxyl groups, amino groups or mercapto groups, which is generally known polyether, polyester, polyetherester, polythioether, polyacetal, polysiloxane or the like. Preferably, they are a polyether or polyester having, on the terminal of the molecule, two or more hydroxyl groups. Such compounds having two or more active hydrogen atoms preferably have a molecular weight of 50 to 5,000.

Specific examples thereof include low molecular weight polyols such as ethylene oxide or propylene oxide adducts of ethylene glycol, 1,2-propanediol, 1,3-propanediol, 1,2-butanediol, 1,3-butanediol, 1,4-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1, 2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 1,7-heptanediol, 2-methyl-2-propyl-1,3-propanediol, 2,5-dimethyl-2,5-hexanediol, 1,2-octanediol, 1,8-octanediol, 2,2,4-trimethyl-1,3-pentanediol, propylenediol, glycerin, trimethylolpropane, 1,2,6-hexane triol, hydrogenated bisphenol A, or bisphenol A; low molecular weight polyols such as carboxy group-containing polyols such as 2,2-bis(hydroxymethyl)propionic acid, 2,2-bis(hydroxymethyl)butanoic acid, 2,5,6-trimethoxy-3,4-dihydroxyhexane acid, 2,3-dihydroxy-4,5-dimethoxypentane acid.

Examples of the high molecular weight polyols include: polyether polyols such as polypropylene glycol, polyethylene glycol, polytetramethylene glycol, ethylene oxide/propylene oxide copolymer, THF/ethylene oxide copolymer, THF/propylene oxide copolymer; polyester polyols such as a dimethylol propionic acid, polyethylene adipate, poly(propylene adipate), poly-ε-caprolactone, and copolymers thereof; polyether ester polyol, polycarbonate polyol of polycarbonic acid ester compound or the like, hydrocarbon-skeleton polyol, and polyaddition product thereof, but not limited thereto. Any of these may be used singly or two or more of these may be used in combination.

At least one type of the compound having two or more active hydrogen atoms to be used for the above-mentioned polyurethane-based high molecular weight polymer preferably contains a compound containing aromatics or a structure in which aromatics are bonded by methylene. This is because, by containing a structure in which aromatics are bonded by methylene, adhesion to polyester material can be obtained. A compound containing a structure in which aromatics are connected by a bond other than methylene is also preferred because it has a similar effect.

A concrete method of synthesizing a urethane-based high molecular weight polymer having a hydrazino group as a pendant group is not particularly restricted. Specifically, for example, firstly, a urethane-based high molecular weight polymer having a terminal isocyanate obtained by reacting a compound having two or more active hydrogen atoms with an excessive amount of polyisocyanate by polyaddition reaction or the like is manufactured. After neutralizing the polymer by a neutralizer such as a tertiary amine, water is added to change the phase, then chain extension is preferably performed by a polyfunctional carboxylic acid polyhydrazide, and a treatment of hindering terminal isocyanate is preferably performed.

The reaction between the above-mentioned compound having two or more active hydrogen atoms and an excessive amount of polyisocyanate can be performed by a conventionally known single-stage or multi-stage isocyanate addition reaction method at room temperature or under a condition at a temperature of about 40 to 120° C. In the above-mentioned reaction, a known catalyst such as dibutyl tin dilaurate, stannous octoate, or triethylamine, a reaction controlling agent such as a phosphoric acid, an adipic acid, or benzoyl chloride, and, an organic solvent which does not react with an isocyanate group may be used. Examples of the above-mentioned solvent include ketones such as acetone, methyl ethyl ketone, methyl isobutyl ketone, cyclohexanone; ethers such as tetrahydrofuran, or dioxane; esters such as ethyl acetate; amide solvents such as N-methylpyrrolidone; toluene; and xylene.

Examples of a neutralizer to be used in the above-mentioned reaction include amines such as ammonia, trimethyl amine, triethylamine, tripropyl amine, triethanol amine, monoethanol amine, N-methylmorpholine, morpholine, 2,2-dimethyl monoethanol amine, N,N-dimethyl monoethanol amine, sodium hydroxide, and potassium hydroxide. Examples of polyfunctional carboxylic acid polyhydrazide to be used in the above-mentioned reaction include oxalic acid dihydrazide, malonic acid dihydrazide, glutaric acid dihydrazide, adipic acid dihydrazide (ADH), sebacic acid dihydrazide, dodecanedionic acid dihydrazide, maleic acid dihydrazide, fumaric acid dihydrazide, itaconic acid dihydrazide, isophthalic acid dihydrazide, terephthalic acid dihydrazide, 4,4'-oxybis benzenesulfonyl hydrazide, trimesic acid trihydrazide, 1,3-bis(hydrazino carboethyl)-5-isopropylhydantoin (VDH), eicosanoic dihydrazide, 7,11-octadecadiene-1,18-dicarbohydrazide, polyacrylic acid hydrazide, and acrylamide-acrylic acid hydrazidecopolymer. Among these, adipic acid dihydrazide, isophthalic acid dihydrazide, and 1,3-bis(hydrazino carboethyl)-5-isopropylhydantoin (VDH) are preferably used.

As needed, N-alkyl dialkanol amine such as diamine, poly amine, N-methyl diethanolamine; and a known chain extending agent such as dihydrazide compound may also be used.

The above mentioned high molecular weight polymers obtained by reacting polyisocyanate with a compound having two or more active hydrogen atoms by polyaddition reaction preferably have a glass-transition temperature of from −90° C. to 180° C., more preferably from −50° C. to 120° C., and still more preferably from 0° C. to 100° C. This is because, when the glass-transition temperature of the urethane-based high molecular weight polymer is lower than −90° C., the creep when the polymer is used at a high temperature becomes large; and when the glass-transition temperature is 180° C. or higher, the polymer becomes too hard so that the stress relaxation which is specific to a soft thermoplastic resin becomes small. The cord fatigability under a high strain environment such as when a tire is used becomes low, which is also not preferred.

The molecular weight of the thus obtained urethane-based thermoplastic high molecular weight polymer is Mw (weight-average molecular weight)=10,000 or higher in terms of polystyrene by gel permeation chromatography, and more preferably 20,000 or higher. This is because, when the molecular weight is small, an improvement effect of absorbing a strain due to adhesion by an adhesive agent composition of a urethane-based high molecular weight polymer is not obtained. When a water dispersion of the obtained urethane-based high molecular weight polymer contains an organic solvent, the organic solvent can be distilled away under a reduced pressure and a heating condition as needed.

The water-soluble polymer (B) dissolves in water or an aqueous solution containing an electrolyte. The water-soluble polymer contains a carboxyl group in the molecule. The principal chain of water-soluble polymer having a carboxyl group is isobutylene-maleic anhydride copolymer or derivatives thereof. Further, the water-soluble polymer of the present invention may be a salt of the above-mentioned compound. The water-soluble polymer may be used by being dissolved in water, and may also be used by dissolving a salt obtained by neutralizing the polymer by a basic material. Specific examples of the water-soluble polymer include an isobutylene-maleic anhydride copolymer, or, a product neutralized by these basic materials.

The basic material which neutralizes the water-soluble polymer is not particularly restricted as long as it is a basic material, and examples thereof include hydroxides of an alkaline metal or an alkaline-earth metal such as sodium hydroxide, potassium hydroxide, and lithium hydroxide; ammonia; amines such as methyl amine, ethyl amine, propyl amine, dimethyl amine, triethylamine, monoethanol amine, and diethanolamine; carbonic acid salts of alkaline metal such as sodium carbonate, potassium carbonate; acetates of an alkaline metal such as acetic acid sodium, and potassium acetate; and phosphoric acid salt of alkaline metal such as phosphoric acid trisodium. Among these, sodium hydroxide, potassium hydroxide, ammonia, trimethyl amine, or triethylamine is preferably used. Particularly preferably, compared with a base containing an alkaline metal component having an effect of hydrolyzing and deteriorating a resin material such as polyester, a volatile base having a boiling point of 150° C. or lower, in particular, 100° C. or lower such as ammonia, trimethyl amine, triethylamine which dissipates in a heating step after a resin material is applied.

The structure of the water-soluble polymer is not particularly restricted, and may be a linear chain, branched, or two-dimensionally or three-dimensionally cross-linked. From the viewpoint of its performance, the water-soluble polymer is preferably a polymer only having a structure of a linear chain or a branched chain. The polymer preferably has a characteristic that, when the polymer is blended by an aqueous solution of an adhesive agent composition, the principal chain of the polymer does not become in the shape of a rubber ball and become stretched. When the principal chain becomes stretched in such a manner, the heat deformation resistance of an adhesive agent composition can be improved by the interaction between a carboxyl group and an adhesive agent matrix. Even if the water-soluble polymer does not become stretched in cases where the water-soluble polymer partially dissolved in water, for example, in a case of colloidal dispersion, when the polymer is partially compatible with an adhesive agent composition matrix, an effect can be obtained. The water-soluble polymer is preferably composed of a unit derived from a monomer having substantially one carbon-carbon double-bond. This is because, when the principal chain skeleton is sulfur-reactive, heat deterioration of adhesion accompanied by sulfur crosslinking becomes large, as well as, the molecular chain becomes stretched when dissolved in water and the compatibility improves. The water-soluble polymer is preferably a high molecular weight polymer having a relatively high molecular weight region, and preferably, the weight-average molecular weight is 3,000 or higher, particularly preferably 10,000 or higher, and still more preferably 80,000 or higher.

The compound (C) is contained in the adhesive agent composition mainly for the purpose of obtaining an effect of promoting adhesion to a resin material which is one adherend of the adhesive agent composition. The reason why such a compound is contained in the adhesive agent composition is as follows. A synthetic resin material such as a polyester resin which is to be used as a base material is composed of a flat linear polymer chain, and the polymer chain has a π electron cloud derived from an aromatic or the like contained in the polymer chain. Therefore, when a molecular structure having on the side of the molecule an aromatic π electron in the component of the adhesive agent composition, an effect of adhesion of the adhesive agent composition to the resin surface or an effect of diffusion between polymer chains of the resin is likely to be obtained due to the π electron interaction between the molecular structure portion and the π electron cloud portion of the polymer chain of the resin.

The polar functional group of the compound (C) is preferably a group which reacts with an epoxy group, a (blocked)isocyanate group or the like which is a carboxyl group, or a cross-linking component contained in the adhesive agent composition. Specific examples thereof include cross-linking functional group, hydroxyl group, amino group, carboxyl group such as an epoxy group, a (blocked) isocyanate group.

The molecular structure of the compound (C) is preferably not branched, and in a linear chain shape. The molecular structure is preferably the structure of methylenediphenyl, or, the structure of polymethylene polyphenyl having a relatively linear molecular structure. The molecular weight of the molecular structure portion where aromatics are bonded by methylene is not particularly restricted, and preferably 6,000 or smaller, and more preferably 2,000 or smaller. This is because, when the molecular weight is above 6,000, the molecular weight is too high, and even when an anchor effect is substantially constant, the diffusivity to a base material becomes small. As a compound having a structure in which aromatics are bonded by methylene having a polar functional group, a molecule having a relatively low to intermediate molecular weight region and a molecular weight of 9,000 or lower is also preferred. Further, a compound having a structure in which aromatics are bonded by methylene having a polar functional group is preferably aqueous (water-soluble or water-dispersible).

Such (C) compound is reaction product formed by blocking diphenylmethanediisocyanate by a thermally dissociating blocking agent, a condensate of resorcin and formaldehyde obtained by novolac forming reaction, chlorophenol-resorcin-formaldehyde condensate, or, a cresol novolac resin having an epoxy group.

Examples of a reaction product of diphenylmethanediisocyanate and a thermally dissociating blocking agent for isocyanate groups include a reaction product in which an isocyanate group is blocked by a known blocking agent. Specifically, commercially available blocked polyisocyanate compound such as ELASTRON BN69, DELION PAS-037 can be used.

As a condensate of chlorophenol, resorcin, and formaldehyde, Specifically, as a resorcin-formaldehyde condensate obtained by novolac forming reaction, a resorcin-formaldehyde condensate obtained by a novolac forming reaction described in Examples of WO97/13818; as a condensate of chlorophenol, resorcin, and formaldehyde, DENABOND, DENABOND-AL, and DENABOND-AF manufactured by Nagase ChemteX Corporation can be used.

As an epoxycresol novolac resin, a commercially available product such as Araldite ECN1400 manufactured by Asahi Kasei Epoxy Co., Ltd., DENACOL EM-150 manufactured by Nagase ChemteX Corporation can be used. Since the epoxy novolac resin is also an epoxide compound, it acts also as an intermolecular cross-linking component for an adhesive agent molecule which inhibits the fluidization of an adhesive agent composition at a high temperature. A compound obtained by modifying a condensate of phenols and formaldehyde by sulfomethylation is a compound obtained by heat reaction of a sulfomethylation agent before, during, or after the condensation reaction of phenols and formaldehyde. Examples of the sulfomethylation agent include salts of a sulfurous acid or a disulfurous acid and a basic material. Specifically, a sulfomethylation modified product of a condensate of phenols and formaldehyde described in Examples of Japanese Unexamined Patent Application Publication No. 2000-34455 (Japanese Patent Application No. 10-203356) can be used.

As the compound (C), an aqueous urethane compound obtained by reacting organic polyisocyanates having a structure in which aromatics are bonded by methylene (molecular structure) (hereinafter, also referred to as "aromatic methylene bond structure"), a compound having a plurality of active hydrogen atoms, and a thermally dissociating blocking agent for isocyanate groups may be used. The aqueous urethane compound is contained mainly for the purpose of promoting the adhesion of the adhesive agent composition to a synthetic resin, and is used as not only as an adhesive property improver but as a flexible cross-linking agent, by which an effect of inhibiting the fluidization of the adhesive agent composition molecular chain at a high temperature is expected. The aqueous urethane compound is a urethane reaction product obtained by reacting an organic polyisocyanate compound having a structure in which aromatics are bonded by methylene, and preferably, the aqueous urethane compound has two or more structures in which aromatics are bonded by methylene.

The reason why it is preferred that the aqueous urethane compound contains a benzene ring or a structure in which aromatics are bonded by methylene is described below. A synthetic resin material such as polyethylene terephthalate to be used as a base material is composed of a flat linear polymer chain, and, between the polymer chains or on the surface thereof, there exists a $\pi$ electron cloud derived from aromatics or the like contained in the polymer chain. Accordingly, when the aqueous urethane compound contains a molecular structure having on the side an aromatic $\pi$ electron, an effect of the adhesion to the surface of a resin of a base material or an effect of dispersion between polymer chains are likely to be obtained due to $\pi$ electron interaction at the molecular structure portion.

The aromatic methylene bond structure is preferably the structure of methylenediphenyl, or the structure of polymethylene polyphenyl if the structure is a relatively linear molecular structure. The molecular weight of the aromatic methylene bond structure portion is not particularly restricted, and preferably, the molecular weight is 6,000 or smaller, and more preferably 2,000 or smaller. This is because, when the molecular weight is above 6,000, which is a high molecular weight, the diffusivity to a base material becomes small even though the anchor effect is substantially constant.

In order for an isocyanate compound having in the molecule one aromatic methylene bond structure such as a blocked methylenediphenyldiisocyanate to be expected to have an anchor effect between a base material and an adhesive agent layer, cross-linking between an aqueous urethane compound which is applied to the base material and another adhesive agent composition component is required. However, an aqueous urethane compound having aromatic methylene bond structure portions at a plurality of sites in the molecule to allow itself to be bonded is preferred since it is cross-linked at a site other than an aromatic methylene bond structure portion or mechanically anchors itself to an adhesive agent composition, and an adhesion promoting effect is obtained with a relatively small loss. Naturally, an adhesion promoter of an aqueous urethane compound having one aromatic methylene bond structure in the molecules may be added to an adhesive agent composition of the present invention.

The aqueous urethane compound which is an adhesive property improver preferably has two or more thermally dissociating blocked isocyanate groups in the molecule. This is because the thermally dissociating blocked isocyanate groups react with the vicinity of the surface of a resin material such as polyethylene terephthalate to be used as a base material, other adhesive agent composition components, or active hydrogen atoms on an adherend rubber, thereby promoting the adhesive property by cross-linking. The aqueous urethane compound preferably has a group which can generate a salt or a hydrophilic group such as a hydrophilic polyether chain. This is because water which is advantageous from a hygiene viewpoint can be used as a solvent.

Examples of the blocking agent compound for a thermally dissociating blocked isocyanate group include a known blocking agent which blocks the above-mentioned isocyanate group.

Examples of a method of introducing a group which can generate a salt or a hydrophilic group such as a hydrophilic polyether chain include: as a method of introducing an anionic hydrophilic group, a method in which, after reacting polyisocyanate and polyol, a part of the terminal isocyanate group is allowed to react with salts of an organic acid having an active hydrogen atom such as sodium salts of an aminosulfonic acid such as taurine, N-methyl taurine, N-butyl taurine, and sulfanilic acid; and a method in which a tertiary nitrogen atom is introduced in advance, for example, by adding N-methyl-diethanolamine or the like in a step of reacting polyisocyanate and polyol, and then, the tertiary nitrogen atom is made into quaternary by dimethyl sulfate or the like. Examples of a method of introducing a hydrophilic group such as a hydrophilic polyether chain include: a method in which, after reacting polyisocyanate and polyol, a part of the terminal isocyanate group is allowed to react with a compound having at least one active hydrogen atom and hydrophilic polyether chain such as monofunctional polyethylene glycolmonoalkyl ethers having a molecular weight of 350 to 3,000 (for example, Brox 350, 550, 750 (manufactured by BP Chemicals ltd.)). The hydrophilic polyether chain of such compounds contains an alkylene oxide unit such as ethylene oxide and/or propylene oxide by at least 80%, and preferably 100%.

The organic polyisocyanates to be used for an aqueous urethane compound contains an aromatic methylene bond structure, and examples thereof include methylenediphenyl-polyisocyanate and polymethylene polyphenyl polyisocyanate. The organic polyisocyanate is preferably a polymethylene polyphenyl polyisocyanate having a molecular weight of 6,000 or lower, and more preferably, a polymethylene polyphenyl polyisocyanate having a molecular weight of 40,000 or lower. (Japanese Unexamined Patent Application Publication No. 2001-98245, [0093])

The aqueous urethane compound preferably contains a structure in which aromatics are bonded by methylene such as an aromatic-containing organic polyisocyanate such as diphenylmethanediisocyanate or polyphenylenepolymethylenepolyisocyanate and a blocking agent. The aqueous urethane compound is preferably a molecule having a relatively low to intermediate molecular weight region, and preferably the molecular weight is 9,000 or lower, and more preferably 5,000 or lower. As a compound containing a blocking agent of aromatic polyisocyanate, a blocked isocyanate compound containing a known isocyanate blocking agent is preferred.

The aqueous urethane compound is preferably an aqueous resin having in one molecule two or more thermally dissociating blocked isocyanate groups and a hydrophilic group obtained by treating a urethane prepolymer having a free isocyanate group, the resin being obtained by reacting an organic polyisocyanate compound whose number of functional groups is 3 to 5 and a compound having a molecular weight of 5,000 or lower and having two to four active hydrogen atoms with a thermally dissociating blocking agent which blocks an isocyanate group, and, a compound having at least one active hydrogen and at least one anionic, cationic or nonionic hydrophilic group.

More preferably, the aqueous urethane compound is preferably a water-dispersible or water-soluble aqueous resin based on a reaction product of: 40 to 85% by mass of an organic polyisocyanate compound ($\alpha$) having a molecular weight of 2,000 or lower and the number of functional groups of 3 to 5; 5 to 35% by mass of a compound ($\beta$) having a molecular weight of 5,000 or lower and having two to four active hydrogen atoms; 5 to 35% by mass of a thermally dissociating isocyanate group blocking agent ($\gamma$); 5 to 35% by mass of a compound ($\delta$) having at least one active hydrogen atom and at least one anionic, cationic or nonionic hydrophilic group; and 0 to 50% by mass of compound ($\epsilon$) containing other active hydrogen atoms other than the above, wherein the total of weight percents of ($\alpha$) to ($\epsilon$) is 100 based on the weights of ($\alpha$) to ($\epsilon$), and the amounts of these components are selected such that a thermally dissociating blocked isocyanate group (NCO, calculated setting molecular weight=42) is 0.5 to 11% by mass.

Further preferably, the aqueous urethane compound is a heat reactive water-soluble polyurethane compound represented by the formula below:

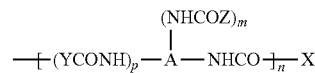

(wherein A represents an isocyanate residue of an organic polyisocyanate compound having the number of functional groups of 3 to 5; Y represents an active hydrogen residue of a blocking agent compound which detaches an isocyanate group by heat treatment; Z represents an active hydrogen residue of a compound having in the molecule at least one active hydrogen atom and at least one group which can generate a salt or a hydrophilic polyether chain; X represents an active hydrogen residue of a polyol compound having two to four hydroxyl groups and having an average molecular weight of 5,000 or smaller; n is an integer of 2 to 4; and p+m represents an integer of 2 to 4 (m≥0.25).).

Examples of a compound having the above-mentioned average molecular weight of 5,000 or lower and having two to four active hydrogen atoms include a compound selected from the group consisting of the below-mentioned (i) to (vii):
(i) polyhydric alcohols having two to four hydroxyl groups,
(ii) polyvalent amines having two to four primary and/or secondary amino group,
(iii) amino alcohols having two to four primary and/or secondary amino group and a hydroxyl group,
(iv) polyester polyols having two to four hydroxyl groups,
(v) polybutadiene polyols having two to four hydroxyl groups and copolymer of these and other vinyl monomer,
(vi) polychloroprene polyols having two to four hydroxyl groups and copolymer of these and other vinyl monomer,
(vii) polyether polyols having two to four hydroxyl groups which are C2 to C4 alkylene oxide polyaddition products of a polyvalent amine, a polyvalent phenol and amino alcohols, C2 to C4 alkylene oxide polyaddition products of C3 or higher polyhydric alcohols, a C2 to C4 alkylene oxide copolymer, or a C3 to C4 alkylene oxide polymer.

In the present invention, an active hydrogen residue of a polyol compound having two to four hydroxyl groups having an average molecular weight of 5,000 or lower can be used, and not particularly restricted as long as the compound is selected from the group consisting of the above-mentioned (i) to (vii).

Examples of the above-mentioned polyol compound having two to four hydroxyl groups and an average molecular weight of 5,000 or lower include polyols or the like as mentioned in the thermoplastic high molecular weight polymer having an average molecular weight of 5,000 or lower. When the polyol is a polyol compound containing a structure in which aromatics are bonded by methylene such as an ethylene oxide adduct of bisphenol A among the above-mentioned polyols, a structure in which aromatics are bonded by methylene can be introduced not only into a residue of an organic isocyanate of an aqueous urethane compound but also into an active hydrogen residue of polyols (Japanese Unexamined Patent Application Publication No. 2001-98245, [0095]).

Further, examples of a blocking agent compound which detaches an isocyanate group by the above-mentioned heat treatment include a known isocyanate blocking agent.

Specific examples of a synthesis method of an aqueous urethane compound include a known method such as a method described in Japanese Examined Patent Application Publication No. S63-51474. Other than a heat reactive aqueous urethane resin synthesized according to these methods, a product such as ELASTRON BN27 manufactured by Dai-ichi Kogyo Seiyaku Co., Ltd. may also be used.

The (D) aliphatic epoxide compound is contained as a cross-linking agent of an adhesive agent composition. An aliphatic epoxide compound is a compound which contains in one molecule preferably two or more, and more preferably four or more epoxy groups. This is because the more the epoxy group has functionalities, the higher the effect of inhibiting creep or flow of an adhesive agent composition at a high temperature region, and the adhesive strength at a high temperature becomes large.

As the above-mentioned compound containing two or more epoxy groups, reaction products of polyhydric alcohols and epichlorohydrin are preferred. Examples of the aliphatic epoxide compound include glycidyl esters of a fatty acid, glycidyl ethers of an aliphatic polyhydric alcohol, and cyclic aliphatic epoxide compounds. For the epoxide compound, in particular, a glycidyl ester of a long-chain fatty acid, a glycidyl ether of a polyhydric alcohol, or the like which is the above-mentioned flexible epoxy resin is preferably used.

Specific examples of the aliphatic epoxide compound include a reaction product of polyhydric alcohols such as diethylene glycol diglycidylether, polyethylene diglycidylether, polypropylene glycol diglycidylether, neopentylglycol diglycidylether, 1,6-hexanediol diglycidylether, glycerol polyglycidylether, trimethylolpropane polyglycidylether, polyglycerol polyglycidylether, pentaerythiol polyglycidylether, diglycerol polyglycidylether, and sorbitol polyglycidylether, and epichlorohydrin.

Among the reaction products of polyhydric alcohols and epichlorohydrin, polyglycerol polyglycidylether and sorbitol polyglycidylether are particularly preferred. This is because, since, in these compounds, the epoxy group is polyfunctional and decrease in adhesive strength at a high temperature by flow or creep due to a stress at an adhesive agent layer at a high temperature is small, and the compounds have a long chain flexible main skeleton structure and have a flexibility, curing and shrinkage of adhesive agent layer due to cross-linking rarely occur and decrease in the adhesive strength due to the internal strain stress becomes small. For the sorbitol polyglycidylether, polyglycerol polyglycidylether, or novolac type epoxy resin, commercially available chemical agents can be used.

Such aliphatic epoxide compounds may be used by dissolving them in water, or, dispersing them in water by emulsification. In order to obtain an emulsified liquid, for example, such a polyepoxide compound is dissolved in water as it is, or, a mixture obtained by dissolving the compound in a small amount of solvent as needed can be emulsified in water by using a known emulsifier such as an alkylbenzenesulfonic acid soda, a dioctyl sulphosuccinate sodium salt, or a nonylphenolethylene oxide adduct.

The epoxy-based adhesive agent composition of the present invention preferably further comprises at least one selected from the group consisting of (E) a metal salt, (F) a metal oxide, and (G) rubber latex. When the metal salt or the metal oxide among the above is contained in an adhesive agent composition as a filler, the cost thereof becomes favorable because the filler is inexpensive, and at the same time, these fillers can be used for the purpose of providing the adhesive agent composition with ductility or strong tenacity.

For the (E) metal salt and the (F) metal oxide, a polyvalent metal salt or a polyvalent metal oxide is preferred. The term "metal" herein includes metalloids such as boron and silicon. A polyvalent metal salt or a polyvalent metal oxide has, compared with a monovalent alkali such as sodium hydroxide, a small effect of deteriorating a resin material to be used as a base material such as polyester by alkaline hydrolysis, which is preferred. At the same time, an effect of cross-linking between polymers containing carboxyl groups in the adhesive agent composition by an ion bond interaction can be expected. Examples of the polyvalent metal salt include a divalent or higher valent sulfate, a nitric acid salt, acetate, a carbonic acid salt, chloride, hydroxide, silicate or the like of calcium, magnesium, zinc, barium, aluminium, iron, nickel or the like. Examples of the polyvalent metal oxide include oxides of magnesium, calcium, barium, zinc, aluminium, titanium, boron, silicon, bismuth, manganese, iron, nickel, or, bentonite, silica, zeolite, clay, talc, satin white, and smectite whose constituents are these oxides. Such fillers of metal salts or metal oxides are preferably added to the adhesive agent composition as a fine particle, and the average particle size thereof is preferably 20 μm or smaller, and particularly preferably 1 μm or smaller. Metal salts and metal oxides can be used by dispersing in water using a known surfactant or water-soluble polymer. In the present invention, a relatively stable water dispersion is obtained by using a water-soluble polymer as its protective colloid, but a method of obtaining a water dispersion is not particularly restricted thereto.

For the (G) rubber latex, a known rubber latex can be used. Examples thereof include vinylpyridine-conjugated diene copolymer latex and the modified latex thereof, styrene-butadiene copolymer latex and the modified latexes thereof, acrylonitrile-butadiene copolymer latex and modified latex thereof, and natural rubber latex. One or more of these can be contained. For the modified latexes, carboxyl modification or epoxy modification can be used.

The formulation ratio of the epoxy-based adhesive agent composition of the present invention is preferably selected as follows: the content of the (A) component is 10 to 75% by mass based on the dry weight of the adhesive agent composition, in particular 15 to 65% by mass, and further 20 to 55% by mass, the content of the (B) component is 5 to 75% by mass based on the dry weight of the adhesive agent composition, in particular 15 to 60% by mass, and further 18 to 45% by mass, the content of the (C) component is 15 to 77% by mass based on the dry weight of the adhesive agent composition, in particular 15 to 55% by mass, and further 18 to 55% by mass, and the content of the (D) component is 9 to 70% by mass based on the dry weight of the adhesive agent composition, in particular 10 to 45% by mass, and further 15 to 30% by mass.

The content of the (E) component which is an optional component is preferably 50% by mass or smaller based on the dry weight of the adhesive agent composition, and more preferably 3 to 40% by mass. The content of the (F) component is preferably 50% by mass or lower based on the dry weight of the adhesive agent composition, and more preferably 3 to 40% by mass. Further, the content of the (G) component is 18% by mass or lower based on the dry weight of the adhesive agent composition and more preferably 10% by mass or lower.

The epoxy-based adhesive agent composition of the present invention may further contains, in addition to the above-mentioned components (A) to (G), a solvent such as water or an organic solvent, a water-soluble resin or a water-dispersible resin such as a water-soluble and/or water-dispersible polyester resin, a water-soluble and/or water-dispersible nylon resin, an aqueous urethane resin having no cross-linking groups, or water-soluble cellulose copolymer. Such a water-soluble resin or a water-dispersible resin is usually contained by preferably by 30% by mass or smaller based on the dry weight of the adhesive agent composition, but the content is not limited thereto.

The above-mentioned epoxy-based adhesive agent composition has an effect in a method in which, for example, in the case of adhesion between an adherend of a synthesized resin material such as a synthesized fiber and an adherend of a rubber composition containing sulfur, a vulcanizing agent contained in any of the adherends migrates to the adhesive agent composition, whereby the adhesive agent composition is cross-linked by a vulcanizing agent.

Examples of the above-mentioned vulcanizing agent include sulfur; a thiuram polysulfide compound such as tetramethylthiuramdisulfide or dipentamethylene thiuram tetrasulfide; and an organic vulcanizing agent such as 4,4-dithiomorpholin, p-quinonedioxime, p,p'-dibenzoquinonedioxime or cyclic sulfur imide.

An adhesive agent treatment in which the above-mentioned epoxy-based adhesive agent composition is used can be performed in accordance with a conventional method, but not particularly restricted thereto. Examples of a method of coating an adhesive agent composition on a cord include a method of dipping a cord in an adhesive agent composition, a method of applying an adhesive agent composition using a brush, and a method of spraying an adhesive agent composition, and an appropriate method can be selected as needed. The method of coating an adhesive agent composition on the cord surface is not particularly restricted. When the adhesive agent composition is coated on the cord surface, the viscosity of the adhesive agent composition is preferably reduced by resolving in a variety of solvents since the application thereof becomes easy. Such a solvent is preferably mainly composed of water from the environmental point of view.

The cord which has been coated with an epoxy-based adhesive agent composition may be dried at a temperature of, for example, 100° C. to 210° C. The subsequent heat treatment is preferably performed at a temperature not lower than the glass-transition temperature of a polymer made of a resin material constituting the cord, and preferably at a temperature in the range of from [the melting temperature −70° C.] of the polymer to [the melting temperature −10° C.] of the polymer. This is because the bonding strength between the adhesive agent composition and the resin material can not be obtained since, when the temperature is lower than the glass-transition temperature of the polymer, the molecular mobility of the polymer is poor, and a sufficient interaction between a component in the adhesive agent composition which accelerates adhesion and the polymer can not be obtained. Such a resin material may be subjected in advance to a preprocessing treatment by an electron beam, a microwave, a corona discharge, a plasma treatment or the like. The dry weight of the adhesive agent composition with which the cord is coated is preferably 0.5 to 6.0% by mass with respect to the weight of the cord.

In the present invention, preferably an adhesive agent treatment is further performed on a cord treated with the above-mentioned epoxy-based adhesive agent composition by an RFL-based adhesive agent composition. After twisting the cord, an adhesive agent treatment is performed on the twisted cord by using the above-mentioned epoxy-based adhesive agent composition, then a treatment is further performed on the cord by using an RFL adhesive agent, whereby an more excellent dynamic adhesive property can be obtained. Usually, when the number of adhesive agent treatment steps is increased, the physical properties of the cord changes due to the effect of a warming step therebetween, which has not been considered to be preferred. According to the present invention, however, by combining an adhesive agent treatment by an epoxy-based adhesive agent composition and an adhesive agent treatment by an RFL adhesive agent on a cord using the above-mentioned specific polyester filament, a polyester cord having an excellent dynamic adhesive property to rubber can be obtained.

The above-mentioned adhesive agent treatment by an RFL adhesive agent can be performed in accordance with a conventional method, and not particularly restricted. For the RFL-based adhesive agent treatment liquid, for example, a resorcin-formalin initial condensate/rubber latex (for example, 30 to 60% emulsion of styrenebutadiene latex, vinylpyridine styrene butadiene terpolymer latex or the like)=1:2 to 1:20 (weight ratio) can be used. In addition to these component, as needed, a resorcin-formalin condensate obtained by a novolac forming reaction, a blocked isocyanate water dispersion containing a methylenediphenyl dipolyisocyanate, and an adhesive property improver having a structure in which aromatics are bonded by methylene can be added. When a cord is treated with an RFL-based adhesive agent treatment liquid, the dry weight of the RFL-based adhesive agent composition which coats the cord is set to 0.5 to 6.0% by mass, and preferably 2 to 6% by mass with respect to the weight of the cord. The treated cord can be dried at a temperature of, for example, 100 to 150° C., and then subjected to a heat treatment at a temperature of 200 to 250° C.

By a method in which a polyester cord obtained by performing an adhesive agent treatment by the above-mentioned epoxy-based adhesive agent composition, and preferably, RFL adhesive agent on the above-mentioned cord as mentioned above is embedded in an unvulcanized rubber to be vulcanized, or the like, a rubber-cord complex in which the cord and the rubber are rigidly bonded to each other can be obtained.

By using the above-mentioned epoxy-based adhesive agent composition as an adhesive agent composition, the adhesive property between the polyester cord and the rubber can be improved. In particular, the adhesive property between rubber/polyester cord at the time of high heat generation when a high-intensity dynamic strain is repeatedly applied can be dramatically improved. Accordingly, by applying the polyester cord to the reinforcing member, a tire having a more improved durability can be attained.

<RFL-Based Adhesive Agent Composition>

Examples of the adhesive agent composition used in the adhesive agent treatment of polyester cord used in the present invention also suitably include the below-mentioned specific RFL-based adhesive agent composition.

The RFL-based adhesive agent composition used in the present invention is an RFL adhesive agent liquid containing resorcin, formaldehyde, rubber latex, and further containing an emulsion-polymerized blocked isocyanate compound, and ammonia, wherein the content of the emulsion-polymerized blocked isocyanate compound is 15 to 45% by mass.

In the formulation using an RFL adhesive agent liquid and an emulsion-polymerized blocked isocyanate compound, by using only ammonia as a catalyst for the condensation reaction between resorcin and formaldehyde without using a metal catalyst such as sodium hydroxide, and further, by setting the content of the emulsion-polymerized blocked isocyanate compound in the above-mentioned range, an RFL-based adhesive agent composition by which a tire reinforcing polyester cord having adhesion fatigue property and heat resistant adhesive property in rubber is obtained by one-bath treatment can be attained.

In the present invention, ammonia is used as a reaction catalyst because a metal compound catalyst such as sodium hydroxide promotes curing of an RFL adhesive agent resin, and is not suitable for ensuring the flexibility of a metal compound catalyst. Ammonia is used as a reaction catalyst also because a metal compound catalyst promotes deterioration of rubber or a cord since the metal compound catalyst is strongly basic. In contrast, since ammonia is weakly basic, a curing reaction proceeds at an appropriate rate. By this, the flexibility of the adhesive agent can be retained. Since ammonia can be removed from the system of an ammonia resol resin by vaporization, physical softening and rubber deterioration by a base can be inhibited.

The content of emulsion-polymerized blocked isocyanate compound is set to 15 to 45% by mass because when the content of the emulsion-polymerized blocked isocyanate is higher than 45% by mass, the adhesive agent composition becomes hard although the adhesive strength is sufficiently obtained, and the workability during manufacturing a tire becomes hard to be ensured, as well as the amount is not preferred from the viewpoint of the cost. On the other hand, the content of the emulsion-polymerized blocked isocyanate compound is less than 15% by mass, the affinity to an inactive cord such as polyester becomes insufficient, which makes it difficult to ensure the adhesive strength. The above-mentioned content is preferably 20 to 40% by mass. When the blocked isocyanate compound is emulsion polymerized, an effect that a blocked isocyanate compound is not precipitated during the adhesive agent treatment, and that workability can be ensured can be obtained.

In the present invention, ammonia is preferably added to the RFL-based adhesive agent composition at a rate of 0.5 to 5.0 mol to 1.0 mol of resorcin. When the amount of ammonia added to 1.0 mol of resorcin is smaller than 0.5 mol, the effect of resorcin resin catalyst is not sufficient, and it takes time for an aging reaction, and thus the adhesive property may not be ensured since the aging reaction does not proceed sufficiently. Since the amount of the ammonia resol is small, the adhesive agent resin may be cured. On the other hand, when the amount of ammonia added is larger than 5.0 mol, the reaction system is promoted, which may deteriorate the flexibility of adhesive agent resin.

In the present invention, the rubber latex is preferably a copolymer rubber latex of vinylpyridine, styrene and butadiene, and more preferably, is copolymer rubber latex having a double structure composed of two-stage polymerization of vinylpyridine, styrene and butadiene.

The copolymer rubber latex having a double structure composed of two-stage polymerization of vinylpyridine, styrene and butadiene is a copolymer rubber latex of vinylpyridine, styrene, and butadiene, which can be obtained by (i) polymerizing a monomer mixture constituted by styrene content of 10 to 60% by mass, butadiene content of less than 60% by mass and vinylpyridine content of 0.5 to 15% by mass, and then (ii) polymerizing a monomer mixture constituted by a styrene content of 10 to 40% by mass, butadiene content of 45 to 75% by mass and vinylpyridine content of 5 to 20% by mass, in a smaller styrene content than in (i).

In the present invention, further preferably, for the rubber latex, a core-shell type copolymer rubber latex of vinylpyridine, styrene, and butadiene having a styrene-rich core is used. By using a core-shell type rubber latex having a styrene-rich core, The adhesion deterioration speed of an RFL formulation containing isocyanate which has a high cross-linking property and whose reaction easily proceeds can be restricted, and heat resistant adhesive property in rubber can be favorably ensured.

In the present invention, the blocking agent dissociating temperature of a blocked isocyanate compound is preferably 150° C. to 210° C. When an adhesive agent treatment of an organic fiber cord is performed, a step of drying treatment is performed at 150° C. or higher in many cases. Accordingly, by setting the blocking agent dissociating temperature of a blocked isocyanate compound in the adhesive agent liquid of the present invention to 150° C. or higher, and thus setting both the temperatures to 150° C. or higher, it is inhibited that an adhesive agent composition remains behind at the center of the cord. As the result, the adhesive agent composition can be coated uniformly on the outside of the tire cord, whereby the heat resistant adhesive property in rubber can be further improved. When the blocking agent dissociating temperature of the blocked isocyanate compound is higher than 210° C., since the adhesive agent liquid surface dries first, then the adhesive agent composition inside dries later, many resin scales which are called "egg blister" may be generated. Accordingly, the dissociating temperature of a blocking agent of a blocked isocyanate compound is preferably 210° C. or lower.

In the present invention, the RFL adhesive agent liquid is not particularly restricted, and a known RFL adhesive agent liquid can be used. For example, an RFL adhesive agent liquid satisfying the expression below (1) and (2):

$$1/2.3 \leq R/F \leq 1/1.1 \tag{1}$$

$$1/10 \leq RF/L \leq 1/4 \tag{2}$$

letting the molar ratio of the total amount of resorcin/formaldehyde be R/F, and letting the ratio of the total mass of resorcin and formaldehyde to the total mass of the solid of the rubber latex be RF/L, can be preferably used.

The adhesive agent treatment using the above-mentioned RFL-based adhesive agent composition can be performed in accordance with a conventional method, and not particularly restricted. Specifically, an adhesive agent treatment can be performed by at least employing an impregnation step in which a cord is impregnated with the above-mentioned RFL-based adhesive agent composition and a drying step in which the obtained cord is dried. For example, a cord fed by an unwinding apparatus is dipped in the above-mentioned RFL-based adhesive agent composition, and the cord is impregnated with the adhesive agent composition, and then, the cord is transferred to a drying zone to dry the cord; next, the dried cord is passed to a heat set zone and a normalizing zone, subjected to a heat treatment, and the cord is wound after cooling, thereby obtaining a cord on which adhesive agent treatment is performed.

A method of coating an RFL-based adhesive agent composition on a cord is not particularly restricted, and examples thereof include a method in which a cord is dipped in an adhesive agent composition, and also include brush painting, casting, spraying, roll coating, and knife coating. In particular, when a method in which a cord is dipped in an RFL-based adhesive agent composition, it is preferable that the above-mentioned RFL-based adhesive agent composition is diluted and a cord is impregnated therewith, then the obtained organic fiber cord is dried. By this, a cord having adhesion fatigue property and heat resistant adhesive property in rubber can be obtained by one-bath treatment A cord coated with an RFL-based adhesive agent composition can be dried at a temperature of, for example, 150 to 210° C. As mentioned above, the blocking agent dissociating temperature of a blocked isocyanate compound in an RFL-based adhesive agent composition used in the present invention is suitably 150 to 210° C. Accordingly, by setting the drying temperature to 150 to 210° C., it is inhibited that an RFL-based adhesive agent composition remains behind at the center of the cord, the outside of the cord can be coated with the RFL-based adhesive agent composition uniformly. By this, the heat resistant adhesive property in rubber can be favorably improved.

During the adhesive agent treatment, the cord tension T at the time of impregnation can be set to 0.3 g/d or lower, preferably 0.2 g/d or lower, and more preferably 0.1 g/d or lower. Further, in a heat treatment composed of heat-setting and normalizing, the treatment temperature can be set to 210 to 250° C., the treatment time to 30 to 120 seconds, and the cord tension to 0.05 to 1.20 g/d for each.

As mentioned above, by a method in which a polyester cord obtained by performing an adhesive agent treatment using the above-mentioned RFL-based adhesive agent composition on the above-mentioned cord is embedded in an unvulcanized rubber to be vulcanized, or the like, a rubber-cord complex in which the cord and the rubber are rigidly bonded to each other can be obtained.

By using the above-mentioned RFL-based adhesive agent composition as an adhesive agent composition, the adhesive property between the polyester cord and the rubber can be improved. In particular, the adhesive property between rubber/polyester cord at the time of high heat generation when a high-intensity dynamic strain is repeatedly applied can be dramatically improved. Accordingly, by applying the polyester cord to the reinforcing member, a tire having a more improved durability can be attained.

In the tire of the present invention, such a rubber-cord complex can be preferably used for a carcass ply cord, a reinforcing member of a belt reinforcing layer, an insert of a bead portion, or the like because the heat resistant adhesive property with rubber is excellent.

Although one carcass ply 2 is used in the illustrated example, the number of the carcass ply 2 is not limited thereto, and two or more carcass plies 2 may be used. The structure thereof is also not restricted. The locking structure of the carcass ply 2 at a bead portion is also not limited to the structure in which, as illustrated in the figure, the carcass is rolled up around the bead core 1 and locked, and may be a structure in which the end portion of the carcass ply is sandwiched by two bead cores (not illustrated). When a reinforcing member composed of the above-mentioned rubber-cord complex is applied to a carcass ply 2, the end count can be set to, for example, 35 to 65/50 mm. In a tire in which a conventional PET is applied to a carcass ply, during a high-speed drum durability test when a camber angle is provided, a shoulder portion breaks in rare cases to expose a carcass ply, leading to breaking. By applying a reinforcing member composed of a polyester filament of the present invention, the breaking pattern after the above-mentioned durability test is improved, and changed into a tread portion failure, thereby improving the high-speed durability.

Belts 3a, 3b are each composed of a rubberized layer of cords, preferably, a rubberized steel cord layer, the cord extending inclined at an angle of, for example, ±15 to 40° with respect to the tire circumferential direction. Although, in the illustrated example, two belts 3a, 3b are laminated such that cords which constitute each belt crosses with each other sandwiching the tire equatorial plane to constitute a cross layer, in the present embodiment, those in which at least one belt is arranged may be used, and not limited to the illustrated example.

In the illustrated example, the belt reinforcing layer is composed of one cap layer 4 arranged across the full width or more of the belt 3 and a pair of layered layers 5 arranged in a region covering both end portions of the belt 3, but the structure thereof is not limited thereto, and only a cap layer 4 or a layered layer 5, or, two or more cap layers 4 and/or two or more layered layer 5 may also be used. Such a belt reinforcing layer can be formed by, for example, spirally winding strips at a regular interval formed by orienting a plurality of organic fiber cords and rubberizing them in the tire circumferential direction. When a reinforcing member composed of the above-mentioned rubber-cord complex is applied to a belt reinforcing layer, the end count can be set to, for example, 35 to 65/50 mm. Conventionally, when PET is applied to a belt reinforcing layer, the adhesive property is poorer than that of nylon, and thus the high-speed durability performance becomes poor. By applying a reinforcing member composed of a polyester filament of the present invention to the belt reinforcing layer, the high-speed durability performance can achieve the same level as that of nylon.

As illustrated in the figure, an insert 6 can be arranged at a bead portion 11 outside of the carcass ply 2, and is composed of a rubberized layer of a reinforcing cord. When a reinforcing member composed of the above-mentioned rubber-cord complex is applied to the insert, the end count thereof may be set to, for example, 35 to 65/50 mm. When a conventional PET is applied to the insert, the adhesive property becomes insufficient, which has led to the occurrence of insert failure in a bead portion durability drum test. By applying an insert to a reinforcing member composed of a polyester filament of the present invention, a breaking pattern is improved, and the durability performance level in a bead portion durability drum test improves.

Further, although not illustrated, in the present embodiment, on the innermost layer of a tire, an inner liner is usually arranged, and on a tread surface, a tread pattern is appropriately formed. Still further, in the tire of the present embodiment, as a gas with which the inside of the tire is filled, a normal air or an air whose oxygen partial pressure is changed, or an inert gas such as nitrogen can be used.

Second Embodiment

Figure 2:
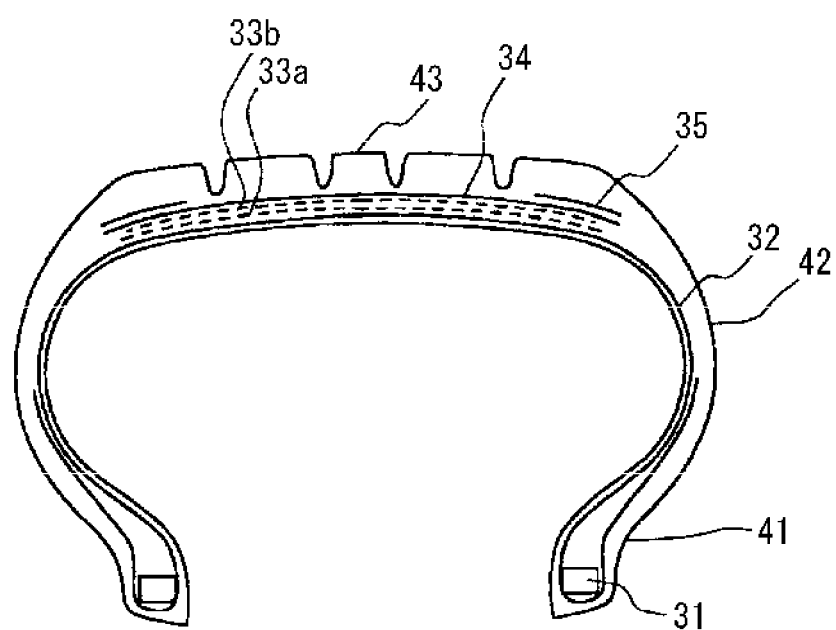
FIG. 2 is a cross-sectional view in the width direction illustrating another example of a tire of the present invention.

FIG. 2 is a cross-sectional view in the width direction illustrating another example of a tire of the present invention. The illustrated tire comprises a pair of left-and-right bead portions 41 in which a bead core 31 is embedded and a pair of side wall portions 42, and a tread portion 43 continuing to both side wall portions 42, and further comprises a carcass ply 32 toroidally extending between a pair of left-and-right bead cores 31 to reinforce these portions. On the outside of the crown portion of the carcass ply 32, two belts 33a, 33b made of a rubberized reinforcing cord layer in which the cords are arranged inclined with respect to the tire circumferential direction, and belt reinforcing layers 34, 35 made of a rubberized organic fiber cord layer in which the cords are arranged substantially parallel to the tire circumferential direction are arranged.

In the tire of the present embodiment, the carcass ply 32 is composed of a rubberized layer of a polyester cord formed by twisting the above-mentioned specific polyester filament and then subjecting the twisted filament to an adhesive agent treatment by using the above-mentioned epoxy-based adhesive agent composition or the above-mentioned RFL-based adhesive agent composition. By this, the adhesive property between the polyester cord and the rubber can be improved, and in particular, the adhesive property between rubber/polyester cord at the time of high heat generation when a high-intensity dynamic strain is repeatedly applied can be dramatically improved. Accordingly, by applying the polyester cord to a carcass ply, the occurrence of delamination fracture during a high-speed durability performance test when a camber angle is provided can be inhibited, thereby attaining a tire whose durability is improved. The effect of inhibiting the occurrence of delamination fracture of the carcass ply during the above-mentioned high-speed durability performance test is not sufficiently obtained when using the combination of a specific polyester filament of the present invention and a conventionally general adhesive agent or when using the combination of a conventionally general polyester fiber and a specific adhesive agent composition of the present invention.

In the present embodiment, the twisting coefficient Nt defined by the formula of the above-mentioned polyester cord which is to be applied to a carcass ply 32 below:

$$Nt = \tan\theta = 0.001 \times N \times (0.125 \times D/\rho)^{1/2} \quad (1)$$

(wherein N represents the number of twist (/10 cm), ρ represents the density of the cord (g/cm³), D is the total decitex (dtex) of the cord) is preferably from 0.40 to 0.60. When the twisting coefficient Nt is less than 0.40, the cord fatigability deteriorates, and when the twisting coefficient Nt is higher than 0.60, the cord strength decreases, thereby deteriorating the cut performance, each of which is not preferred.

In the present embodiment, the total fineness of the above-mentioned polyester cord is preferably 2000 dtex to 5100 dtex. When the total fineness is less than 2000 dtex the cord strength is insufficient; when the total fineness is higher than 5100 dtex, an irregularity occurs on the tire side portion, each of which is not preferred.

Further, in the present embodiment, the melting point of the above-mentioned polyester cord is preferably, 220° C. or higher, and more preferably in a range of 240 to 270° C. When the melting point of the above-mentioned polyester cord is lower than 220° C., the breaking pattern during a high-speed durability performance test deteriorates, which is not preferred.

Although one carcass ply 32 is used in the illustrated example, the number of the carcass ply 32 is not limited thereto, and two or more carcass plies 32 may be used. The structure thereof is also not restricted. In either case, in the present embodiment, the above-mentioned polyester cord needs to be applied to all carcass plies. The locking structure of the carcass ply 32 at a bead portion is also not limited to the structure in which, as illustrated in the figure, the carcass is rolled up around the bead core 31 and locked, and may be a structure in which the end portion of the carcass ply is sandwiched by two bead cores (not illustrated). In the present embodiment, the end count of the above-mentioned polyester cord in the carcass ply 32 may be set to 35 to 65/50 mm.

Belts 33a, 33b are each composed of a rubberized layer of cords, preferably, a rubberized steel cord layer, the cord extending inclined at an angle of, for example, ±15 to 40° with respect to the tire circumferential direction. Although, in the illustrated example, two belts 33a, 33b are laminated such that cords which constitute each belt crosses with each other sandwiching the tire equatorial plane to constitute a cross layer, in the present embodiment, those in which at least one belt is arranged may be used, and not limited to the illustrated example.

In the illustrated example, the belt reinforcing layer is composed of one cap layer 34 arranged across the full width or more of the belt 33a, 33b, and a pair of layered layers 35 arranged in a region covering both end portions of the belt 33a, 33b, but the structure thereof is not limited thereto, and only a cap layer 34 or a layered layer 35, or, two or more cap layers 34 and/or two or more layered layer 35 may also be used. Such a belt reinforcing layer can be formed by, for example, spirally winding strips at a regular interval formed by orienting a plurality of organic fiber cords and rubberizing them in the tire circumferential direction.

Further, although not illustrated, in the present embodiment, on the innermost layer of a tire, an inner liner is usually arranged, and on a tread surface, a tread pattern is appropriately formed. Still further, in the tire of the present embodiment, as a gas with which the inside of the tire is filled, a normal air or an air whose oxygen partial pressure is changed, or an inert gas such as nitrogen can be used.

The present embodiment is useful for, in particular, a tire having a speed rating code of V or higher which can travel at high-speed.

Third Embodiment

Figure 3:
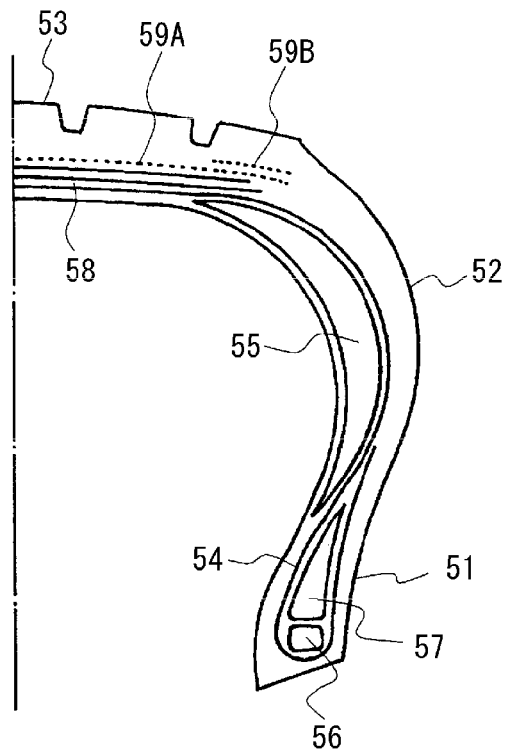
FIG. 3 is a half cross-sectional view in the width direction illustrating still another example of a tire of the present invention.

FIG. 3 is a half cross-sectional view in the width direction of still another example of a tire of the present invention. As illustrated, the tire of the present embodiment is a so-called run-flat tire which comprises a pair of left-and-right bead portions 51 and a pair of side wall portions 52 continuing from each bead portion 51 outside in the tire radial direction, and a tread portion 53 extending between a pair of side wall portions 52 to form a contacting portion, and further comprises a carcass 54 composed of one or more carcass plies toroidally extending between a pair of bead portions 51 to reinforce these portions, 51, 52, 53, and a side reinforcing rubber layer 55 having a crescent shaped cross-section arranged at the side wall portion 52 inside a carcass 54.

In the illustrated tire, a bead filler 57 is arranged on the outside in the tire radial direction of a ring-shaped bead core 56 each embedded in the bead portion 51, and on the outside in the tire radial direction of a crown portion of the carcass 54, a belt 58 composed of two belt layers is arranged. Further, on the outside in the tire radial direction of the belt 58, a belt reinforcing layer (cap layer) 59A covering the whole belt 58, and a pair of belt reinforcing layer (layered layer) 59B covering only both the end portions of the belt reinforcing layer 59A are arranged.

In the tire of the present embodiment, the carcass ply is composed of a rubberized layer of a polyester cord formed by twisting the above-mentioned specific polyester filament and then subjecting the twisted filament to an adhesive agent treatment by using the above-mentioned epoxy-based adhesive agent composition or the above-mentioned RFL-based adhesive agent composition. By this, the adhesive property between the polyester cord and the rubber can be improved, and in particular, the adhesive property between rubber-polyester cord at the time of high heat generation when a high-intensity dynamic strain is repeatedly applied can be dramatically improved. Accordingly, by applying the polyester cord to a carcass ply, the occurrence of delamination fracture during a run-flat travel can be inhibited, thereby attaining a run-flat tire whose durability is improved. The effect of inhibiting the occurrence of delamination fracture of the carcass ply during the above-mentioned run-flat travel is not sufficiently obtained when using the combination of a specific polyester filament of the present invention and a conventionally general adhesive agent or when using the combination of a conventionally general polyester fiber and a specific adhesive agent composition of the present invention.

In the present embodiment, the twisting coefficient Nt defined by the formula of the above-mentioned polyester cord which is to be applied to a carcass ply below:

$$Nt = \tan \theta = 0.001 \times N \times (0.125 \times D/\rho)^{1/2} \quad (1)$$

(wherein N represents the number of twist (/10 cm), $\rho$ represents the density of the cord (g/cm$^3$), D is the total decitex (dtex) of the cord) is preferably from 0.40 to 0.55. When the twisting coefficient Nt is less than 0.40, the cord fatigability deteriorates, and when the twisting coefficient Nt is higher than 0.55, the cord strength decreases, thereby deteriorating the cut performance, each of which is not preferred.

In the present embodiment, the total fineness of the above-mentioned polyester cord is preferably 2000 dtex to 5100 dtex. When the total fineness is less than 2000 dtex the cord strength is insufficient; when the total fineness is higher than 5100 dtex, an irregularity occurs on the tire side portion, each of which is not preferred.

Further, in the present embodiment, the melting point of the above-mentioned polyester cord is preferably, 220° C. or higher, and more preferably in a range of 240 to 270° C. When the melting point of the above-mentioned polyester cord is lower than 220° C., the polyester cord melts during the run-flat travel, and the run-flat durability decreases, which is not preferred.

In the run-flat tire of the present embodiment, only that the conditions of the above-mentioned carcass ply cord are satisfied is important. Other conditions such as the detail structure of the tire or the material of each member are not particularly restricted, and the tire can be constituted by appropriately selecting conventionally known conditions.

Although, for example, the carcass 54 is constituted by one carcass ply formed by coating a plurality of reinforcing cords arranged in parallel with a coating rubber, and, in the illustrated example, is composed of a body portion toroidally extending between a pair of bead cores 56 each embedded in the bead portion 51, and a turn-up portion rolled up from the inside to the outside in the tire width direction and outward in the tire radial direction around each of the bead cores 56, the number of plies and the structure of the carcass 54 of the tire of the present embodiment is not limited thereto. In either case, in the present embodiment, the above-mentioned polyester cord needs to be applied to all carcass plies. In the present embodiment, the end count of the above-mentioned polyester cord in the carcass ply may be set to 35 to 65/50 mm.

A belt layer is usually composed of a rubberized layer of cords, preferably, a rubberized steel cord layer, the cord extending inclined at an angle of, for example, 10° to 40° with respect to the tire equatorial plane, and two belt layers are laminated such that cords which constitute a belt layer crosses with each other sandwiching the tire equatorial plane to constitute a belt 58. Although, in the illustrated example, the belt 58 is composed of two belt layers, in the pneumatic tire of the present embodiment, the number of the belt layers which constitute the belt 58 is not limited thereto. Further, although the belt reinforcing layers 59A, 59B are usually composed of a rubberized cord layer, the cords being arranged substantially in parallel with respect to the tire circumferential direction, in the present embodiment, the arrangement of the belt reinforcing layers 59A, 59B is not indispensable, and a belt reinforcing layer having another structure can also be arranged.

Still further, in the present embodiment, on the surface of a tread portion 53, a tread pattern is appropriately formed, and, on the innermost layer of a tire, an inner liner is usually arranged (not illustrated). Still further, in the tire of the present embodiment, as a gas with which the inside of the tire is filled, a normal air or an air whose oxygen partial pressure is changed, or an inert gas such as nitrogen can be used.

Fourth Embodiment

Figure 4:
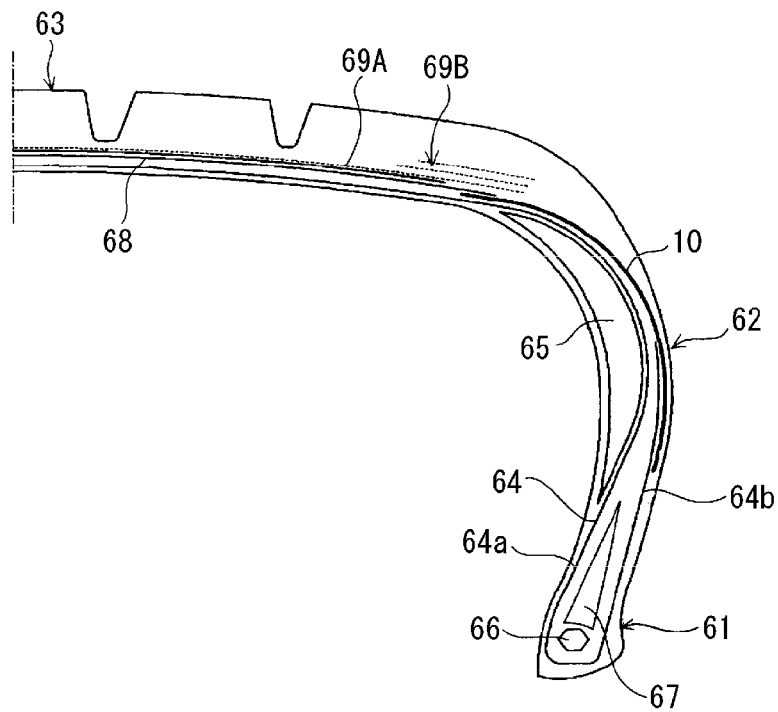
FIG. 4 is a half cross-sectional view in the width direction illustrating still another example of a tire of the present invention.

FIG. 4 is a half cross-sectional view in the width direction of still another example of a tire of the present invention. As illustrated, the tire of the present embodiment is a so-called run-flat tire which comprises a pair of left-and-right bead portions 61 and a pair of side wall portions 62 continuing from each bead portion 61 outside in the tire radial direction, and a tread portion 63 extending between a pair of side wall portions 62 to form a contacting portion. The tire of the present embodiment further comprises a carcass 64 composed of one or more carcass plies toroidally extending between a pair of bead cores 61 to reinforce these portions, 61, 62, 63, and a side reinforcing rubber layer 65 having a crescent shaped cross-section arranged at the side wall portion 62 inside a carcass 64.

In the illustrated tire, a bead filler 67 is arranged on the outside in the tire radial direction of a ring-shaped bead core 66 each embedded in the bead portion 61, and on the outside in the tire radial direction of a crown portion of the carcass 64, a belt 68 composed of two belt layers is arranged. Further, on the outside in the tire radial direction of the belt 68, a belt reinforcing layer 69A covering the whole belt 68, and a pair of belt reinforcing layer 69B covering only both the end portions of the belt reinforcing layer 69A are arranged.

In the run-flat tire of the present embodiment, one or more, preferably one to two reinforcing cord layers 10 are arranged at least outside at the tire maximum width position in the tire width direction of the carcass 64. By arranging the reinforcing cord layer 10 at least at the tire maximum width position, distortion of the tire side portion during run-flat travelling can be inhibited, thereby improving the run-flat durability performance.

Although one reinforcing cord layer 10 is arranged in the illustrated example, two or more reinforcing cord layers 10 may also be used, and the number of layers is not particularly restricted. The cord angle of the reinforcing cord layer 10 is preferably smaller than 10° with respect to the tire radial direction. When the cord angle is larger than 10°, normally, the vertical strength of spring when the tire is inflated to an inner pressure deteriorates, which may compromise the riding comfort. The end count of the cords of the reinforcing cord layer 10 may be set to 35 to 60/50 mm.

Figure 5:
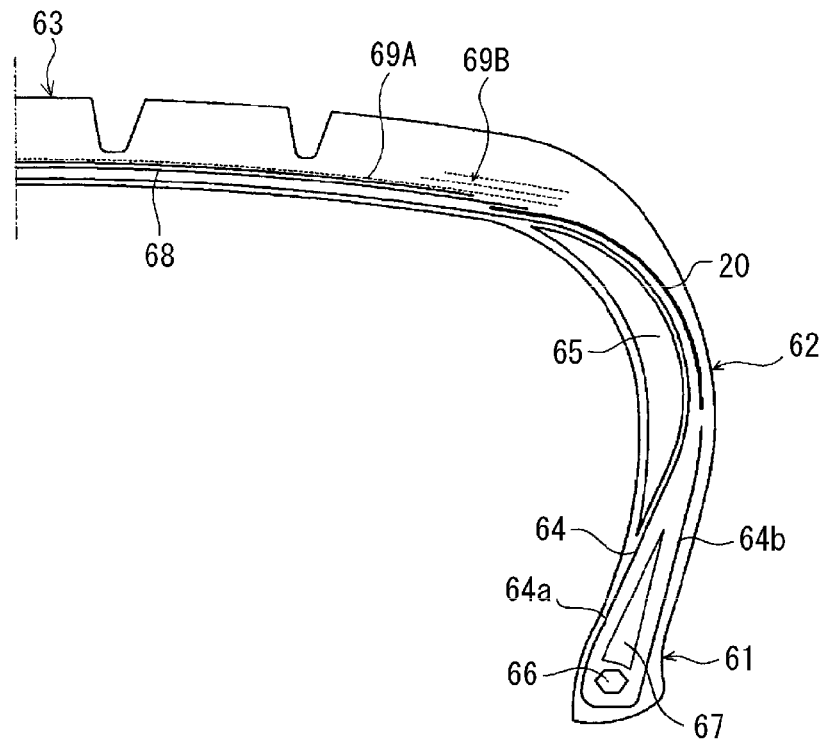
FIG. 5 is a half cross-sectional view in the width direction illustrating still another example of a tire of the present invention.
Figure 6:
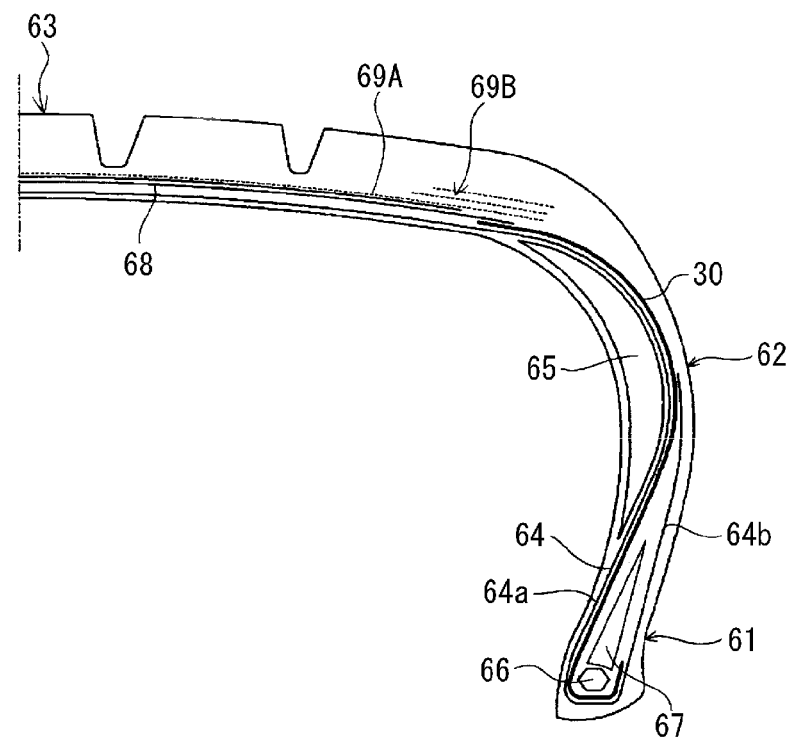
FIG. 6 is a half cross-sectional view in the width direction illustrating still another example of a tire of the present invention.
Figure 7:
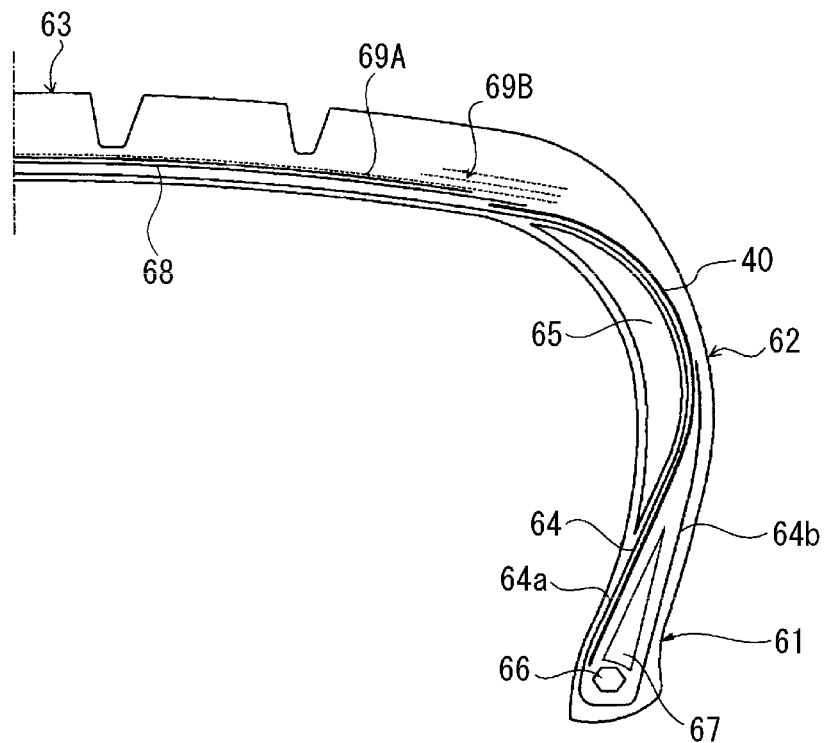
FIG. 7 is a half cross-sectional view in the width direction illustrating still another example of a tire of the present invention.
Figure 8:
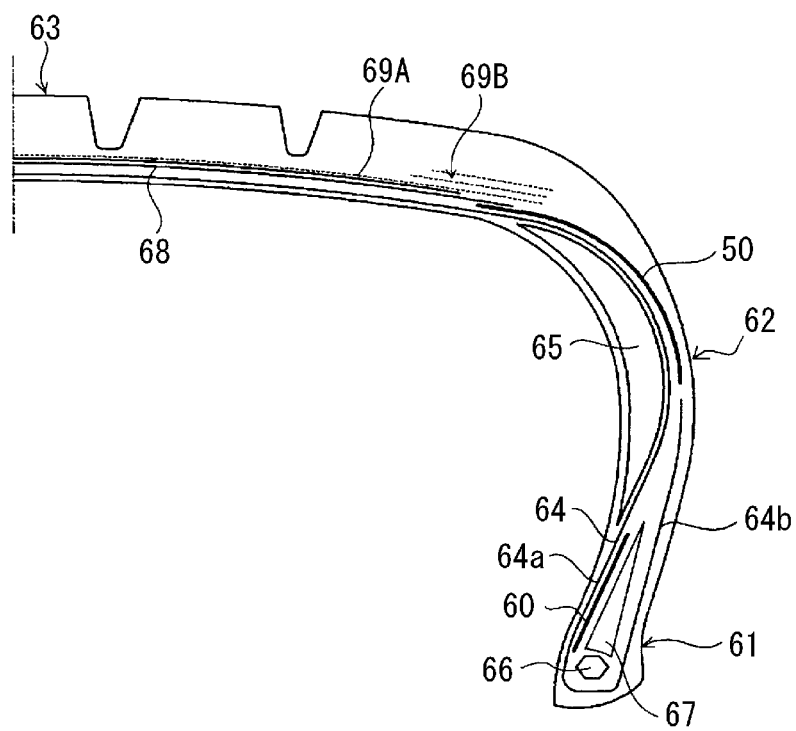
FIG. 8 is a half cross-sectional view in the width direction illustrating still another example of a tire of the present invention.

In the example illustrated in FIG. 4, although the reinforcing cord layer 10 is arranged from the end portion of the belt 68 to a position which exceeds the maximum width portion of the tire side portion such that the layer covers the outside of a turn-up portion 64b of the carcass 64, the arrangement region of the reinforcing cord layer 10 is not limited thereto as long as the layer is arranged at least at the tire maximum width position. For example, as illustrated in FIG. 5, the reinforcing cord layer 20 may also be arranged from the end portion of the belt 68 to the end portion of a turn-up portion 64b of a carcass 64 in the tire side portion at the maximum width portion, and in this case, particularly a reinforcement effect against bending of the side reinforcing rubber layer 65 can be obtained. As illustrated in FIG. 6, the reinforcing cord layer 30 can be extended from the end portion of the belt 68 along a body portion 64a and turn-up portion 64b of the carcass 64 to the outside of the bead core 66 in the tire width direction, and in this case, particularly a reinforcement effect against bending of the body portion 64a of the carcass 64 and the side reinforcing rubber layer 65 can be obtained. Further, as illustrated in FIG. 7, the reinforcing cord layer 40 can be extended from the end portion of the belt 68 along a body portion 64a of the carcass 64 to the outside end of the bead core 66 in the tire radial direction, and in this case, particularly a reinforcement effect against bending of the body portion 64a of the carcass 64 at the side wall portion and the side reinforcing rubber layer 65 can be obtained. Still further, as illustrated in FIG. 8, the reinforcing cord layers 50, 60 may also be arranged on both a region from the end portion of the belt 68 to the end portion of a turn-up portion 64b of a carcass 64 in the tire side portion at the maximum width portion and a region along the inside of the bead filler 67 in the tire width direction, and in this case, particularly a reinforcement effect against bending of the side reinforcing rubber layer 65 and the bead portion 61 can be obtained.

In the tire of the present embodiment, the above-mentioned reinforcing cord layer is composed of a rubberized layer of a polyester cord formed by twisting the above-mentioned specific polyester filament and then subjecting the twisted filament to an adhesive agent treatment by using the above-mentioned epoxy-based adhesive agent composition or the above-mentioned specific RFL-based adhesive agent liquid. By this, the adhesive property between the polyester cord and the rubber can be improved, and in particular, the adhesive property between rubber-polyester cord at the time of high heat generation when a high-intensity dynamic strain is repeatedly applied can be dramatically improved. Accordingly, by applying the polyester cord to a reinforcing cord layer, the occurrence of delamination fracture during a run-flat travel can be inhibited, thereby attaining a run-flat tire whose durability is improved. The effect of inhibiting the occurrence of delamination fracture of the reinforcing cord layer during the above-mentioned run-flat travel is not sufficiently obtained when using the combination of a specific polyester filament of the present invention and a conventionally general adhesive agent or when using the combination of a conventionally general polyester fiber and a specific adhesive agent composition of the present invention.

In the present embodiment, the twisting coefficient Nt defined by the formula of the above-mentioned polyester cord which is to be applied to the above-mentioned reinforcing cord layer below:

$$Nt=\tan\theta=0.001\times N\times(0.125\times D/\rho)^{1/2} \tag{1}$$

(wherein N represents the number of twist (/10 cm), ρ represents the density of the cord (g/cm³), D is the total decitex (dtex) of the cord) is preferably from 0.20 to 0.55. When the twisting coefficient Nt is less than 0.20, the cord converging characteristic becomes low, and the run-flat durability performance may deteriorate, and when the twisting coefficient Nt is higher than 0.55, the cord tensile rigidity decreases, thereby deteriorating the run-flat durability performance, each of which is not preferred.

In the present embodiment, the total fineness of the above-mentioned polyester cord is preferably 2000 dtex to 5100 dtex. When the total fineness is less than 2000 dtex the cord strength is insufficient; when the total fineness is higher than 5100 dtex, an irregularity occurs on the tire side portion, each of which is not preferred.

In the run-flat tire of the present embodiment, only that the conditions of a polyester cord used for the above-mentioned reinforcing cord layer are satisfied is important. Other conditions such as the detail structure of the tire or the material of each member are not particularly restricted, and the tire can be constituted by appropriately selecting conventionally known conditions.

In the illustrated example, for example, the carcass 64 is constituted by one carcass ply formed by coating a plurality of reinforcing cords arranged in parallel with a coating rubber, and is composed of a body portion 64a toroidally extending between a pair of bead cores 66 each embedded in the bead portion 61, and a turn-up portion 64b rolled up from the inside to the outside in the tire width direction and outward in the tire radial direction around each of the bead cores 66. Although the illustrated carcass 64 of a tire is composed of one carcass ply, in the present embodiment, the number of carcass plies constituting the carcass 64 is not limited thereto, and two or more carcass plies may be used. The structure thereof is also not particularly restricted. The locking structure of the carcass 64 at a bead portion is also not restricted to a structure in which, as illustrated, the carcass is rolled up around the bead core to be locked, and may be a structure in which the end portion of the carcass is sandwiched by two bead cores (not illustrated). In the present embodiment, as a cord constituting a carcass ply, a polyethylene terephthalate (PET) cord and a cellulose fiber cord can be preferably used.

A belt layer is usually composed of a rubberized layer of cords, preferably, a rubberized steel cord layer, the cord extending inclined at an angle of, for example, 10° to 40° with respect to the tire equatorial plane, and two belt layers are laminated such that cords which constitute a belt layer crosses with each other sandwiching the tire equatorial plane to constitute a belt 68. Although, in the illustrated example, the belt 68 is composed of two belt layers, in the pneumatic tire of the present embodiment, the number of the belt layers which constitute the belt 68 is not limited thereto. Further, although the belt reinforcing layers 69A, 69B are usually composed of a rubberized cord layer, the cords being arranged substantially in parallel with respect to the tire circumferential direction, and in the illustrated example, the belt reinforcing layers is constituted by a belt reinforcing layer 69A covering the whole of the belt 68, and two pairs of belt reinforcing layers 69B covering only both the end portions thereof to form a so-called cap layer structure, in the present embodiment, the arrangement of the belt reinforcing layers 69A, 69B is not indispensable, and belt reinforcing layers having another structure in another number of layers can also be arranged.

Still further, in the present embodiment, on the surface of a tread portion 63, a tread pattern is appropriately formed, and, on the innermost layer of a tire, an inner liner is usually arranged (not illustrated). Further, in the tire of the present embodiment, as a gas with which the inside of the tire is filled, a normal air or an air whose oxygen partial pressure is changed, or an inert gas such as nitrogen can be used.

EXAMPLES

The present invention will now be described in detail by way of Examples.

Example 1-1

Manufacturing of Polyester Fiber

By using a polyethylene terephthalate chip having a high carboxy group terminal having an intrinsic viscosity of 1.03, high-speed spinning by a melt spinning method and multi-stage stretching were performed, and an epoxy treatment was performed on the surface thereof to prepare a below-mentioned polyester fiber. Meanwhile, 0.2 parts by mass of the oil agent used for the epoxy treatment was attached to 100 parts by mass of the fiber, and the amount of polyglycerolpolyglycidylether which was an epoxy compound component to the surface of the fiber was 0.12% by mass.

The polyester fiber had physical properties, an intrinsic viscosity of 0.91, a fineness of 1130 dtex, 384 filament, a strength of 6.9 cN/dtex, a degree of elongation of 12%, and a degree of a dry heat shrinkage of 10.5%, an amount of terminal carboxy group of 22 equivalent/ton, the long period according to small-angle X-ray diffraction of 10 nm, the amount of terminal carboxy group on the fiber surface of 7 equivalent/ton, a crystal size in the fiber lateral axis direction of 45 nm$^2$, an amount of terminal methyl group of 0 equivalent/ton, a titanium oxide content of 0.05% by mass, and an amount of surface epoxy group (epoxy index) of $0.1 \times 10^{-3}$ equivalent/kg.

Here, regarding the above-mentioned polyester fiber, the intrinsic viscosity, the strength and degree of elongation, the degree of a dry heat shrinkage, the amount of terminal carboxy group, the long period and crystal size in the fiber lateral axis direction according to small-angle X-ray diffraction, the amount of terminal carboxy group on the fiber surface, the amount of terminal methyl group, the titanium oxide content, and the amount of surface epoxy group were each measured in accordance with the following description. The same applies hereinafter.

(Intrinsic Viscosity)

Polyester chip and polyester fiber were dissolved in orthochlorophenol at 100° C., for 60 minutes to give a diluted solution, then the intrinsic viscosity thereof was calculated by the value obtained by measuring the diluted solution using a Ubbelohde viscometer at 35° C.

(Amount of Terminal Carboxy Group)

Into a flask, 40.00 g of a polyester sample powderized by using a pulverizer and 100 ml of benzyl alcohol were added, and then, the polyester sample was dissolved in the benzyl alcohol under nitrogen air at 215±1° C. for 4 minutes. After dissolving, the sample solution was cooled to room temperature, then adding thereto a suitable amount of 0.1% by mass solution of phenol red in benzyl alcohol, followed by rapid titration with N normality of benzyl alcohol solution of sodium hydroxide, to obtain the amount of titration till the color changed as A ml. As a blank, to 100 ml of benzyl alcohol, the same amount of 0.1% by mass solution of phenol red in benzyl alcohol as above was added, and a rapid titration was performed with N normality of benzyl alcohol solution of sodium hydroxide, to obtain the amount of titration till the color changed as B ml. Using these values, the terminal COOH group content in the polyester sample was calculated by the expression below.

$$\text{terminal COOH group content (eq/}10^6 \text{ g)} = (A-B) \times 10^3 \times N \times 10^6 / 40$$

The benzyl alcohol used here was those stored in a light shielding bottle which was obtained by distilling a special grade reagent. As the N normality of benzyl alcohol solution of sodium hydroxide, a solution whose normality N was precisely determined by titration by a sulfuric acid solution having an already-known concentration was used.

(Amount of Terminal Methyl Group)

After hydrolyzing a polyester into an acid component and a glycol component, a methyl ester component was quantitated by gas chromatography to obtain the value thereof, then the amount of terminal methyl group was calculated using the value.

(Titanium Oxide Content)

The content of each element was measured by an X-ray fluorescence spectrometer (manufactured by Rigaku Corporation, 3270E type) to perform a quantitative analysis. During fluorescent X-ray analysis, a polyester fiber resin polymer sample was heated in a press for 2 minutes at 260° C. under a pressuring condition of 7 MPa to manufacture a test molding having a plane surface under pressuring condition to perform measurement.

(X-Ray Diffraction)

X-ray diffraction for polyester composition fiber was performed by using an X-ray diffraction apparatus (manufactured by Rigaku Corporation, RINT-TTR3, Cu—Kα ray, tube voltage 50 kV, current 300 mA, parallel beam method). The long period interval was calculated by using a small-angle X-ray scattering measurement device and using a conventionally known method, in other words, by using a diffraction line of a meridian interference obtained by the irradiation of Cu—Kα ray having a wavelength of 1.54 Å as a beam source to a fiber axis at a right angle, and by using the Bragg's equation. The crystal size was determined by the full-width at half maximum of (010)(100) strength distribution curve of equator scanning from X-ray wide angle diffraction by using the Scherrer equation.

(Amount of Terminal Carboxy Group on Fiber Surface)

In accordance with JIS K0070-3.1 neutralization titration, the amount of carboxy group (acid value) on the fiber surface was determined. Specifically, to about 5 g of a fiber sample, 50 ml of diethyl ether/ethanol=1/1 solution was added, and few droplets of phenolphthalein solution were added thereto as an indicator, followed by ultrasonic shaking at room temperature for 15 minutes. The solution was titrated with 0.1 ml of a potassium hydroxide ethanol solution (factor value f=1.030), and measured the dropping amount of the indicator to the end point when pale pink continued for 30 seconds to calculate the acid value by the following formula:

$$\text{acid value } A \text{ (eq/ton)} = (B \times 1.030 \times 100)/S$$

(wherein B represents the dropping amount of 0.1 ml potassium hydroxide ethanol solution (ml), and S represents the amount of the sample (g)).

(Strength and Degree of Elongation of Fiber)

The strength and degree of elongation of a fiber was measured by using a tensile load measuring instrument (manufactured by SHIMADZU CORPORATION Autograph) in accordance with JIS L-1013.

(Degree of Dry Heat Shrinkage)

In accordance with JIS-L1013, the fiber was left to stand still in a room where the temperature and the humidity were controlled at 20° C. and 65% RH for 24 hours, then subjected to a heat treatment of 180° C.×30 minutes without applying no load in a drying machine to calculate the dry heat shrinkage by the difference between the length before the heat treatment and the length after the treatment.

(Epoxy Index (EI))

For the polyester fiber after heat treatment, the epoxy index (EI: epoxy equivalent number per 1 kg of fiber) was measured in accordance with JIS K-7236.

After forming a cord by twisting a polyester filament composed of the obtained polyester fiber in accordance with the conditions listed on the Table below, the cord was subjected to an adhesive agent treatment by using an adhesive agent composition. The obtained polyester cord was rubberized to obtain a rubber-cord complex. By using the rubber-cord complex, a treat having an end count of 50/50 mm was manufactured, and then the treat was applied to a cap layer and a layered layer of a tire having a tire size of 205/65R15 to manufacture a test tire of Example 1-1. The test tire comprises a carcass composed of one carcass ply (material: PET) extending toroidally between a pair of left-and-right bead cores as a skeleton, two belts (material: steel) arranged crossing each other at angles of ±40° with respect to the tire circumferential direction on the outside of the carcass in the tire radial direction, a cap layer arranged across the full width of a belt or more, and a layered layer belt arranged on both end portions of the belt.

Comparative Example 1-1-1

A similar polyester fiber to that in Example 1-1 was prepared except that a multipurpose polyethylene terephthalate chip for a tire cord having a low carboxy group terminal was used; an epoxy treatment on the fiber surface was not performed; and a drawing condition was finely adjusted in order to adjust the physical property values.

The polyester fiber had similar physical properties to those of the polyester fiber used in Example 1-1, an intrinsic viscosity of 0.91, a fineness of 1130 dtex, 384 filament, a strength of 6.9 cN/dtex, a degree of elongation of 12%, and degree of a dry heat shrinkage of 10.5%, the long period according to small-angle X-ray diffraction of 10 nm, and a crystal size in the fiber lateral axis direction of 45 nm$^2$. Note that the amount of terminal carboxy group was 18 equivalent/ton, the amount of terminal carboxy group on the fiber surface was 11 equivalent/ton, and the amount of surface epoxy groups (epoxy index) was $0.0 \times 10^{-3}$ equivalent/kg; and since the polymer used was different, the amount of terminal methyl groups was 5 equivalent/ton, and the titanium oxide content was 0.00% by mass. A test tire of Comparative Example 1-1-1 was manufactured in a similar manner to Example 1-1 except that the polyester filament composed of the polyester fiber was used.

Comparative Example 1-1-2

A similar polyester fiber to that in Example 1-1 was prepared except that a multipurpose polyethylene terephthalate chip for a tire cord having a low carboxy group terminal was used; and a drawing condition was finely adjusted in order to adjust the physical property values.

The polyester fiber had similar physical properties to those of the polyester fiber used in Example 1-1, an intrinsic viscosity of 0.91, a fineness of 1130 dtex, 384 filament, a strength of 6.9 cN/dtex, a degree of elongation of 12%, and a degree of a dry heat shrinkage of 10.5%, the long period according to small-angle X-ray diffraction of 10 nm, and a crystal size in the fiber lateral axis direction of 45 nm$^2$. The amount of surface epoxy groups (epoxy index) was $0.1 \times 10^{-3}$ equivalent/kg, which was the same. Note that the amount of terminal carboxy group was 18 equivalent/ton and that the amount of terminal carboxy group on the fiber surface was 9 equivalent/ton; and since the polymer used was different, the amount of terminal methyl groups was 5 equivalent/ton, and the titanium oxide content was 0.00% by mass. A test tire of Comparative Example 1-1-2 was manufactured in a similar manner to Example 1-1 except that a polyester filament composed of the polyester fiber was used.

For each obtained test tire, the dynamic adhesive property and the high-speed drum durability were evaluated in accordance with the following. The obtained results are listed on the Table below.

<Dynamic Adhesive Property>

Figure 9:
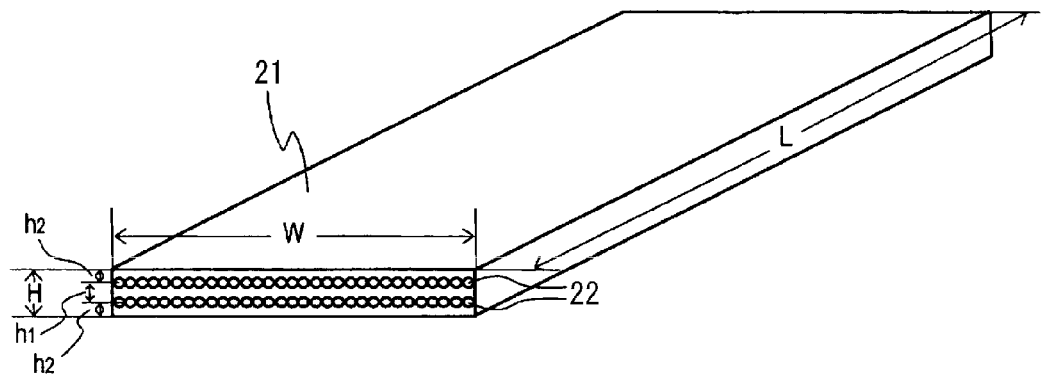
FIG. 9 is a cross-sectional view illustrating a rubber test piece used in a dynamic adhesion test in Examples.
Figure 10:
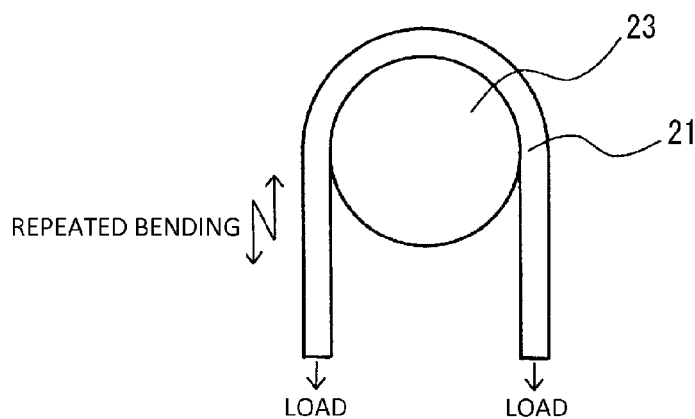
FIG. 10 is a schematic diagram illustrating a dynamic adhesion test method in Examples.

FIG. 9 is a perspective view illustrating a rubber test piece used in a dynamic adhesion test in Examples. As illustrated, a tire reinforcing polyester cord 22 in each of the Examples and Comparative Examples was embedded in rubber matrix such that cord layers are parallel to each other, and a rubber test piece 21 having a width W: 50 mm, a length L: 500 mm and a height H, 5.5 mm was manufactured. The end count of cords was set to 50/50 mm; the distance $h_1$ between cords was set to 2.5 mm, and the distance $h_2$ from the center of the cord to the surface was set to 1.5 mm. As illustrated in FIG. 10, each obtained rubber test piece 21 was hung on a pulley 23, a load of 50 kg/inch was applied in the direction of the axis of the cord, and tension and compressive force were cyclically applied at 100 rpm for 300,000 times. The tension rate at the time of adhesion test was set to 300 mm/min. After the test, the pull-up adhesive strength (N/cord) of the cord on the pulling side was measured to obtain the dynamic adhesive strength. The results were expressed as indices setting the distance in Comparative Example 1-1-1 to 100. The larger the value, the more excellent the dynamic adhesive property, which is preferred.

<High-Speed Drum Durability>

To each test tire, 200% load which is the maximum load condition in JATMA was applied, the tire was allowed to travel on a drum, and then, the travel distance until failure of the tire occurred was expressed as an index setting the distance in Comparative Example 1-1-1 to 100. The larger the value, the better the result. At the same time, breaking pattern was observed at the time of failure.

TABLE 1

|  | Comparative Example 1-1-1 | Comparative Example 1-1-2 | Example 1-1 |
|---|---|---|---|
| Cord structure (dtex/cord) | 1100/2 | 1100/2 | 1100/2 |
| The amount of carboxy group terminal | Low | Low | High |
| Presence or absence of surface treatment of polyester filament | Absent | Present | Present |
| The number of twist (times/10 cm) | 30 × 30 | 30 × 30 | 30 × 30 |

TABLE 1-continued

|  | Comparative Example 1-1-1 | Comparative Example 1-1-2 | Example 1-1 |
|---|---|---|---|
| Dynamic adhesive property (index) | 100 | 100 | 180 |
| High-speed drum durability (index) | 100 | 100 | 168 |
| High-speed drum breaking pattern | Separation failure between cap layer and tread over the entire circumference | Separation failure between cap layer and tread over the entire circumference | Chunk in tread rubber |

As shown in the above-mentioned Table, it was confirmed that, in the tire of the Example, the occurrence of failure originating from the cap layer or the layered layer was effectively inhibited, thereby improving the high-speed drum durability.

Example 1-2

After forming a cord by twisting the polyester filament obtained in a similar manner to Example 1-1 in accordance with the conditions listed on the Table below, the cord was subjected to an adhesive agent treatment by using a similar adhesive agent composition to that used in Example 1-1. The obtained polyester cord was rubberized to obtain a rubber-cord complex. By using the rubber-cord complex, a treat having an end count of 50/50 mm was manufactured, and then the treat was applied to a carcass ply of a tire having a tire size of 225/55R16 to manufacture a test tire of Example 1-2. The test tire comprises a carcass composed of one carcass ply extending toroidally between a pair of left-and-right bead cores as a skeleton, two belts (material: steel) arranged crossing each other at angles of ±40° with respect to the tire circumferential direction on the outside of the carcass in the tire radial direction.

Comparative Example 1-2-1

A test tire of Comparative Example 1-2-1 was manufactured in a similar manner to Example 1-2 except that a similar polyester filament to that in Comparative Example 1-1-1 was used.

Comparative Example 1-2-2

A test tire of Comparative Example 1-2-2 was manufactured in a similar manner to Example 1-2 except that a similar polyester filament to that in Comparative Example 1-1-2 was used.

For each obtained test tire, the dynamic adhesive property was evaluated in the same manner as above (Comparative Example 1-2-1 was used as a standard), and at the same time, the high-speed drum durability when a camber angle is provided was evaluated in accordance with the following. The obtained results are listed on the Table below.
<High-Speed Drum Durability (when Camber Angle was Provided)>
To each test tire, 200% load which is the maximum load condition in JATMA was applied, the tire was allowed to travel on a drum when camber angle 4° was provided, and then, the travel distance until failure of the tire occurred was expressed as an index setting the distance in Comparative Example 1-2-1 to 100. The larger the value, the better the result. At the same time, breaking pattern was observed at the time of failure.

TABLE 2

|  | Comparative Example 1-2-1 | Comparative Example 1-2-2 | Example 1-2 |
|---|---|---|---|
| Cord structure (dtex/cord) | 1670/2 | 1670/2 | 1670/2 |
| The amount of carboxy group terminal | Low | Low | High |
| Presence or absence of Surface treatment of polyester filament | Absent | Present | Present |
| The number of twist (/10 cm) | 40 × 40 | 40 × 40 | 40 × 40 |
| Dynamic adhesive property (index) | 100 | 100 | 180 |
| High-speed drum durability (index) | 100 | 100 | 163 |
| High-speed drum breaking pattern | shoulder failure | shoulder failure | tread failure |

As shown in the above-mentioned Table, it was confirmed that, in the tire of Example, breaking of the shoulder portion was prevented, thereby improving the high-speed drum durability.

Example 1-3

After forming a cord by twisting the polyester filament obtained in a similar manner to Example 1-1 in accordance with the conditions listed on the Table below, the cord was subjected to an adhesive agent treatment by using a similar adhesive agent composition to that used in Example 1-1. The obtained polyester cord was rubberized to obtain a rubber-cord complex. By using the rubber-cord complex, a treat having an end count of 50/50 mm was manufactured, and then the treat was applied to an insert of a tire having a tire size of 245/45R19 to manufacture a test tire of Example 1-3. The test tire comprises a carcass composed of two carcass plies (material: PET) extending toroidally between a pair of left-and-right bead cores as a skeleton, two belts (material: steel) arranged crossing each other at angles of ±40° with respect to the tire circumferential direction on the outside of the carcass in the tire radial direction. The insert was arranged on the outside of the carcass ply at a bead portion.

Comparative Example 1-3-1

A test tire of Comparative Example 1-3-1 was manufactured in a similar manner to Example 1-3 except that a similar polyester filament to that in Comparative Example 1-1-1 was used.

Comparative Example 1-3-2

A test tire of Comparative Example 1-3-2 was manufactured in a similar manner to Example 1-3 except that a similar polyester filament to that in Comparative Example 1-1-2 was used.

For each obtained test tire, the dynamic adhesive property was evaluated in the same manner as above (Comparative Example 1-3-1 was used as a standard), and at the same time, the bead portion durability drum test was performed in accordance with the following. The obtained results are listed on the Table below.
<Bead Portion Durability Drum Test>
Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 1-3-1 to 100. The larger the value, the better the result. At the same time, breaking pattern was observed at the time of failure. When the adhesive strength of the insert member is low, separation at a adhesion portion occurs first, thereby reducing the drum travel distance. On the other hand, when the adhesive strength of the insert member is high, a failure nuclei is changed to a turn-up portion of the carcass ply, thereby improving drum travel distance.

TABLE 3

|  | Comparative Example 1-3-1 | Comparative Example 1-3-2 | Example 1-3 |
|---|---|---|---|
| Cord structure (dtex/cord) | 1100/2 | 1100/2 | 1100/2 |
| The amount of carboxy group terminal | Low | Low | High |
| Presence or absence of Surface treatment of polyester filament | Absent | Present | Present |
| The number of twist (/10 cm) | 30 × 30 | 30 × 30 | 30 × 30 |
| Dynamic adhesive property (index) | 100 | 100 | 180 |
| Bead portion durability drum (index) | 100 | 100 | 165 |
| Bead portion durability drum breaking pattern | insert portion separation failure | insert portion separation failure | bead portion failure |

As shown in the above-mentioned Table, it was confirmed that in a tire of the Example, the occurrence of failure originating from separation of an insert is effectively inhibited, thereby improving the durability.

From the above-mentioned results, it was confirmed that, in the tire of the present invention in which a rubber-cord complex using a specific polyester filament was used as a reinforcing member, the durability was improved.

Example 2-1-1

Preparation of Adhesive Agent Composition

Epoxy-based adhesive agent compositions (1-1) to (1-3) were prepared by the formulation listed on the Table below.

For an epoxy-based adhesive agent composition, the following components were used. For the thermoplastic polymer (A), those mentioned below were used.
(A-1) Epocross K1010E, a product manufactured by NIPPON SHOKUBAI CO., LTD., solid content concentration 40%, (acryl-styrene copolymer emulsion containing 2-oxazoline group), polymer Tg: −50° C., the amount of oxazoline groups: 0.9 (mmol/g, solid)
(A-2) Epocross K1030E, a product manufactured by NIPPON SHOKUBAI CO., LTD., solid content concentration 40%, (acryl-styrene copolymer emulsion containing a 2-oxazoline group), polymer Tg: 50° C., the amount of oxazoline groups: 0.9 (mmol/g, solid)
(A-3) Polymer obtained by the below-mentioned Synthesis example, (urethane-based copolymer emulsion containing a hydrazino group)

Synthesis Example

Preparation Method of (A-3)

A hydrazino group-containing aqueous urethane resin was manufactured in accordance with the description of Synthesis example 1 described in Japanese Unexamined Patent Application Publication No. 10-139839. Specifically, to a four-necked flask provided with a reflux condenser, a thermometer and a stirrer, 80 parts by mass of polycaprolactone (manufactured by Daicel Corporation, molecular weight 2,000), 99.9 parts by mass of isoholon diisocyanate, 30 parts by mass of dimethylol propionic acid, 100 parts by mass of polyester polyol (manufactured by Unitika Ltd., ELITEL3320, molecular weight 2,000), 28.1 parts by mass of a propylene glycoldiglycidylether-acrylic acid adduct (manufactured by kyoeisha Chemical Co., Ltd.), 30 parts by mass of N-methylpyrrolidone, and 150 parts by mass of ethyl acetate were added, and then stirred under a nitrogen atmosphere, heated to 90° C. and the mixture was subjected to a urethanization reaction at the temperature for one hour. Thereafter, the mixture was cooled to 40° C. to obtain a prepolymer having NCO terminal. Next, to the prepolymer, 20 parts by mass of triethylamine was added and neutralized, and then 600 parts by mass of ion exchanged water was added thereto. Next, to the reaction system, 12.0 parts by mass of adipic acid dihydrazide was added, and stirred for one hour, and then ethyl acetate was distilled off under reduced pressure, thereafter, water dilution was performed to attain the solid content concentration of 30%, thereby obtaining a urethane-based copolymer emulsion having a hydrazine terminal. The weight-average molecular weight thereof based on polystyrene measured by GPC was Mw=35,000.

For the water-soluble polymer (B), the following components were used.
(B-1) ISOBAM 10, KURARAY CO., LTD., solid content concentration 100%, (copolymer of isobutylene and maleic anhydride), molecular weight: 160,000 to 170,000
(B-2) ISOBAM 04, KURARAY CO., LTD., solid content concentration 100%, (copolymer of isobutylene and maleic anhydride), molecular weight: 55,000 to 65,000
(B-3) ISOBAM 110, KURARAY CO., LTD., solid content concentration 100%, (a derivative in which maleic anhydride unit of copolymer of isobutylene and maleic anhydride was reacted with ammonia to obtain a mono amide unit of a maleic acid, then heated to close the ring to obtain a maleimide unit), molecular weight: 190,000 to 200,000

For the compound (C), the following components were used.
(C-1) DELION PAS-037, manufactured by TAKEMOTO OIL & FAT Co., Ltd., (diphenylmethane bis(4,4'-carbamoyl-ε-caprolactam): containing the molecular structure of diphenylmethane diisocyanate and a blocking agent), solid content concentration 27.5%
(C-2) Penacolite R-50, manufactured by Indspec Chem. Co., (condensate of resorcin and formaldehyde by novolac forming reaction), solid content concentration 50% (C-3) ELASTRON BN77, manufactured by Dai-ichi Kogyo Seiyaku Co., Ltd., (heat reactive aqueous urethane resin containing the molecular structure of methylenediphenyl), solid content concentration 31%

For the aliphatic epoxide compound (D), the following component was used.
(D-1) DENACOL EX614B, manufactured by Nagase ChemteX Corporation, (sorbitolpolyglycidylether)

TABLE 4

| | (1-1) | (% by mass) | (1-2) | (% by mass) | (1-3) | (% by mass) |
|---|---|---|---|---|---|---|
| Component (A) | A-1 | 5 | A-2 | 30 | A-3 | 30 |
| Component (B) | B-1 | 15 | B-2 | 20 | B-3 | 20 |
| Component (C) | C-1 | 20 | C-2 | 40 | C-3 | 40 |
| Component (D) | D | 60 | D | 10 | D | 10 |

After forming a cord by twisting a polyester filament composed of the polyester fiber obtained in a similar manner to Example 1-1 in accordance with the conditions listed on the Table below, the cord was subjected to an adhesive agent treatment by using the above-mentioned epoxy-based adhesive agent composition (1-1). Subsequently, an adhesive agent treatment was further performed on the cord with an RFL-based adhesive agent composition to obtain a tire reinforcing polyester cord.

The obtained polyester cord for reinforcing tire was rubberized, a treat having an end count of 50/50 mm was manufactured, and then the treat was applied to a cap layer and a layered layer of a tire having a tire size of 205/65R15 to manufacture a test tire of Example 2-1-1. The test tire comprises a carcass composed of one carcass ply (material: PET) extending toroidally between a pair of left-and-right bead cores as a skeleton, two belts (material: steel) arranged crossing each other at angles of ±40° with respect to the tire circumferential direction on the outside of the carcass in the tire radial direction, a cap layer arranged across the full width of a belt or more, and a layered layer belt arranged on both end portions of the belt.

Example 2-1-2

A test tire of Example 2-1-2 was manufactured in a similar manner to Example 2-1-1 except that, as an adhesive agent composition, an epoxy-based adhesive agent composition (1-2) listed on the above-mentioned Table was used.

Example 2-1-3

A test tire of Example 2-1-3 was manufactured in a similar manner to Example 2-1-1 except that, as an adhesive agent composition, an epoxy-based adhesive agent composition (1-3) listed on the above-mentioned Table was used.

Comparative Example 2-1-1

A test tire of Comparative Example 2-1-1 was manufactured in a similar manner to Example 2-1-1 except that a similar polyester filament composed of polyester fiber to that of Comparative Example 1-1-1 was used.

Comparative Example 2-1-2

An adhesive agent liquid (1-4) was prepared by the formulation listed on the Table below, and the adhesive agent liquid was diluted and adjusted such that 20% by mass of an aqueous adhesive agent liquid in the above-mentioned ratio was obtained. The blocked isocyanate compound was added after an RFL adhesive agent liquid was mixed and aged at 20° C. for 24 hours, immediately before use. The blocked isocyanate compound used was manufactured by Dai-ichi Kogyo Seiyaku Co., Ltd.: ELASTRON BN69 (blocking agent dissociating temperature 120° C.) and BN27 (blocking agent dissociating temperature 180° C.). Latex was experimentally made by emulsion polymerization.

TABLE 5

| | | | Adhesive agent liquid (1-4) |
|---|---|---|---|
| Adhesive agent liquid formulation (mass ratio) | Resorcin | | 8 |
| | Formaldehyde | | 4 |
| | Latex | | 100 |
| | Catalyst | Caustic soda | 0 |
| | | Ammonia | 4 |
| | Blocked isocyanate compound | | 6 |
| Catalyst/resorcin(molar ratio) | | | 3.2 |
| Isocyanate compound ratio in adhesive agent (% by mass) | | | 5 |
| Rubber latex composition (% by mass) | Core ratio | | 0 |
| | Core vinylpyridine | | 0 |
| | Core styrene | | 0 |
| | Core butadiene | | 0 |
| | Shell ratio | | 100 |
| | Shell vinylpyridine | | 15 |
| | Shell styrene | | 15 |
| | Shell butadiene | | 70 |
| Isocyanate compound | Blocking agent dissociating temperature (° C.) | | 180 |
| Drying temperature (° C.) | | | 180 |

Figure 11:
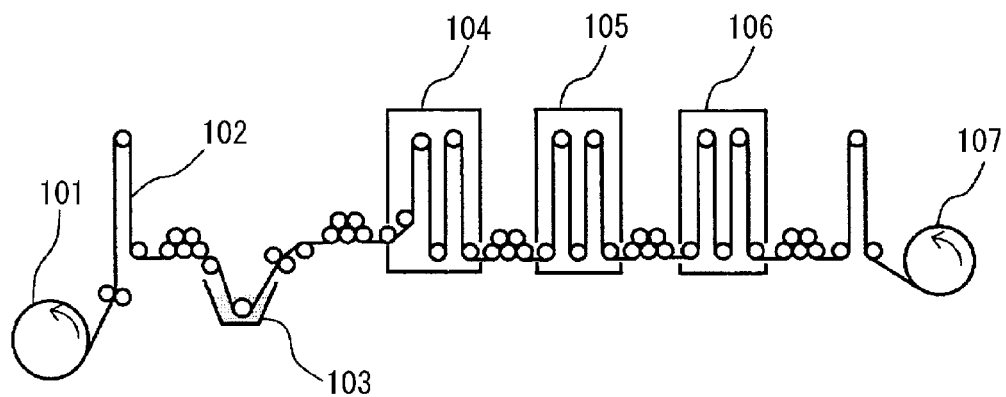
FIG. 11 is a process drawing illustrating a method of manufacturing a cord for reinforcing a tire in Examples.

A test tire of Comparative Example 2-1-2 was manufactured in a similar manner to Example 2-1-1 except that, after forming a cord by twisting a polyester filament composed of a polyester fiber in accordance with the conditions listed on the Table below, an adhesive agent treatment was performed using adhesive agent liquids (1-4) on the cord in a step illustrated in FIG. 11. Specifically, a cord 102 transferred from an unwinding apparatus 101 was passed through an adhesive agent liquid 103 to impregnate the cord 102 with the adhesive agent liquid 103 (impregnation step); the impregnated cord 102 was transferred to a drying zone 104 to dry the cord 102 (drying step); the dried cord 102 was passed through a heat set zone 105 and a normalizing zone 106 (heat treatment step); and then, the cord 102 was cooled, and wound by a winding apparatus 107. The drying temperature in the drying zone 104 in the drying step was a temperature listed on the below-mentioned Table, and the drying time was two minutes. In the heat treatment step composed of the subsequent heat set zone 105 and normalizing zone 106, the treatment temperature was 250° C. and the treatment time was 1 minute. In this case, the cord tension was 1 kg/cord.

Comparative Example 2-1-3

A test tire of Comparative Example 2-1-3 was manufactured in a similar manner to Example 2-1-1 except that a polyester filament composed of a similar polyester fiber to Comparative Example 1-1-2 was used.

For each obtained test tire, the dynamic adhesive property and the high-speed drum durability were evaluated in accordance with the following. The obtained results are listed on the Table below.

<Dynamic Adhesive Property>

The dynamic adhesive strength was evaluated in a similar manner as above. The results were expressed as indices setting the distance in Comparative Example 2-1-1 to 100. The larger the value, the more excellent the dynamic adhesive property, which is preferred.

<High-Speed Drum Durability>

To each test tire, 200% load which is the maximum load condition in JATMA was applied, the tire was allowed to travel on a drum, and then, the travel distance until failure of the tire occurred was expressed as an index setting the distance in Comparative Example 2-1-1 to 100. The larger the value, the better the result. At the same time, breaking pattern was observed at the time of failure.

TABLE 6

|  | Example 2-1-1 | Example 2-1-2 | Example 2-1-3 | Comparative Example 2-1-1 | Comparative Example 2-1-2 | Comparative Example 2-1-3 |
|---|---|---|---|---|---|---|
| Cord structure (dtex/cord) | 1100/2 | 1100/2 | 1100/2 | 1100/2 | 1100/2 | 1100/2 |
| The amount of carboxy group terminal | High | High | High | Low | High | Low |
| Presence or absence of Surface treatment of polyester filament | Present | Present | Present | Absent | Present | Present |
| Adhesive agent composition | (1-1) | (1-2) | (1-3) | (1-1) | (1-4) | (1-1) |
| The number of twist (/10 cm) | 30 × 30 | 30 × 30 | 30 × 30 | 30 × 30 | 30 × 30 | 30 × 30 |
| Dynamic adhesive property (index) | 180 | 170 | 160 | 100 | 85 | 105 |
| High-speed drum durability (index) | 160 | 160 | 160 | 100 | 90 | 104 |
| High-speed drum breaking pattern | Chunk in tread rubber | Chunk in tread rubber | Chunk in tread rubber | Separation failure between cap layer and tread over the entire circumference | Separation failure between cap layer and tread over the entire circumference | Separation failure between cap layer and tread over the entire circumference |

As shown in the above-mentioned Table, it was confirmed that, in the tire of the Example, the occurrence of failure originating from the cap layer or the layered layer was effectively inhibited, thereby improving the high-speed drum durability.

Example 2-2-1

After forming a cord by twisting the polyester filament obtained in a similar manner to Example 2-1-1 in accordance with the conditions listed on the Table below, the cord was subjected to an adhesive agent treatment by using a similar epoxy adhesive agent composition (1-1) to that used in Example 2-1-1. Subsequently, an adhesive agent treatment was further performed on the cord with an RFL-based adhesive agent composition to obtain a tire reinforcing polyester cord.

The obtained polyester cord for reinforcing a tire was rubberized, and a treat having an end count of 50/50 mm was manufactured, and then the treat was applied to a carcass ply of a tire having a tire size of 225/55R16 to manufacture a test tire of Example 2-2-1. The test tire comprises a carcass composed of two carcass plies extending toroidally between a pair of left-and-right bead cores as a skeleton, two belts (material: steel) arranged crossing each other at angles of ±40° with respect to the tire circumferential direction on the outside of the carcass in the tire radial direction.

Example 2-2-2

A test tire of Example 2-2-2 was manufactured in a similar manner to Example 2-2-1 except that, as an adhesive agent composition, an epoxy-based adhesive agent composition (1-2) listed on the above-mentioned Table was used.

Example 2-2-3

A test tire of Example 2-2-3 was manufactured in a similar manner to Example 2-2-1 except that, as an adhesive agent composition, an epoxy-based adhesive agent composition (1-3) listed on the above-mentioned Table was used.

Comparative Example 2-2-1

A test tire of Comparative Example 2-2-1 was manufactured in a similar manner to Example 2-2-1 except that a similar polyester filament to that in Comparative Example 2-1-1 was used.

Comparative Example 2-2-2

A test tire of Comparative Example 2-2-2 was manufactured in a similar manner to Example 2-2-1 except that a similar adhesive agent composition to that in Comparative Example 2-1-2 was used.

Comparative Example 2-2-3

A test tire of Comparative Example 2-2-3 was manufactured in a similar manner to Example 2-2-1 except that a similar polyester filament to that in Comparative Example 2-1-3 was used.

For each obtained test tire, the dynamic adhesive property was evaluated in the same manner as above (Comparative Example 2-2-1 was used as a standard), and at the same time, the high-speed drum durability when a camber angle is provided was evaluated in accordance with the following. The obtained results are listed on the Table below.
<High-Speed Drum Durability (when Camber Angle was Provided)>

To each test tire, 200% load which is the maximum load condition in JATMA was applied, the tire was allowed to travel on a drum when camber angle 4.0° was provided, and then, the travel distance until failure of the tire occurred was expressed as an index setting the distance in Comparative Example 2-2-1 to 100. The larger the value, the better the result. At the same time, breaking pattern was observed at the time of failure.

TABLE 7

|  | Example 2-2-1 | Example 2-2-2 | Example 2-2-3 | Comparative Example 2-2-1 | Comparative Example 2-2-2 | Comparative Example 2-2-3 |
|---|---|---|---|---|---|---|
| Cord structure (dtex/cord) | 1670/2 | 1670/2 | 1670/2 | 1670/2 | 1670/2 | 1670/2 |
| Presence or absence of Surface treatment of polyester filament | Present | Present | Present | Absent | Present | Present |
| The amount of carboxy group terminal | High | High | High | Low | High | Low |
| Adhesive agent composition | (1-1) | (1-2) | (1-3) | (1-1) | (1-4) | (1-1) |
| The number of twist (/10 cm) | 40 × 40 | 40 × 40 | 40 × 40 | 40 × 40 | 40 × 40 | 40 × 40 |
| Dynamic adhesive property (index) | 165 | 170 | 160 | 100 | 85 | 105 |
| High-speed drum durability (index) | 160 | 160 | 160 | 100 | 90 | 104 |
| High-speed drum breaking pattern | Tread failure | Tread failure | Tread failure | Shoulder failure | Shoulder failure | Shoulder failure |

As shown in the above-mentioned Table, it was confirmed that, in the tire of Example, breaking of the shoulder portion was prevented, thereby improving the high-speed drum durability.

Example 2-3-1

After forming a cord by twisting the polyester filament obtained in a similar manner to Example 2-1-1 in accordance with the conditions listed on the Table below, the cord was subjected to an adhesive agent treatment by using a similar epoxy adhesive agent composition (1-1) to that used in Example 2-1-1. Subsequently, an adhesive agent treatment was further performed on the cord with an RFL-based adhesive agent composition to obtain a tire reinforcing polyester cord.

The obtained polyester cord for reinforcing a tire was rubberized, and a treat having an end count of 50/50 mm was manufactured, and then the treat was applied to an insert of a tire having a tire size of 245/45R19 to manufacture a test tire of Example 2-3-1. The test tire comprises a carcass composed of two carcass plies (material: PET) extending toroidally between a pair of left-and-right bead cores as a skeleton, two belts (material: steel) arranged crossing each other at angles of ±40° with respect to the tire circumferential direction on the outside of the carcass in the tire radial direction. The insert was arranged on the outside of the carcass ply at a bead portion.

Example 2-3-2

A test tire of Example 2-3-2 was manufactured in a similar manner to Example 2-3-1 except that, as an adhesive agent composition, an epoxy-based adhesive agent composition (1-2) listed on the above-mentioned Table was used.

Example 2-3-3

A test tire of Example 2-3-3 was manufactured in a similar manner to Example 2-3-1 except that, as an adhesive agent composition, an epoxy-based adhesive agent composition (1-3) listed on the above-mentioned Table was used.

Comparative Example 2-3-1

A test tire of Comparative Example 2-3-1 was manufactured in a similar manner to Example 2-3-1 except that a similar polyester filament to that in Comparative Example 2-1-1 was used.

Comparative Example 2-3-2

A test tire of Comparative Example 2-3-2 was manufactured in a similar manner to Example 2-3-1 except that a similar adhesive agent composition to that in Comparative Example 2-1-2 was used.

Comparative Example 2-3-3

A test tire of Comparative Example 2-3-3 was manufactured in a similar manner to Example 2-3-1 except that a similar polyester filament to that in Comparative Example 2-1-3 was used.

For each obtained test tire, the dynamic adhesive property was evaluated in the same manner as above (Comparative Example 2-3-1 was used as a standard), and at the same time, the bead portion durability drum test was performed in accordance with the following. The obtained results are listed on the Table below.

<Bead Portion Durability Drum Test>

Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 2-3-1 to 100. The larger the value, the better the result. At the same time, breaking pattern was observed at the time of failure. When the adhesive strength of the insert member is low, separation at a adhesion portion occurs first, thereby reducing the drum travel distance. On the other hand, when the adhesive strength of the insert member is high, a failure nuclei is changed to a turn-up portion of the carcass ply, thereby improving drum travel distance.

TABLE 8

|  | Example 2-3-1 | Example 2-3-2 | Example 2-3-3 | Comparative Example 2-3-1 | Comparative Example 2-3-2 | Comparative Example 2-3-3 |
| --- | --- | --- | --- | --- | --- | --- |
| Cord structure (dtex/cord) | 1100/2 | 1100/2 | 1100/2 | 1100/2 | 1100/2 | 1100/2 |
| The amount of carboxy group terminal | High | High | High | Low | High | Low |
| Presence or absence of Surface treatment of polyester filament | Present | Present | Present | Absent | Present | Present |
| Adhesive agent composition | (1-1) | (1-2) | (1-3) | (1-1) | (1-4) | (1-1) |
| The number of twist (/10 cm) | 30 × 30 | 30 × 30 | 30 × 30 | 30 × 30 | 30 × 30 | 30 × 30 |
| Dynamic adhesive property (index) | 165 | 170 | 160 | 100 | 85 | 105 |
| Bead portion durability drum (index) | 160 | 160 | 160 | 100 | 90 | 104 |
| Bead portion durability drum breaking pattern | Bead portion failure | Bead portion failure | Bead portion failure | Insert portion separation failure | Insert portion separation failure | Insert portion separation failure |

As shown in the above-mentioned Table, it was confirmed that, in a tire of the Example, the occurrence of failure originating from separation of an insert is effectively inhibited, thereby improving the durability.

From the above-mentioned results, it was confirmed that, compared with a conventional polyester cord, a polyester cord of the present invention had an excellent heat resistant adhesive property with rubber, and that, by using the cord, a tire whose durability was improved can be attained.

Example 3-1

After forming a cord by twisting a polyester filament composed of the polyester fiber obtained in a similar manner to Example 1-1 in accordance with the conditions listed on the Table below, the cord was subjected to an adhesive agent treatment by using the above-mentioned epoxy-based adhesive agent composition (1-1). Subsequently, an adhesive agent treatment was further performed on the cord with an RFL-based adhesive agent composition to obtain a tire reinforcing polyester cord.

The obtained polyester cord for reinforcing a tire was rubberized, and a treat having an end count of 50/50 mm was manufactured, and then the treat was applied to a carcass ply of a tire having a tire size of 225/55R16 to manufacture a test tire of Example 3-1. The test tire comprises a carcass composed of two carcass plies extending toroidally between a pair of left-and-right bead cores as a skeleton, two belts (material: steel) arranged crossing each other at angles of ±40° with respect to the tire circumferential direction on the outside of the carcass in the tire radial direction.

Example 3-2

A test tire of Example 3-2 was manufactured in a similar manner to Example 3-1 except that, as an adhesive agent composition, an epoxy-based adhesive agent composition (1-2) listed on the above-mentioned Table was used.

Example 3-3

A test tire of Example 3-3 was manufactured in a similar manner to Example 3-1 except that, as an adhesive agent composition, an epoxy-based adhesive agent composition (1-3) listed on the above-mentioned Table was used.

Comparative Example 3-1

A test tire of Comparative Example 3-1 was manufactured in a similar manner to Example 3-1 except that, after forming a cord by twisting a polyester filament composed of a similar polyester fiber to Comparative Example 1-1-1 in accordance with the conditions listed on the Table below, an adhesive agent treatment was performed using adhesive agent liquids (1-4) on the cord in a step illustrated in FIG. 11.

Comparative Example 3-2

A test tire of Comparative Example 3-2 was manufactured in a similar manner to Example 3-1 except that, after forming a cord by twisting a similar polyester filament to that used in Example 3-1, an adhesive agent treatment was performed on the cord using a similar adhesive agent composition to that used in Comparative Example 3-1.

Comparative Example 3-3

A test tire of Comparative Example 3-3 was manufactured in a similar manner to Example 3-1 except that, after forming a cord by twisting a similar polyester filament to that used in Comparative Example 3-1, an adhesive agent treatment was performed on the cord using a similar adhesive agent composition to that used in Example 3-1, and an adhesive agent treatment was further performed on the cord using an RFL-based adhesive agent composition.

Comparative Example 3-4

A test tire of Comparative Example 3-4 was manufactured in a similar manner to Example 3-1 except that a similar polyester filament composed of polyester fiber to that of Comparative Example 1-1-2 was used.

Examples 3-4 to 3-10

Test tires of Examples 3-4 to 3-10 were manufactured in a similar manner to Example 3-1 except that the conditions of the polyester cord were changed as listed on the Table below.

For each obtained test tire, the high-speed drum durability, irregularity on a side portion, the bead portion drum durability and the cut performance when a camber angle is provided were evaluated in accordance with the following. The obtained results are listed on the Table below in combination.

<High-Speed Drum Durability (when Camber Angle was Provided)>

To each test tire, 200% load which is the maximum load condition in JATMA was applied, the tire was allowed to travel on a drum when camber angle 4.0° was provided, and then, the travel distance until failure of the tire occurred was expressed as an index setting the distance in Comparative Example 3-4 to 100. The larger the value, the better the result. At the same time, breaking pattern was observed at the time of failure.

<Irregularity of Side Portion>

For each test tire, a hollow was evaluated by measuring the irregularity of tire side portion using a laser when the inner pressure was 180 kPa and digitizing the peak values. The results were expressed as indices setting the value in Comparative Example 3-4 to 100. The larger the value, the larger the hollow, which is a bad result.

<Bead Portion Durability Drum Test>

Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 3-4 to 100. The larger the value, the better the result.

<Cut Performance>

Each test tire was mounted to a prescribed rim, and the tire is inflated to a prescribed inner pressure. Thereafter, a convex protrusion, the tip of which had a radius of curvature of R=10 (mm), was pressed on the side portion to measure a work required for the side portion to be cut. The results were indicated as an index setting the work required for side cut of the tire of the Comparative Example 3-4 to 100. The larger the value, the better the side cut performance.

TABLE 9

|  | Comparative Example 3-1 | Comparative Example 3-2 | Comparative Example 3-3 | Comparative Example 3-4 |
|---|---|---|---|---|
| Cord structure (dtex/cord) | 1100/2 | 1100/2 | 1100/2 | 1100/2 |
| The amount of carboxy group terminal | Low | High | Low | Low |
| Presence or absence of Surface treatment of polyester filament | Absent | Present | Absent | Present |
| Adhesive agent composition | (1-4) | (1-4) | (1-1) | (1-1) |
| The number of twist (/10 cm) | 50 × 50 | 50 × 50 | 50 × 50 | 50 × 50 |
| Twisting coefficient Nt(—) | 0.50 | 0.50 | 0.50 | 0.50 |
| High-speed drum durability (index) | 80 | 85 | 90 | 100 |
| High-speed drum breaking pattern | Carcass separation | Carcass separation | Carcass separation | Carcass separation |
| Side irregularity (index) | 100 | 100 | 100 | 100 |
| Bead portion drum durability (index) | 100 | 100 | 100 | 100 |
| Cut performance (index) | 100 | 100 | 100 | 100 |

TABLE 10

|  | Example 3-1 | Example 3-2 | Example 3-3 | Example 3-4 | Example 3-5 |
|---|---|---|---|---|---|
| Cord structure (dtex/cord) | 1100/2 | 1100/2 | 1100/2 | 1100/2 | 1100/2 |
| The amount of carboxy group terminal | High | High | High | High | High |
| Presence or absence of Surface treatment of polyester filament | Present | Present | Present | Present | Present |
| Adhesive agent composition | (1-1) | (1-2) | (1-3) | (1-1) | (1-1) |
| The number of twist (/10 cm) | 50 × 50 | 50 × 50 | 50 × 50 | 38 × 38 | 56 × 56 |
| Twisting coefficient Nt(—) | 0.50 | 0.50 | 0.50 | 0.38 | 0.55 |
| High-speed drum durability (index) | 165 | 180 | 162 | 110 | 105 |
| High-speed drum breaking pattern | No carcass separation | No carcass separation | No carcass separation | No carcass separation | No carcass separation |
| Side irregularity (index) | 100 | 100 | 100 | 100 | 100 |
| Bead portion drum durability (index) | 100 | 100 | 100 | 90 | 100 |
| Cut performance (index) | 100 | 100 | 100 | 103 | 95 |

TABLE 11

|  | Example 3-6 | Example 3-7 | Example 3-8 | Example 3-9 | Example 3-10 |
|---|---|---|---|---|---|
| Cord structure (dtex/cord) | 1100/2 | 1100/2 | 940/2 | 2200/3 | 1670/3 |
| The amount of carboxy group terminal | High | High | High | High | High |

TABLE 11-continued

|  | Example 3-6 | Example 3-7 | Example 3-8 | Example 3-9 | Example 3-10 |
|---|---|---|---|---|---|
| Presence or absence of Surface treatment of polyester filament | Present | Present | Present | Present | Present |
| Adhesive agent composition | (1-1) | (1-1) | (1-1) | (1-1) | (1-1) |
| The number of twist (/10 cm) | 42 × 42 | 54 × 54 | 54 × 54 | 29 × 29 | 33 × 33 |
| Twisting coefficient Nt(—) | 0.42 | 0.54 | 0.50 | 0.50 | 0.50 |
| High-speed drum durability (index) | 165 | 160 | 150 | 150 | 158 |
| High-speed drum breaking pattern | No carcass separation | No carcass separation | No carcass separation | No carcass separation | No carcass separation |
| Side irregularity (index) | 100 | 100 | 100 | 106 | 100 |
| Bead portion drum durability (index) | 100 | 103 | 100 | 100 | 100 |
| Cut performance (index) | 100 | 100 | 95 | 100 | 100 |

As shown in the above-mentioned Table, it was confirmed that, in a test tire of each of the Examples, the occurrence of delamination fracture of a carcass ply was inhibited in a high-speed durability performance test when camber angle was provided without compromising other performances, thereby improving the high-speed durability performance.

Example 4-1

After forming a cord by twisting a polyester filament composed of the polyester fiber obtained in a similar manner to Example 1-1 in accordance with the conditions listed on the Table below, the cord was subjected to an adhesive agent treatment by using the above-mentioned epoxy-based adhesive agent composition (1-1). Subsequently, an adhesive agent treatment was further performed on the cord with an RFL-based adhesive agent composition to obtain a tire reinforcing polyester cord.

The obtained polyester cord for reinforcing a tire was rubberized, and a treat having an end count of 50/50 mm was manufactured, and then the treat was applied to a carcass ply of a run-flat tire having a tire size of 245/45R19 to manufacture a test tire of Example 4-1. The test tire comprises a pair of left-and-right bead portions, a pair of side wall portions each continuing from the bead portion to the outside in the tire radial direction, a tread portion bridging between the pair of side wall portions to form a contacting portion, and further comprising a carcass composed of two carcass plies extending toroidally between the pair of bead portions to reinforce each of these portions, and a side reinforcing rubber layer having a crescent shaped cross-section arranged inside the carcass at the side wall portion, wherein the carcass ply is composed of the reinforcing member. The test tire comprised, on the outside in the tire radial direction of a crown portion of the carcass, a belt (material: steel) composed of two belt layers arranged crossing each other at angles of ±40° with respect to the tire circumferential direction, and, one cap layer covering the whole belt and a pair of layered layers (material: nylon) covering only both the end portions of the belt.

Example 4-2

A test tire of Example 4-2 was manufactured in a similar manner to Example 4-1 except that, as an adhesive agent composition, an epoxy-based adhesive agent composition (1-2) listed on the above-mentioned Table was used.

Example 4-3

A test tire of Example 4-3 was manufactured in a similar manner to Example 4-1 except that, as an adhesive agent composition, an epoxy-based adhesive agent composition (1-3) listed on the above-mentioned Table was used.

Comparative Example 4-1

A test tire of Comparative Example 4-1 was manufactured in a similar manner to Example 4-1 except that, after forming a cord by twisting a polyester filament composed of a similar polyester fiber to Comparative Example 1-1-1 in accordance with the conditions listed on the Table below, an adhesive agent treatment was performed using adhesive agent liquids (1-4) on the cord in a step illustrated in FIG. 11.

Comparative Example 4-2

A test tire of Comparative Example 4-2 was manufactured in a similar manner to Example 4-1 except that, after forming a cord by twisting a similar polyester filament to that used in Example 4-1, an adhesive agent treatment was performed on the cord using a similar adhesive agent composition to that used in Comparative Example 4-1.

Comparative Example 4-3

A test tire of Comparative Example 4-3 was manufactured in a similar manner to Comparative Example 4-1 except that, after forming a cord by twisting a similar polyester filament to that used in Comparative Example 4-1, an adhesive agent treatment was performed on the cord using a similar adhesive agent composition to that used in Example 4-1, and an adhesive agent treatment was further performed on the cord using an RFL-based adhesive agent composition.

Comparative Example 4-4

A test tire of Comparative Example 4-4 was manufactured in a similar manner to Example 4-1 except that a similar polyester filament composed of polyester fiber to that of Comparative Example 1-1-2 was used.

Examples 4-4 to 4-10

Test tires of Examples 4-4 to 4-10 were manufactured in a similar manner to Example 4-1 except that the conditions of the polyester cord were changed as listed on the Table below.

For each obtained test tire, the run-flat drum durability, irregularity on a side portion, the bead portion drum durability and the cut performance were evaluated in accordance with the following. The obtained results are listed on the Table below in combination.

<Run-Flat Drum Durability>

Without inflating each test tire to an inner pressure, the tire was allowed to travel on a drum under conditions, a load of 4.17 kN, a speed of 89 km/h, and a temperature of 38° C., and then, the travel distance until failure of the tire occurred was measured and expressed as an index setting the distance in Comparative Example 4-4 to 100. The larger the index value, the longer the travel distance until failure of the tire occurred, which means an excellent run-flat durability. At the same time, breaking pattern was observed at the time of failure.

<Irregularity of Side Portion>

For each test tire, a hollow was evaluated by measuring the irregularity of tire side portion using a laser when the inner pressure was 180 kPa and digitizing the peak values. The results were expressed as indices setting the value in Comparative Example 4-4 to 100. The larger the value, the larger the hollow, which is a bad result.

<Bead Portion Durability Drum Test>

Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 4-4 to 100. The larger the value, the better the result.

<Cut Performance>

Each test tire was mounted to a prescribed rim, and the tire is inflated to a prescribed inner pressure. Thereafter, a convex protrusion, the tip of which had a radius of curvature of R=10 (mm), was pressed on the side portion to measure a work required for the side portion to be cut. The results were indicated as an index setting the work required for side cut of the tire of the Comparative Example 4-4 to 100. The larger the value, the better the side cut performance.

TABLE 12

|  | Comparative Example 4-1 | Comparative Example 4-2 | Comparative Example 4-3 | Comparative Example 4-4 |
|---|---|---|---|---|
| Cord structure (dtex/cord) | 1100/2 | 1100/2 | 1100/2 | 1100/2 |
| The amount of carboxy group terminal | Low | High | Low | Low |
| Presence or absence of Surface treatment of polyester filament | Absent | Present | Absent | Present |
| Adhesive agent composition | (1-4) | (1-4) | (1-1) | (1-1) |
| The number of twist (/10 cm) | 50 × 50 | 50 × 50 | 50 × 50 | 50 × 50 |
| Twisting coefficient Nt(—) | 0.50 | 0.50 | 0.50 | 0.50 |
| Run-flat durability (index) | 80 | 85 | 90 | 100 |
| Run-flat durability breaking pattern | Carcass separation | Carcass separation | Carcass separation | Carcass separation |
| Side irregularity (index) | 100 | 100 | 100 | 100 |
| Bead portion drum durability (index) | 100 | 100 | 100 | 100 |
| Cut performance (index) | 100 | 100 | 100 | 100 |

TABLE 13

|  | Example 4-1 | Example 4-2 | Example 4-3 | Example 4-4 | Example 4-5 |
|---|---|---|---|---|---|
| Cord structure (dtex/cord) | 1100/2 | 1100/2 | 1100/2 | 1100/2 | 1100/2 |
| The amount of carboxy group terminal | High | High | High | High | High |
| Presence or absence of Surface treatment of polyester filament | Present | Present | Present | Present | Present |
| Adhesive agent composition | (1-1) | (1-2) | (1-3) | (1-1) | (1-1) |
| The number of twist (/10 cm) | 50 × 50 | 50 × 50 | 50 × 50 | 38 × 38 | 56 × 56 |
| Twisting coefficient Nt(—) | 0.50 | 0.50 | 0.50 | 0.38 | 0.56 |
| Run-flat durability (index) | 165 | 180 | 162 | 165 | 158 |
| Run-flat durability breaking pattern | No carcass separation | No carcass separation | No carcass separation | No carcass separation | No carcass separation |
| Side irregularity (index) | 100 | 100 | 100 | 100 | 100 |
| Bead portion drum durability (index) | 100 | 100 | 100 | 90 | 100 |
| Cut performance (index) | 100 | 100 | 100 | 103 | 95 |

TABLE 14

|  | Example 4-6 | Example 4-7 | Example 4-8 | Example 4-9 | Example 4-10 |
|---|---|---|---|---|---|
| Cord structure (dtex/cord) | 1100/2 | 1100/2 | 940/2 | 2200/3 | 1670/3 |
| The amount of carboxy group terminal | High | High | High | High | High |
| Presence or absence of Surface treatment of polyester filament | Present | Present | Present | Present | Present |

TABLE 14-continued

|  | Example 4-6 | Example 4-7 | Example 4-8 | Example 4-9 | Example 4-10 |
|---|---|---|---|---|---|
| Adhesive agent composition | (1-1) | (1-1) | (1-1) | (1-1) | (1-1) |
| The number of twist (/10 cm) | 42 × 42 | 54 × 54 | 54 × 54 | 29 × 29 | 33 × 33 |
| Twisting coefficient Nt(—) | 0.42 | 0.54 | 0.50 | 0.50 | 0.50 |
| Run-flat durability (index) | 165 | 160 | 150 | 150 | 160 |
| Run-flat durability breaking pattern | No carcass separation | No carcass separation | No carcass separation | No carcass separation | No carcass separation |
| Side irregularity (index) | 100 | 100 | 100 | 106 | 100 |
| Bead portion drum durability (index) | 100 | 103 | 100 | 100 | 100 |
| Cut performance (index) | 100 | 100 | 95 | 100 | 100 |

As shown in the above-mentioned Table, it was confirmed that, in a test tire of each of the Examples, the occurrence of delamination fracture of a carcass ply was inhibited without compromising other performances, thereby improving the run-flat durability performance.

Example 5-1

After forming a cord by twisting a polyester filament composed of the polyester fiber obtained in a similar manner to Example 1-1 in accordance with the conditions listed on the Table below, the cord was subjected to an adhesive agent treatment by using the above-mentioned epoxy-based adhesive agent composition (1-1). Subsequently, an adhesive agent treatment was further performed on the cord with an RFL-based adhesive agent composition to obtain a tire reinforcing polyester cord.

The obtained polyester cord for reinforcing a tire was rubberized, and a treat having an end count of 50/50 mm was manufactured, and then the treat was applied to a reinforcing cord layer of a run-flat tire having a tire size of 245/45R19 to manufacture a test tire of Example 5-1. The test tire comprises a pair of left-and-right bead portions, a pair of side wall portions each continuing from the bead portion to the outside in the tire radial direction, a tread portion bridging between the pair of side wall portions to form a contacting portion, and further comprising a carcass composed of two carcass plies (material: rayon) extending toroidally between the pair of bead portions to reinforce each of these portions, and a side reinforcing rubber layer having a crescent shaped cross-section arranged inside the carcass at the side wall portion, wherein the carcass ply is composed of the reinforcing member. The test tire comprised, on the outside in the tire radial direction of a crown portion of the carcass, a belt (material: steel) composed of two belt layers arranged crossing each other at angles of ±40° with respect to the tire circumferential direction, and, one cap layer covering the whole belt and a pair of layered layers (material: nylon) covering only both the end portions of the belt. The cord angle of the reinforcing cord layer was 0° with respect to the tire radial direction, and the reinforcing cord layer was arranged at a position illustrated in FIG. 4.

Example 5-2

A test tire of Example 5-2 was manufactured in a similar manner to Example 5-1 except that, as an adhesive agent composition, an epoxy-based adhesive agent composition (1-2) listed on the above-mentioned Table was used.

Example 5-3

A test tire of Example 5-3 was manufactured in a similar manner to Example 5-1 except that, as an adhesive agent composition, an epoxy-based adhesive agent composition (1-3) listed on the above-mentioned Table was used.

Comparative Example 5-1

A test tire of Comparative Example 5-1 was manufactured in a similar manner to Example 5-1 except that, after forming a cord by twisting a polyester filament composed of a similar polyester fiber to Comparative Example 1-1-1 in accordance with the conditions listed on the Table below, an adhesive agent treatment was performed using adhesive agent liquids (1-4) on the cord in a step illustrated in FIG. 11.

Comparative Example 5-2

A test tire of Comparative Example 5-2 was manufactured in a similar manner to Example 5-1 except that, after forming a cord by twisting a similar polyester filament to that used in Example 5-1, an adhesive agent treatment was performed on the cord using a similar adhesive agent composition to that used in Comparative Example 5-1.

Comparative Example 5-3

A test tire of Comparative Example 5-3 was manufactured in a similar manner to Comparative Example 5-1 except that, after forming a cord by twisting a similar polyester filament to that used in Comparative Example 5-1, an adhesive agent treatment was performed on the cord using a similar adhesive agent composition to that used in Example 5-1, and an adhesive agent treatment was further performed on the cord using an RFL-based adhesive agent composition.

Comparative Example 5-4

A test tire of Comparative Example 5-4 was manufactured in a similar manner to Example 5-1 except that a similar polyester filament composed of polyester fiber to that of Comparative Example 1-1-2 was used.

Examples 5-4 to 5-10

Test tires of Examples 5-4 to 5-10 were manufactured in a similar manner to Example 5-1 except that the conditions of the polyester cord were changed as listed on the Table below.

Example 5-11

A test tire of Example 5-11 was manufactured in a similar manner to Example 5-1 except that the cord angle of the reinforcing cord layer was 30° with respect to the tire radial direction.

For each obtained test tire, the riding comfort, the run-flat drum durability, irregularity on a side portion and the cut performance were evaluated in accordance with the following. The obtained results are listed on the Table below in combination.

<Riding Comfort>

Each test tire was inflated to an inner pressure of 230 kPa, the load-distortion curve was determined, and a vertical spring constant with respect to the load was calculated by the slope of a tangent on the obtained load-distortion curve at a certain load. The results were expressed as indices setting the value of vertical spring constant of the tire in Comparative Example 5-4 to 100. The larger the index value, the larger the vertical spring constant, which means bad riding comfort.

<Run-Flat Drum Durability>

Without inflating each test tire to an inner pressure, the tire was allowed to travel on a drum under conditions, a load of 4.17 kN, a speed of 89 km/h, and a temperature of 38° C., and then, the travel distance until failure of the tire occurred was measured and expressed as an index setting the distance in Comparative Example 5-4 to 100. The larger the index value, the longer the travel distance until failure of the tire occurred, which means an excellent run-flat durability. At the same time, breaking pattern was observed at the time of failure.

<Irregularity of Side Portion>

For each test tire, a hollow was evaluated by measuring the irregularity of tire side portion using a laser when the inner pressure was 180 kPa and digitizing the peak values. The results were expressed as indices setting the value in Comparative Example 5-4 to 100. The larger the value, the larger the hollow, which is a bad result.

<Cut Performance>

Each test tire was mounted to a prescribed rim, and the tire is inflated to a prescribed inner pressure. Thereafter, a convex protrusion, the tip of which had a radius of curvature of R=10 (mm), was pressed on the side portion to measure a work required for the side portion to be cut. The results were indicated as an index setting the work required for side cut of the tire of the Comparative Example 5-4 to 100. The larger the value, the better the side cut performance.

TABLE 15

|  | Comparative Example 5-1 | Comparative Example 5-2 | Comparative Example 5-3 | Comparative Example 5-4 |
|---|---|---|---|---|
| Cord structure (dtex/cord) | 1100/2 | 1100/2 | 1100/2 | 1100/2 |
| The amount of carboxy group terminal | Low | High | Low | Low |
| Presence or absence of Surface treatment of polyester filament | Absent | Present | Absent | Present |
| Adhesive agent composition | (1-4) | (1-4) | (1-1) | (1-1) |
| The number of twist (/10 cm) | 50 × 50 | 50 × 50 | 50 × 50 | 50 × 50 |
| Twisting coefficient Nt(—) | 0.50 | 0.50 | 0.50 | 0.50 |
| Cord angle of reinforcing cord layer(°) | 0 | 0 | 0 | 0 |
| Riding comfort (index) | 100 | 100 | 100 | 100 |
| Run-flat durability (index) | 80 | 85 | 90 | 100 |
| Run-flat durability breaking pattern | Reinforcing cord layer separation | Reinforcing cord layer separation | Reinforcing cord layer separation | Reinforcing cord layer separation |
| Side irregularity (index) | 100 | 100 | 100 | 100 |
| Cut performance (index) | 100 | 100 | 100 | 100 |

TABLE 16

|  | Example 5-1 | Example 5-2 | Example 5-3 | Example 5-4 | Example 5-5 | Example 5-6 |
|---|---|---|---|---|---|---|
| Cord structure (dtex/cord) | 1100/2 | 1100/2 | 1100/2 | 1100/2 | 1100/2 | 1100/2 |
| The amount of carboxy group terminal | High | High | High | High | High | High |
| Presence or absence of Surface treatment of polyester filament | Present | Present | Present | Present | Present | Present |
| Adhesive agent composition | (1-1) | (1-2) | (1-3) | (1-1) | (1-1) | (1-1) |
| The number of twist (/10 cm) | 50 × 50 | 50 × 50 | 50 × 50 | 18 × 18 | 59 × 59 | 22 × 22 |
| Twisting coefficient Nt(—) | 0.50 | 0.50 | 0.50 | 0.18 | 0.59 | 0.22 |
| Cord angle of reinforcing cord layer(°) | 0 | 0 | 0 | 0 | 0 | 0 |
| Riding comfort (index) | 100 | 100 | 100 | 100 | 100 | 100 |
| Run-flat durability (index) | 165 | 180 | 162 | 142 | 147 | 165 |
| Run-flat durability breaking pattern | No reinforcing cord layer separation | No reinforcing cord layer separation | No reinforcing cord layer separation | No reinforcing cord layer separation | No reinforcing cord layer separation | No reinforcing cord layer separation |
| Side irregularity (index) | 100 | 100 | 100 | 100 | 100 | 100 |
| Cut performance (index) | 100 | 100 | 100 | 100 | 98 | 100 |

TABLE 17

|  | Example 5-7 | Example 5-8 | Example 5-9 | Example 5-10 | Example 5-11 |
|---|---|---|---|---|---|
| Cord structure (dtex/cord) | 1100/2 | 940/2 | 2200/3 | 1670/3 | 1100/2 |
| The amount of carboxy group terminal | High | High | High | High | High |
| Presence or absence of Surface treatment of polyester filament | Present | Present | Present | Present | Present |
| Adhesive agent composition | (1-1) | (1-1) | (1-1) | (1-1) | (1-1) |
| The number of twist (/10 cm) | 54 × 54 | 54 × 54 | 29 × 29 | 33 × 33 | 50 × 50 |
| Twisting coefficient Nt(—) | 0.54 | 0.50 | 0.50 | 0.50 | 0.50 |
| Cord angle of reinforcing cord layer(°) | 0 | 0 | 0 | 0 | 30 |
| Riding comfort (index) | 100 | 100 | 100 | 100 | 110 |
| Run-flat durability (index) | 160 | 150 | 150 | 160 | 165 |
| Run-flat durability breaking pattern | No reinforcing cord layer separation | No reinforcing cord layer separation | No reinforcing cord layer separation | No reinforcing cord layer separation | No reinforcing cord layer separation |
| Side irregularity (index) | 100 | 100 | 106 | 100 | 100 |
| Cut performance (index) | 100 | 95 | 100 | 100 | 100 |

As shown in the above-mentioned Table, it was confirmed that, in a test tire of each of the Examples, the occurrence of delamination fracture of a reinforcing cord layer was inhibited without compromising other performances, thereby improving the run-flat durability performance.

Example 6-1-1

Preparation of Adhesive Agent Composition

An RFL adhesive agent liquid (2-1) was prepared by the formulation listed on the Table below, and the adhesive agent liquid was diluted and adjusted such that 20% by mass of an aqueous adhesive agent liquid in the above-mentioned ratio was obtained. The blocked isocyanate compound was added after an RFL adhesive agent liquid was mixed and aged at 20° C. for 24 hours, immediately before use. The blocked isocyanate compound used was manufactured by Dai-ichi Kogyo Seiyaku Co., Ltd.: ELASTRON BN69 (blocking agent dissociating temperature 120° C.) and BN27 (blocking agent dissociating temperature 180° C.). Latex was experimentally made by emulsion polymerization.

After forming a cord by twisting a polyester filament composed of the polyester fiber obtained in a similar manner to Example 1-1 in accordance with the conditions listed on the Table below, the cord was subjected to an adhesive agent treatment in a step illustrated in FIG. 11 by using an adhesive agent liquid (2-1) on the cord to obtain a tire reinforcing polyester cord.

The obtained polyester cord for reinforcing tire was rubberized, a treat having an end count of 50/50 mm was manufactured, and then the treat was applied to a cap layer and a layered layer of a tire having a tire size of 205/65R15 to manufacture a test tire of Example 6-1-1. The test tire comprises a carcass composed of one carcass ply (material: PET) extending toroidally between a pair of left-and-right bead cores as a skeleton, two belts (material: steel) arranged crossing each other at angles of ±40° with respect to the tire circumferential direction on the outside of the carcass in the tire radial direction, a cap layer arranged across the full width of a belt or more, and a layered layer belt arranged on both end portions of the belt.

TABLE 18

|  |  | Adhesive agent liquid | | | |
|---|---|---|---|---|---|
|  |  | (2-1) | (2-2) | (2-3) | (2-4) |
| Adhesive agent liquid formulation (mass ratio) | Resorcin | 8 | 16 | 16 | 8 |
|  | Formaldehyde | 4 | 8 | 8 | 4 |
|  | Latex | 100 | 100 | 100 | 100 |
|  | Catalyst  Caustic soda | 0 | 0 | 0 | 0 |
|  |       Ammonia | 4 | 2 | 2 | 4 |
|  | Blocked isocyanate compound | 80 | 30 | 50 | 6 |
| Catalyst/resorcin (molar ratio) |  | 3.2 | 0.8 | 0.8 | 3.2 |
| Isocyanate compound ratio in adhesive agent (% by mass) |  | 41 | 19 | 28 | 5 |
| Rubber latex composition (% by mass) | Core ratio | 70 | 70 | 0 | 0 |
|  | Core vinylpyridine | 10 | 10 | 0 | 0 |
|  | Core styrene | 55 | 55 | 0 | 0 |
|  | Core butadiene | 35 | 35 | 0 | 0 |
|  | Shell ratio | 30 | 30 | 100 | 100 |
|  | Shell vinylpyridine | 15 | 15 | 15 | 15 |
|  | Shell styrene | 15 | 15 | 15 | 15 |
|  | Shell butadiene | 70 | 70 | 70 | 70 |
| Isocyanate compound | Blocking agent dissociating temperature (° C.) | 180 | 180 | 180 | 180 |
|  | Drying temperature (° C.) | 180 | 180 | 180 | 180 |

Example 6-1-2

A test tire of Example 6-1-2 was manufactured in a similar manner to Example 6-1-1 except that, as an adhesive agent composition, an adhesive agent liquid (2-2) prepared in a similar manner to the above-mentioned adhesive agent liquid (2-1) was used.

Example 6-1-3

A test tire of Example 6-1-3 was manufactured in a similar manner to Example 6-1-1 except that, as an adhesive agent composition, an adhesive agent liquid (2-3) prepared in a similar manner to the above-mentioned adhesive agent liquid (2-1) was used.

Comparative Example 6-1-1

A test tire of Comparative Example 6-1-1 was manufactured in a similar manner to Example 6-1-1 except that a similar polyester filament composed of polyester fiber to that of Comparative Example 1-1-1 was used.

Comparative Example 6-1-2

A test tire of Comparative Example 6-1-2 was manufactured in a similar manner to Example 6-1-1 except that, as an adhesive agent composition, an adhesive agent liquid (2-4) prepared in a similar manner to the above-mentioned adhesive agent liquid (2-1) was used.

Comparative Example 6-1-3

A test tire of Comparative Example 6-1-3 was manufactured in a similar manner to Example 6-1-1 except that a similar polyester filament composed of polyester fiber to that of Comparative Example 1-1-2 was used.

For each obtained test tire, the dynamic adhesive property and the high-speed drum durability were evaluated in accordance with the following. The obtained results are listed on the Table below.

<Dynamic Adhesive Property>

The dynamic adhesive strength was evaluated in a similar manner as above. The results were expressed as indices setting the distance in Comparative Example 6-1-1 to 100. The larger the value, the more excellent the dynamic adhesive property, which is preferred.

<High-Speed Drum Durability>

To each test tire, 200% load which is the maximum load condition in JATMA was applied, the tire was allowed to travel on a drum, and then, the travel distance until failure of the tire occurred was expressed as an index setting the distance in Comparative Example 6-1-1 to 100. The larger the value, the better the result. At the same time, breaking pattern was observed at the time of failure.

TABLE 19

|  | Example 6-1-1 | Example 6-1-2 | Example 6-1-3 | Comparative Example 6-1-1 | Comparative Example 6-1-2 | Comparative Example 6-1-3 |
| --- | --- | --- | --- | --- | --- | --- |
| Cord structure (dtex/cord) | 1100/2 | 1100/2 | 1100/2 | 1100/2 | 1100/2 | 1100/2 |
| The amount of carboxy group terminal | High | High | High | Low | High | Low |
| Presence or absence of Surface treatment of polyester filament | Present | Present | Present | Absent | Present | Present |
| Adhesive agent liquid composition | (2-1) | (2-2) | (2-3) | (2-1) | (2-4) | (2-1) |
| The number of twist (/10 cm) | 30 × 30 | 30 × 30 | 30 × 30 | 30 × 30 | 30 × 30 | 30 × 30 |
| Dynamic adhesive property (index) | 170 | 160 | 165 | 100 | 85 | 105 |
| High-speed drum durability (index) | 160 | 160 | 160 | 100 | 90 | 105 |
| High-speed drum breaking pattern | Chunk in tread rubber | Chunk in tread rubber | Chunk in tread rubber | Separation failure between cap layer and tread over the entire circumference | Separation failure between cap layer and tread over the entire circumference | Separation failure between cap layer and tread over the entire circumference |

As shown in the above-mentioned Table, it was confirmed that, in the tire of the Example, the occurrence of failure originating from the cap layer or the layered layer was effectively inhibited, thereby improving the high-speed drum durability.

Example 6-2-1

After forming a cord by twisting the polyester filament obtained in a similar manner to Example 6-1-1 in accordance with the conditions listed on the Table below, the cord was subjected to an adhesive agent treatment by using a similar adhesive agent liquid (2-1) to that used in Example 6-1-1 to obtain a tire reinforcing polyester cord.

The obtained polyester cord for reinforcing a tire was rubberized, and a treat having an end count of 50/50 mm was manufactured, and then the treat was applied to a carcass ply of a tire having a tire size of 225/55R16 to manufacture a test tire of Example 6-2-1. The test tire comprises a carcass composed of one carcass plies extending toroidally between a pair of left-and-right bead cores as a skeleton, two belts (material: steel) arranged crossing each other at angles of ±40° with respect to the tire circumferential direction on the outside of the carcass in the tire radial direction.

Example 6-2-2

A test tire of Example 6-2-2 was manufactured in a similar manner to Example 6-2-1 except that, as an adhesive agent composition, an adhesive agent liquid (2-2) prepared in a similar manner to the above-mentioned adhesive agent liquid (2-1) was used.

Example 6-2-3

A test tire of Example 6-2-3 was manufactured in a similar manner to Example 6-2-1 except that, as an adhesive agent composition, an adhesive agent liquid (2-3) prepared in a similar manner to the above-mentioned adhesive agent liquid (2-1) was used.

Comparative Example 6-2-1

A test tire of Comparative Example 6-2-1 was manufactured in a similar manner to Example 6-2-1 except that a similar polyester filament composed of polyester fiber to that of Comparative Example 6-1-1 was used.

Comparative Example 6-2-2

A test tire of Comparative Example 6-2-2 was manufactured in a similar manner to Example 6-2-1 except that, as an adhesive agent composition, an adhesive agent liquid (2-4) prepared in a similar manner to the above-mentioned adhesive agent liquid (2-1) was used.

Comparative Example 6-2-3

A test tire of Comparative Example 6-2-3 was manufactured in a similar manner to Example 6-2-1 except that a similar polyester filament composed of polyester fiber to that of Comparative Example 6-1-3 was used.

For each obtained test tire, the dynamic adhesive property was evaluated in the same manner as above (Comparative Example 6-2-1 was used as a standard), and at the same time, the high-speed drum durability when a camber angle is provided was evaluated in accordance with the following. The obtained results are listed on the Table below.

<High-Speed Drum Durability (when Camber Angle was Provided)>

To each test tire, 200% load which is the maximum load condition in JATMA was applied, the tire was allowed to travel on a drum when camber angle 4.0° was provided, and then, the travel distance until failure of the tire occurred was expressed as an index setting the distance in Comparative Example 6-2-1 to 100. The larger the value, the better the result. At the same time, breaking pattern was observed at the time of failure.

TABLE 20

|  | Example 6-2-1 | Example 6-2-2 | Example 6-2-3 | Comparative Example 6-2-1 | Comparative Example 6-2-2 | Comparative Example 6-2-3 |
|---|---|---|---|---|---|---|
| Cord structure (dtex/cord) | 1670/2 | 1670/2 | 1670/2 | 1670/2 | 1670/2 | 1670/2 |
| The amount of carboxy group terminal | High | High | High | Low | High | Low |
| Presence or absence of Surface treatment of polyester filament | Present | Present | Present | Absent | Present | Present |
| Adhesive agent liquid composition | (2-1) | (2-2) | (2-3) | (2-1) | (2-4) | (2-1) |
| The number of twist (/10 cm) | 40 × 40 | 40 × 40 | 40 × 40 | 40 × 40 | 40 × 40 | 40 × 40 |
| Dynamic adhesive property (index) | 170 | 160 | 165 | 100 | 85 | 105 |
| High-speed drum durability (index) | 160 | 160 | 160 | 100 | 90 | 105 |
| High-speed drum breaking pattern | Tread failure | Tread failure | Tread failure | Shoulder failure | Shoulder failure | Shoulder failure |

As shown in the above-mentioned Table, it was confirmed that, in the tire of Example, breaking of the shoulder portion was prevented, thereby improving the high-speed drum durability.

Example 6-3-1

After forming a cord by twisting the polyester filament obtained in a similar manner to Example 6-1-1 in accordance with the conditions listed on the Table below, the cord was subjected to an adhesive agent treatment by using a similar adhesive agent liquid (2-1) to that used in Example 6-1-1 to obtain a tire reinforcing polyester cord.

The obtained polyester cord for reinforcing a tire was rubberized, and a treat having an end count of 50/50 mm was manufactured, and then the treat was applied to an insert of a tire having a tire size of 245/45R19 to manufacture a test tire of Example 6-3-1. The test tire comprises a carcass composed of two carcass plies (material: PET) extending toroidally between a pair of left-and-right bead cores as a skeleton, two belts (material: steel) arranged crossing each other at angles of ±40° with respect to the tire circumferential direction on the outside of the carcass in the tire radial direction. The insert was arranged on the outside of the carcass ply at a bead portion.

Example 6-3-2

A test tire of Example 6-3-2 was manufactured in a similar manner to Example 6-3-1 except that, as an adhesive agent composition, an adhesive agent liquid (2-2) prepared in a similar manner to the above-mentioned adhesive agent liquid (2-1) was used.

Example 6-3-3

A test tire of Example 6-3-3 was manufactured in a similar manner to Example 6-3-1 except that, as an adhesive agent composition, an adhesive agent liquid (2-3) prepared in a similar manner to the above-mentioned adhesive agent liquid (2-1) was used.

Comparative Example 6-3-1

A test tire of Comparative Example 6-3-1 was manufactured in a similar manner to Example 6-3-1 except that a similar polyester filament composed of polyester fiber to that of Comparative Example 6-1-1 was used.

Comparative Example 6-3-2

A test tire of Comparative Example 6-3-2 was manufactured in a similar manner to Example 6-3-1 except that, as an adhesive agent composition, an adhesive agent liquid (2-4) prepared in a similar manner to the above-mentioned adhesive agent liquid (2-1) was used.

Comparative Example 6-3-3

A test tire of Comparative Example 6-3-3 was manufactured in a similar manner to Example 6-3-1 except that a similar polyester filament composed of polyester fiber to that of Comparative Example 6-1-3 was used.

For each obtained test tire, the dynamic adhesive property was evaluated in the same manner as above (Comparative Example 6-3-1 was used as a standard), and at the same time, the bead portion durability drum test was performed in accordance with the following. The obtained results are listed on the Table below.

<Bead Portion Durability Drum Test>

Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 6-3-1 to 100. The larger the value, the better the result. At the same time, breaking pattern was observed at the time of failure. When the adhesive strength of the insert member is low, separation at a adhesion portion occurs first, thereby reducing the drum travel distance. On the other hand, when the adhesive strength of the insert member is high, a failure nuclei is changed to a turn-up portion of the carcass ply, thereby improving drum travel distance.

TABLE 21

|  | Example 6-3-1 | Example 6-3-2 | Example 6-3-3 | Comparative Example 6-3-1 | Comparative Example 6-3-2 | Comparative Example 6-3-3 |
| --- | --- | --- | --- | --- | --- | --- |
| Cord structure (dtex/cord) | 1100/2 | 1100/2 | 1100/2 | 1100/2 | 1100/2 | 1100/2 |
| The amount of carboxy group terminal | High | High | High | Low | High | Low |
| Presence or absence of Surface treatment of polyester filament | Present | Present | Present | Absent | Present | Present |
| Adhesive agent liquid composition | (2-1) | (2-2) | (2-3) | (2-1) | (2-4) | (2-1) |
| The number of twist (/10 cm) | 30 × 30 | 30 × 30 | 30 × 30 | 30 × 30 | 30 × 30 | 30 × 30 |
| Dynamic adhesive property (index) | 170 | 160 | 165 | 100 | 85 | 105 |
| Bead portion durability drum (index) | 160 | 160 | 160 | 100 | 90 | 105 |
| Bead portion durability drum breaking pattern | Bead portion failure | Bead portion failure | Bead portion failure | Insert portion separation failure | Insert portion separation failure | Insert portion separation failure |

As shown in the above-mentioned Table, it was confirmed that, in a tire of the Example, the occurrence of failure originating from separation of an insert is effectively inhibited, thereby improving the durability.

From the above-mentioned results, it was confirmed that, compared with a conventional polyester cord, a polyester cord of the present invention had an excellent heat resistant adhesive property with rubber, and that, by using the cord, a tire whose durability was improved can be attained.

Example 7-1

After forming a cord by twisting a polyester filament composed of the polyester fiber obtained in a similar manner to Example 1-1 in accordance with the conditions listed on the Table below, the cord was subjected to an adhesive agent treatment by using an adhesive agent liquid (2-1) in a step illustrated in FIG. 11, to obtain a tire reinforcing polyester cord.

The obtained polyester cord for reinforcing a tire was rubberized, and a treat having an end count of 50/50 mm was manufactured, and then the treat was applied to a carcass ply of a tire having a tire size of 225/55R16 to manufacture a test tire of Example 7-1. The test tire comprises a carcass composed of one carcass ply extending toroidally between a pair of left-and-right bead cores as a skeleton, two belts (material: steel) arranged crossing each other at angles of ±40° with respect to the tire circumferential direction on the outside of the carcass in the tire radial direction.

Example 7-2

A test tire of Example 7-2 was manufactured in a similar manner to Example 7-1 except that, as an adhesive agent composition, an adhesive agent liquid (2-2) prepared in a similar manner to the above-mentioned adhesive agent liquid (2-1) was used.

Example 7-3

A test tire of Example 7-3 was manufactured in a similar manner to Example 7-1 except that, as an adhesive agent composition, an adhesive agent liquid (2-3) prepared in a similar manner to the above-mentioned adhesive agent liquid (2-1) was used.

Comparative Example 7-1

After forming a cord by twisting a polyester filament composed of a similar polyester fiber to Comparative Example 1-1-1 in accordance with the conditions listed on the Table below, an adhesive agent treatment was performed using an adhesive agent liquid (2-4) prepared in a similar manner to the above-mentioned adhesive agent liquid (2-1) on the cord, thereby obtaining a tire reinforcing polyester cord of Comparative Example 7-1.

Comparative Example 7-2

A test tire of Comparative Example 7-2 was manufactured in a similar manner to Example 7-1 except that, after forming a cord by twisting a similar polyester filament to that used in Example 7-1, an adhesive agent treatment was performed on the cord using a similar adhesive agent composition to that used in Comparative Example 7-1.

Comparative Example 7-3

A test tire of Comparative Example 7-2 was manufactured in a similar manner to Example 7-1 except that, after forming a cord by twisting a similar polyester filament to that used in Comparative Example 7-1, an adhesive agent treatment was performed on the cord using a similar adhesive agent composition to that used in Example 7-1, and an adhesive agent treatment was further performed on the cord using an RFL-based adhesive agent composition.

Comparative Example 7-4

A test tire of Comparative Example 7-4 was manufactured in a similar manner to Example 7-1 except that a similar polyester filament composed of polyester fiber to that of Comparative Example 1-1-2 was used.

Examples 7-4 to 7-10

Test tires of Examples 7-4 to 7-10 were manufactured in a similar manner to Example 7-1 except that the conditions of the polyester cord were changed as listed on the Table below.

For each obtained test tire, the high-speed drum durability, irregularity on a side portion, the bead portion drum durability and the cut performance when a camber angle is provided were evaluated in accordance with the following. The obtained results are listed on the Table below in combination.

<High-Speed Drum Durability (when Camber Angle was Provided)>

To each test tire, 200% load which is the maximum load condition in JATMA was applied, the tire was allowed to travel on a drum when camber angle 4.0° was provided, and then, the travel distance until failure of the tire occurred was expressed as an index setting the distance in Comparative Example 7-4 to 100. The larger the value, the better the result. At the same time, breaking pattern was observed at the time of failure.

<Irregularity of Side Portion>

For each test tire, a hollow was evaluated by measuring the irregularity of tire side portion using a laser when the inner pressure was 180 kPa and digitizing the peak values. The results were expressed as indices setting the value in Comparative Example 7-4 to 100. The larger the value, the larger the hollow, which is a bad result.

<Bead Portion Durability Drum Test>

Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 7-4 to 100. The larger the value, the better the result.

<Cut Performance>

Each test tire was mounted to a prescribed rim, and the tire is inflated to a prescribed inner pressure. Thereafter, a convex protrusion, the tip of which had a radius of curvature of R=10 (mm), was pressed on the side portion to measure a work required for the side portion to be cut. The results were indicated as an index setting the work required for side cut of the tire of the Comparative Example 7-4 to 100. The larger the value, the better the side cut performance.

TABLE 22

|  | Comparative Example 7-1 | Comparative Example 7-2 | Comparative Example 7-3 | Comparative Example 7-4 |
|---|---|---|---|---|
| Cord structure (dtex/cord) | 1100/2 | 1100/2 | 1100/2 | 1100/2 |
| The amount of carboxy group terminal | Low | High | Low | Low |

TABLE 22-continued

|  | Comparative Example 7-1 | Comparative Example 7-2 | Comparative Example 7-3 | Comparative Example 7-4 |
|---|---|---|---|---|
| Presence or absence of Surface treatment of polyester filament | Absent | Present | Absent | Present |
| Adhesive agent liquid composition | (2-4) | (2-4) | (2-1) | (2-1) |
| The number of twist (/10 cm) | 50 × 50 | 50 × 50 | 50 × 50 | 50 × 50 |
| Twisting coefficient Nt(—) | 0.50 | 0.50 | 0.50 | 0.50 |
| High-speed drum durability (index) | 80 | 85 | 90 | 100 |
| High-speed drum breaking pattern | Carcass separation | Carcass separation | Carcass separation | Carcass separation |
| Side irregularity (index) | 100 | 100 | 100 | 100 |
| Bead portion drum durability (index) | 100 | 100 | 100 | 100 |
| Cut performance (index) | 100 | 100 | 100 | 100 |

TABLE 23

|  | Example 7-1 | Example 7-2 | Example 7-3 | Example 7-4 | Example 7-5 |
|---|---|---|---|---|---|
| Cord structure (dtex/cord) | 1100/2 | 1100/2 | 1100/2 | 1100/2 | 1100/2 |
| The amount of carboxy group terminal | High | High | High | High | High |
| Presence or absence of Surface treatment of polyester filament | Present | Present | Present | Present | Present |
| Adhesive agent liquid composition | (2-1) | (2-2) | (2-3) | (2-1) | (2-1) |
| The number of twist (/10 cm) | 50 × 50 | 50 × 50 | 50 × 50 | 38 × 38 | 56 × 56 |
| Twisting coefficient Nt(—) | 0.50 | 0.50 | 0.50 | 0.38 | 0.55 |
| High-speed drum durability (index) | 172 | 162 | 165 | 165 | 158 |
| High-speed drum breaking pattern | No carcass separation | No carcass separation | No carcass separation | No carcass separation | No carcass separation |
| Side irregularity (index) | 100 | 100 | 100 | 100 | 100 |
| Bead portion drum durability (index) | 100 | 100 | 100 | 90 | 100 |
| Cut performance (index) | 100 | 100 | 100 | 103 | 95 |

TABLE 24

|  | Example 7-6 | Example 7-7 | Example 7-8 | Example 7-9 | Example 7-10 |
|---|---|---|---|---|---|
| Cord structure (dtex/cord) | 1100/2 | 1100/2 | 940/2 | 2200/3 | 1670/3 |
| The amount of carboxy group terminal | High | High | High | High | High |
| Presence or absence of Surface treatment of polyester filament | Present | Present | Present | Present | Present |
| Adhesive agent liquid composition | (2-1) | (2-1) | (2-1) | (2-1) | (2-1) |
| The number of twist (/10 cm) | 42 × 42 | 54 × 54 | 54 × 54 | 29 × 29 | 33 × 33 |
| Twisting coefficient Nt(—) | 0.42 | 0.54 | 0.50 | 0.50 | 0.50 |
| High-speed drum durability (index) | 165 | 160 | 150 | 150 | 160 |
| High-speed drum breaking pattern | No carcass separation | No carcass separation | No carcass separation | No carcass separation | No carcass separation |
| Side irregularity (index) | 100 | 100 | 100 | 106 | 100 |
| Bead portion drum durability (index) | 100 | 100 | 100 | 100 | 100 |
| Cut performance (index) | 100 | 100 | 95 | 100 | 100 |

As shown in the above-mentioned Table, it was confirmed that, in a test tire of each of the Examples, the occurrence of delamination fracture of a carcass ply was inhibited in a high-speed durability performance test when camber angle was provided without compromising other performances, thereby improving the high-speed durability performance.

Example 8-1

After forming a cord by twisting a polyester filament composed of the polyester fiber obtained in a similar manner to Example 1-1 in accordance with the conditions listed on the Table below, the cord was subjected to an adhesive agent treatment by using an adhesive agent liquid (2-1) in a step illustrated in FIG. 11, to obtain a tire reinforcing polyester cord.

The obtained polyester cord for reinforcing a tire was rubberized, and a treat having an end count of 50/50 mm was manufactured, and then the treat was applied to a carcass ply of a run-flat tire having a tire size of 245/45R19 to manufacture a test tire of Example 8-1. The test tire comprises a pair of left-and-right bead portions, a pair of side wall portions each continuing from the bead portion to the outside in the tire radial direction, a tread portion bridging between the pair of side wall portions to form a contacting portion, and further comprising a carcass composed of two carcass plies extending toroidally between the pair of bead portions to reinforce each of these portions, and a side reinforcing rubber layer having a crescent shaped cross-section arranged inside the carcass at the side wall portion, wherein the carcass ply is composed of the reinforcing member. The test tire comprised, on the outside in the tire radial direction of a crown portion of the carcass, a belt (material: steel) composed of two belt layers arranged crossing each other at angles of ±40° with respect to the tire circumferential direction, and, one cap layer covering the whole belt and a pair of layered layers (material: nylon) covering only both the end portions of the belt.

Example 8-2

A test tire of Example 8-2 was manufactured in a similar manner to Example 8-1 except that, as an adhesive agent composition, an adhesive agent liquid (2-2) prepared in a similar manner to the above-mentioned adhesive agent liquid (2-1) was used.

Example 8-3

A test tire of Example 8-3 was manufactured in a similar manner to Example 8-1 except that, as an adhesive agent composition, an adhesive agent liquid (2-3) prepared in a similar manner to the above-mentioned adhesive agent liquid (2-1) was used.

Comparative Example 8-1

After forming a cord by twisting a polyester filament composed of a similar polyester fiber to Comparative Example 1-1-1 in accordance with the conditions listed on the Table below, an adhesive agent treatment was performed using an adhesive agent liquid (2-4) prepared in a similar manner to the above-mentioned adhesive agent liquid (2-1) on the cord, thereby obtaining a tire reinforcing polyester cord of Comparative Example 8-1.

Comparative Example 8-2

A test tire of Comparative Example 8-2 was manufactured in a similar manner to Example 8-1 except that, after forming a cord by twisting a similar polyester filament to that used in Example 8-1, an adhesive agent treatment was performed on the cord using a similar adhesive agent composition to that used in Comparative Example 8-1.

Comparative Example 8-3

A test tire of Comparative Example 8-3 was manufactured in a similar manner to Comparative Example 8-1 except that, after forming a cord by twisting a similar polyester filament to that used in Comparative Example 8-1, an adhesive agent treatment was performed on the cord using a similar adhesive agent composition to that used in Example 8-1.

Comparative Example 8-4

A test tire of Comparative Example 8-4 was manufactured in a similar manner to Example 8-1 except that a similar polyester filament composed of polyester fiber to that of Comparative Example 1-1-2 was used.

Examples 8-4 to 8-10

Test tires of Examples 8-4 to 8-10 were manufactured in a similar manner to Example 8-1 except that the conditions of the polyester cord were changed as listed on the Table below.

For each obtained test tire, the run-flat drum durability, irregularity on a side portion, the bead portion drum durability and the cut performance were evaluated in accordance with the following. The obtained results are listed on the Table below in combination.

<Run-Flat Drum Durability>

Without inflating each test tire to an inner pressure, the tire was allowed to travel on a drum under conditions, a load of 4.17 kN, a speed of 89 km/h, and a temperature of 38° C., and then, the travel distance until failure of the tire occurred was measured and expressed as an index setting the distance in Comparative Example 8-4 to 100. The larger the index value, the longer the travel distance until failure of the tire occurred, which means an excellent run-flat durability. At the same time, breaking pattern was observed at the time of failure.

<Irregularity of Side Portion>

For each test tire, a hollow was evaluated by measuring the irregularity of tire side portion using a laser when the inner pressure was 180 kPa and digitizing the peak values. The results were expressed as indices setting the value in Comparative Example 8-4 to 100. The larger the value, the larger the hollow, which is a bad result.

<Bead Portion Durability Drum Test>

Each test tire was allowed to travel on a drum under a high inner pressure and high load condition, under an inner pressure of 400 kPa and an load of 5.0 kN, and the durability was evaluated by the travel distance until the failure of a bead portion occurred. The result was expressed as an index setting the distance of Comparative Example 8-4 to 100. The larger the value, the better the result.

<Cut Performance>

Each test tire was mounted to a prescribed rim, and the tire is inflated to a prescribed inner pressure. Thereafter, a convex protrusion, the tip of which had a radius of curvature of R=10 (mm), was pressed on the side portion to measure a work required for the side portion to be cut. The results were indicated as an index setting the work required for side cut of the tire of the Comparative Example 8-4 to 100. The larger the value, the better the side cut performance.

TABLE 25

|  | Comparative Example 8-1 | Comparative Example 8-2 | Comparative Example 8-3 | Comparative Example 8-4 |
|---|---|---|---|---|
| Cord structure (dtex/cord) | 1100/2 | 1100/2 | 1100/2 | 1100/2 |
| The amount of carboxy group terminal | Low | High | Low | Low |
| Presence or absence of Surface treatment of polyester filament | Absent | Present | Absent | Present |
| Adhesive agent liquid composition | (2-4) | (2-4) | (2-1) | (2-1) |
| The number of twist (/10 cm) | 50 × 50 | 50 × 50 | 50 × 50 | 50 × 50 |
| Twisting coefficient Nt(—) | 0.50 | 0.50 | 0.50 | 0.50 |
| Run-flat durability (index) | 80 | 85 | 90 | 100 |
| Run-flat durability breaking pattern | Carcass separation | Carcass separation | Carcass separation | Carcass separation |
| Side irregularity (index) | 100 | 100 | 100 | 100 |
| Bead portion drum durability (index) | 100 | 100 | 100 | 100 |
| Cut performance (index) | 100 | 100 | 100 | 100 |

TABLE 26

|  | Example 8-1 | Example 8-2 | Example 8-3 | Example 8-4 | Example 8-5 |
|---|---|---|---|---|---|
| Cord structure (dtex/cord) | 1100/2 | 1100/2 | 1100/2 | 1100/2 | 1100/2 |
| The amount of carboxy group terminal | High | High | High | High | High |
| Presence or absence of Surface treatment of polyester filament | Present | Present | Present | Present | Present |
| Adhesive agent liquid composition | (2-1) | (2-2) | (2-3) | (2-1) | (2-1) |
| The number of twist (/10 cm) | 50 × 50 | 50 × 50 | 50 × 50 | 38 × 38 | 56 × 56 |
| Twisting coefficient Nt(—) | 0.50 | 0.50 | 0.50 | 0.38 | 0.56 |
| Run-flat durability (index) | 172 | 162 | 165 | 172 | 158 |
| Run-flat durability breaking pattern | No carcass separation | No carcass separation | No carcass separation | No carcass separation | No carcass separation |
| Side irregularity (index) | 100 | 100 | 100 | 100 | 100 |
| Bead portion drum durability (index) | 100 | 100 | 100 | 90 | 100 |
| Cut performance (index) | 100 | 100 | 100 | 103 | 95 |

TABLE 27

|  | Example 8-6 | Example 8-7 | Example 8-8 | Example 8-9 | Example 8-10 |
|---|---|---|---|---|---|
| Cord structure (dtex/cord) | 1100/2 | 1100/2 | 940/2 | 2200/3 | 1670/3 |
| The amount of carboxy group terminal | High | High | High | High | High |
| Presence or absence of Surface treatment of polyester filament | Present | Present | Present | Present | Present |
| Adhesive agent liquid composition | (2-1) | (2-1) | (2-1) | (2-1) | (2-1) |
| The number of twist (/10 cm) | 42 × 42 | 54 × 54 | 54 × 54 | 29 × 29 | 33 × 33 |
| Twisting coefficient Nt(—) | 0.42 | 0.54 | 0.50 | 0.50 | 0.50 |
| Run-flat durability (index) | 172 | 160 | 150 | 150 | 160 |
| Run-flat durability breaking pattern | No carcass separation | No carcass separation | No carcass separation | No carcass separation | No carcass separation |
| Side irregularity (index) | 100 | 100 | 100 | 106 | 100 |
| Bead portion drum durability (index) | 100 | 102 | 100 | 100 | 100 |
| Cut performance (index) | 100 | 100 | 95 | 100 | 100 |

As shown in the above-mentioned Table, it was confirmed that, in a test tire of each of the Examples, the occurrence of delamination fracture of a carcass ply was inhibited without compromising other performances, thereby improving the run-flat durability performance.

Example 9-1

After forming a cord by twisting a polyester filament composed of the polyester fiber obtained in a similar manner to Example 1-1 in accordance with the conditions listed on the Table below, the cord was subjected to an adhesive agent treatment by using an adhesive agent liquid (2-1) in a step illustrated in FIG. 11, to obtain a tire reinforcing polyester cord.

The obtained polyester cord for reinforcing a tire was rubberized, and a treat having an end count of 50/50 mm was manufactured, and then the treat was applied to a reinforcing cord layer of a run-flat tire having a tire size of 245/45R19 to manufacture a test tire of Example 9-1. The test tire comprises a pair of left-and-right bead portions, a pair of side wall portions each continuing from the bead portion to the outside in the tire radial direction, a tread portion bridging between the pair of side wall portions to form a contacting portion, and further comprising a carcass composed of two carcass plies (material: rayon) extending toroidally between the pair of bead portions to reinforce each of these portions, and a side reinforcing rubber layer having a crescent shaped cross-section arranged inside the carcass at the side wall portion, wherein the carcass ply is composed of the reinforcing member. The test tire comprised, on the outside in the tire radial direction of a crown portion of the carcass, a belt (material: steel) composed of two belt layers arranged crossing each other at angles of ±40° with respect to the tire circumferential direction, and, one cap layer covering the whole belt and a pair of layered layers (material: nylon) covering only both the end portions of the belt. The cord angle of the reinforcing cord layer was 0° with respect to the tire radial direction, and the reinforcing cord layer was arranged at a position illustrated in FIG. 4.

Example 9-2

A test tire of Example 9-2 was manufactured in a similar manner to Example 9-1 except that, as an adhesive agent composition, an adhesive agent liquid (2-2) prepared in a similar manner to the above-mentioned adhesive agent liquid (2-1) was used.

Example 9-3

A test tire of Example 9-3 was manufactured in a similar manner to Example 9-1 except that, as an adhesive agent composition, an adhesive agent liquid (2-3) prepared in a similar manner to the above-mentioned adhesive agent liquid (2-1) was used.

Comparative Example 9-1

After forming a cord by twisting a polyester filament composed of a similar polyester fiber to Comparative Example 1-1-1 in accordance with the conditions listed on the Table below, an adhesive agent treatment was performed using an adhesive agent liquid (2-4) prepared in a similar manner to the above-mentioned adhesive agent liquid (2-1) on the cord, thereby obtaining a tire reinforcing polyester cord of Comparative Example 9-1.

Comparative Example 9-2

A test tire of Comparative Example 9-2 was manufactured in a similar manner to Example 9-1 except that, after forming a cord by twisting a similar polyester filament to that used in Example 9-1, an adhesive agent treatment was performed on the cord using a similar adhesive agent composition to that used in Comparative Example 9-1.

Comparative Example 9-3

A test tire of Comparative Example 9-3 was manufactured in a similar manner to Comparative Example 9-1 except that, after forming a cord by twisting a similar polyester filament to that used in Comparative Example 9-1, an adhesive agent treatment was performed on the cord using a similar adhesive agent composition to that used in Example 9-1, and an adhesive agent treatment was further performed on the cord using an RFL-based adhesive agent composition.

Comparative Example 9-4

A test tire of Comparative Example 9-4 was manufactured in a similar manner to Example 9-1 except that a similar polyester filament composed of polyester fiber to that of Comparative Example 1-1-2 was used.

Examples 9-4 to 9-10

Test tires of Examples 9-4 to 9-10 were manufactured in a similar manner to Example 9-1 except that the conditions of the polyester cord were changed as listed on the Table below.

Example 9-11

A test tire of Example 9-11 was manufactured in a similar manner to Example 9-1 except that the cord angle of the reinforcing cord layer was 30° with respect to the tire radial direction.

For each obtained test tire, the riding comfort, the run-flat drum durability, irregularity on a side portion and the cut performance were evaluated in accordance with the following. The obtained results are listed on the Table below in combination.

<Riding Comfort>

Each test tire was inflated to an inner pressure of 230 kPa, the load-distortion curve was determined, and a vertical spring constant with respect to the load was calculated by the slope of a tangent on the obtained load-distortion curve at a certain load. The results were expressed as indices setting the value of vertical spring constant of the tire in Comparative Example 9-4 to 100. The larger the index value, the larger the vertical spring constant, which means bad riding comfort.

<Run-Flat Drum Durability>

Without inflating each test tire to an inner pressure, the tire was allowed to travel on a drum under conditions, a load of 4.17 kN, a speed of 89 km/h, and a temperature of 38° C., and then, the travel distance until failure of the tire occurred was measured and expressed as an index setting the distance in Comparative Example 9-4 to 100. The larger the index value, the longer the travel distance until failure of the tire occurred, which means an excellent run-flat durability. At the same time, breaking pattern was observed at the time of failure.

<Irregularity of Side Portion>

For each test tire, a hollow was evaluated by measuring the irregularity of tire side portion using a laser when the inner pressure was 180 kPa and digitizing the peak values.

The results were expressed as indices setting the value in Comparative Example 9-4 to 100. The larger the value, the larger the hollow, which is a bad result.

<Cut Performance>

Each test tire was mounted to a prescribed rim, and the tire is inflated to a prescribed inner pressure. Thereafter, a convex protrusion, the tip of which had a radius of curvature of R=10 (mm), was pressed on the side portion to measure a work required for the side portion to be cut. The results were indicated as an index setting the work required for side cut of the tire of the Comparative Example 9-4 to 100. The larger the value, the better the side cut performance.

TABLE 28

|  | Comparative Example 9-1 | Comparative Example 9-2 | Comparative Example 9-3 | Comparative Example 9-4 |
|---|---|---|---|---|
| Cord structure (dtex/cord) | 1100/2 | 1100/2 | 1100/2 | 1100/2 |
| The amount of carboxy group terminal | Low | High | Low | Low |
| Presence or absence of Surface treatment of polyester filament | Absent | Present | Absent | Present |
| Adhesive agent liquid composition | (2-4) | (2-4) | (2-1) | (2-1) |
| The number of twist (/10 cm) | 50 × 50 | 50 × 50 | 50 × 50 | 50 × 50 |
| Twisting coefficient Nt(—) | 0.50 | 0.50 | 0.50 | 0.50 |
| Cord angle of reinforcing cord layer(°) | 0 | 0 | 0 | 0 |
| Riding comfort (index) | 100 | 100 | 100 | 100 |
| Run-flat durability (index) | 80 | 85 | 90 | 100 |
| Run-flat durability breaking pattern | reinforcing cord layer separation | reinforcing cord layer separation | reinforcing cord layer separation | reinforcing cord layer separation |
| Side irregularity (index) | 100 | 100 | 100 | 100 |
| Cut performance (index) | 100 | 100 | 100 | 100 |

TABLE 29

|  | Example 9-1 | Example 9-2 | Example 9-3 | Example 9-4 | Example 9-5 | Example 9-6 |
|---|---|---|---|---|---|---|
| Cord structure (dtex/cord) | 1100/2 | 1100/2 | 1100/2 | 1100/2 | 1100/2 | 1100/2 |
| The amount of carboxy group terminal | High | High | High | High | High | High |
| Presence or absence of Surface treatment of polyester filament | Present | Present | Present | Present | Present | Present |
| Adhesive agent liquid composition | (2-1) | (2-2) | (2-3) | (2-1) | (2-1) | (2-1) |
| The number of twist (/10 cm) | 50 × 50 | 50 × 50 | 50 × 50 | 18 × 18 | 59 × 59 | 22 × 22 |
| Twisting coefficient Nt(—) | 0.50 | 0.50 | 0.50 | 0.18 | 0.59 | 0.22 |
| Cord angle of reinforcing cord layer(°) | 0 | 0 | 0 | 0 | 0 | 0 |
| Riding comfort (index) | 100 | 100 | 100 | 95 | 102 | 98 |
| Run-flat durability (index) | 172 | 162 | 165 | 142 | 147 | 165 |
| Run-flat durability breaking pattern | no reinforcing cord layer separation | no reinforcing cord layer separation | no reinforcing cord layer separation | no reinforcing cord layer separation | no reinforcing cord layer separation | no reinforcing cord layer separation |
| Side irregularity (index) | 100 | 100 | 100 | 100 | 100 | 100 |
| Cut performance (index) | 100 | 100 | 100 | 100 | 98 | 100 |

TABLE 30

|  | Example 9-7 | Example 9-8 | Example 9-9 | Example 9-10 | Example 9-11 |
|---|---|---|---|---|---|
| Cord structure (dtex/cord) | 1100/2 | 940/2 | 2200/3 | 1670/3 | 1100/2 |
| The amount of carboxy group terminal | High | High | High | High | High |
| Presence or absence of Surface treatment of polyester filament | Present | Present | Present | Present | Present |
| Adhesive agent liquid composition | (2-1) | (2-1) | (2-1) | (2-1) | (2-1) |
| The number of twist (/10 cm) | 54 × 54 | 54 × 54 | 29 × 29 | 33 × 33 | 50 × 50 |
| Twisting coefficient Nt(—) | 0.42 | 0.50 | 0.50 | 0.50 | 0.50 |
| Cord angle of reinforcing cord layer(°) | 0 | 0 | 0 | 0 | 30 |

TABLE 30-continued

| | Example 9-7 | Example 9-8 | Example 9-9 | Example 9-10 | Example 9-11 |
|---|---|---|---|---|---|
| Riding comfort (index) | 100 | 100 | 99 | 100 | 100 |
| Run-flat durability (index) | 161 | 150 | 150 | 160 | 165 |
| Run-flat durability breaking pattern | no reinforcing cord layer separation | no reinforcing cord layer separation | no reinforcing cord layer separation | no reinforcing cord layer separation | no reinforcing cord layer separation |
| Side irregularity (index) | 100 | 100 | 106 | 100 | 100 |
| Cut performance (index) | 100 | 95 | 105 | 103 | 100 |

As shown in the above-mentioned Table, it was confirmed that, in a test tire of each of the Examples, the occurrence of delamination fracture of a reinforcing cord layer was inhibited without compromising other performances, thereby improving the run-flat durability performance.

DESCRIPTION OF SYMBOLS 1, 31 bead core
2, 32 carcass ply
3a, 3b, 33a, 33b belt
4, 5, 34, 35 belt reinforcing layer
6 insert
11, 41 bead portion
12, 42 side wall portion
13, 43 tread portion
21 rubber test piece
22 tire reinforcing polyester cord
23 pulley
10, 20, 30, 40, 50, 60 reinforcing cord layer
51, 61 bead portion
52, 62 side wall portion
53, 63 tread portion
54, 64 carcass
55, 65 side reinforcing rubber layer
56, 66 bead core
57, 67 bead filler
58, 68 belt
59A, 59B, 69A, 69B belt reinforcing layer
64a body portion of carcass
64b turn-up portion of carcass
101 unwinding apparatus
102 cord
103 adhesive agent liquid
104 drying zone
105 heat set zone
106 normalizing zone
107 winding apparatus

The invention claimed is:

1. A tire in which a rubber-cord complex composed of a polyester cord and a rubber is used as a reinforcing member, characterized in that
the polyester cord is formed by twisting polyester filaments, and then subjecting the twisted filaments to an adhesive agent treatment by using an adhesive agent composition, and that
the polyester filament is made of a polyester fiber which is composed of a polyester having ethylene terephthalate as a main repeating unit and having an intrinsic viscosity of 0.85 or higher, wherein
the amount of terminal carboxy group in the fiber is 20 equivalent/ton or larger, the long period according to small-angle X-ray diffraction is 9 to 12 nm, and a surface treatment agent having an epoxy group is attached to the surface of the fiber and wherein
the amount of terminal carboxy group on the surface of the polyester fiber is 10 equivalent/ton or smaller.

2. The tire according to claim 1, wherein the crystal size of the polyester fiber in the fiber lateral axis direction is 35 to 80 nm².

3. The tire according to claim 1, wherein the amount of terminal methyl group in the polyester fiber is 2 equivalent/ton or smaller.

4. The tire according to claim 1, wherein the titanium oxide content in the polyester fiber is 0.05 to 3.0% by mass.

5. The tire according to claim 1, wherein the epoxy index on the surface of the polyester fiber is $1.0 \times 10^{-3}$ equivalent/kg or lower.

6. The tire according to claim 1, wherein the adhesive agent composition contains (A) a thermoplastic high molecular weight polymer composed of an ethylene addition polymer containing a 2-oxazoline group or a (blocked) isocyanate group, or a urethane-based high molecular weight polymer containing a hydrazino group, (B) a water-soluble polymer composed of a copolymer containing a maleic anhydride unit and an isobutylene unit or derivatives thereof, (C) a reaction product of diphenylmethane diisocyanate and a thermally dissociating blocking agent for isocyanate groups, a condensate of resorcin and formaldehyde obtained by a novolac forming reaction, a condensate of chlorophenol, resorcin, and formaldehyde, a compound composed of an epoxycresol novolac resin, or an aqueous urethane compound obtained by reacting organic polyisocyanates having a structure in which aromatics are bonded by methylene, a compound having a plurality of active hydrogen atoms, and a thermally dissociating blocking agent for isocyanate groups, and (D) an aliphatic epoxide compound.

7. The tire according to claim 6, wherein the polyester cord is further subjected to an adhesive agent treatment by a resorcin-formaldehyde-latex adhesive agent composition.

8. The tire according to claim 6, wherein the adhesive agent composition further contains at least one selected from the group consisting of (E) a metal salt, (F) a metal oxide, and (G) a rubber latex.

9. The tire according to claim 6, comprising a carcass ply extending toroidally between a pair of left-and-right bead portions as a skeleton, at least one belt arranged on the crown portion of the carcass outside in the tire radial direction, at least one cap layer covering the whole width of the belt, and at least one pair of layered layers covering both end portions of the belt in the width direction, wherein the reinforcing member is used for one of or both of the cap layer and the layered layer.

10. The tire according to claim 6, comprising a carcass ply extending toroidally between a pair of left-and-right bead portions as a skeleton, wherein the carcass ply is composed of the reinforcing member.

11. The tire according to claim 10, wherein the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), ρ represents the density of the cord (g/cm³), D is the total decitex (dtex) of the cord) is from 0.40 to 0.60.

12. The tire according to claim 10, wherein the total fineness of the polyester cord is from 2000 dtex to 5100 dtex.

13. The tire according to claim 10, wherein the melting point of the polyester cord is 220° C. or higher.

14. The tire according to claim 6, comprising a pair of left-and-right bead portions, a pair of side wall portions each continuing from the bead portion to the outside in the tire radial direction, a tread portion bridging between the pair of side wall portions to form a contacting portion, and further comprising a carcass composed of one or more carcass plies extending toroidally between the pair of bead portions to reinforce each of these portions, and a side reinforcing rubber layer having a crescent shaped cross-section arranged inside the carcass at the side wall portion, wherein the carcass ply is composed of the reinforcing member.

15. The tire according to claim 14, wherein the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), ρ represents the density of the cord (g/cm³), D is the total decitex (dtex) of the cord) is from 0.40 to 0.55.

16. The tire according to claim 14, wherein the total fineness of the polyester cord is from 2000 dtex to 5100 dtex.

17. The tire according to claim 14, wherein the melting point of the polyester cord is 220° C. or higher.

18. The tire according to claim 6, comprising a pair of left-and-right bead portions, a pair of side wall portions each continuing from the bead portion to the outside in the tire radial direction, a tread portion bridging between the pair of side wall portions to form a contacting portion, and further comprising a carcass composed of one or more carcass plies extending toroidally between the pair of bead portions to reinforce each of these portions, at least one belt arranged on the crown portion of the carcass outside in the tire radial direction, and a side reinforcing rubber layer having a crescent shaped cross-section arranged inside the carcass at the side wall portion, wherein one or more reinforcing cord layers are arranged at least outside of the carcass in the tire width direction at the tire maximum width position, and the reinforcing cord layer is composed of the reinforcing member.

19. The tire according to claim 18, wherein the cord angle of the reinforcing cord layer is smaller than 10° with respect to the tire radial direction.

20. The tire according to claim 18, wherein the reinforcing cord layer extends at least from the end portion of the belt along the carcass to the outside of the bead core in the tire radial direction.

21. The tire according to claim 18, wherein the reinforcing cord layer extends from at least the end portion of the belt along the carcass to the outside of the bead core in the tire width direction.

22. The tire according to claim 18, wherein the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), ρ represents the density of the cord (g/cm³), D is the total decitex (dtex) of the cord) is from 0.20 to 0.55.

23. The tire according to claim 18, wherein the total fineness of the polyester cord is from 2000 dtex to 5100 dtex.

24. The tire according to claim 18, wherein the carcass ply is composed of a rubberized cord layer, the cord being composed of a polyethylene terephthalate or cellulose fiber.

25. The tire according to claim 1, wherein, for the adhesive agent composition, those containing resorcin, formaldehyde, rubber latex, an emulsion-polymerized blocked isocyanate compound, and ammonia, wherein the content of the emulsion-polymerized blocked isocyanate compound is 15 to 45% by mass are used.

26. The tire according to claim 25, wherein the ammonia is contained in the adhesive agent composition at a rate of 0.5 to 5.0 mol with respect to 1.0 mol of the resorcin.

27. The tire according to claim 25, wherein the rubber latex is a copolymer rubber latex of vinylpyridine, styrene and butadiene.

28. The tire according to claim 27, wherein the rubber latex is a copolymer rubber latex having a double structure composed of a two-stage polymerization of vinylpyridine, styrene and butadiene.

29. The tire according to claim 25, comprising a carcass ply extending toroidally between a pair of left-and-right bead portions as a skeleton, at least one belt arranged on the crown portion of the carcass outside in the tire radial direction, at least one cap layer covering the whole width of the belt, and at least one pair of layered layers covering both end portions of the belt in the width direction, wherein the reinforcing member is used for one of or both of the cap layer and the layered layer.

30. The tire according to claim 25, comprising a carcass ply extending toroidally between a pair of left-and-right bead portions as a skeleton, wherein the carcass ply is composed of the reinforcing member.

31. The tire according to claim 30, wherein the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), ρ represents the density of the cord (g/cm³), D is the total decitex (dtex) of the cord) is from 0.40 to 0.60.

32. The tire according to claim 30, wherein the total fineness of the polyester cord is from 2000 dtex to 5100 dtex.

33. The tire according to claim 30, wherein the melting point of the polyester cord is 220° C. or higher.

34. The tire according to claim 25, comprising a pair of left-and-right bead portions, a pair of side wall portions each continuing from the bead portion to the outside in the tire radial direction, a tread portion bridging between the pair of side wall portions to form a contacting portion, and further comprising a carcass composed of one or more carcass plies extending toroidally between the pair of bead portions to reinforce each of these portions, and a side reinforcing rubber layer having a crescent shaped cross-section arranged inside the carcass at the side wall portion, wherein the carcass ply is composed of the reinforcing member.

35. The tire according to claim 34, wherein the twisting coefficient Nt defined by the formula of the polyester cord below:

$$Nt = \tan\theta = 0.001 \times N \times (0.125 \times D/\rho)^{1/2} \qquad (1)$$

(wherein N represents the number of twist (/10 cm), ρ represents the density of the cord (g/cm$^3$), D is the total decitex (dtex) of the cord) is from 0.40 to 0.55.

36. The tire according to claim 34, wherein the total fineness of the polyester cord is from 2000 dtex to 5100 dtex.

37. The tire according to claim 34, wherein the melting point of the polyester cord is 220° C. or higher.

38. The tire according to claim 25, comprising a pair of left-and-right bead portions, a pair of side wall portions each continuing from the bead portion to the outside in the tire radial direction, a tread portion bridging between the pair of side wall portions to form a contacting portion, and further comprising a carcass composed of one or more carcass plies extending toroidally between the pair of bead portions to reinforce each of these portions, at least one belt arranged on the crown portion of the carcass outside in the tire radial direction, and a side reinforcing rubber layer having a crescent shaped cross-section arranged inside the carcass at the side wall portion, wherein one or more reinforcing cord layers are arranged at least outside of the carcass in the tire width direction at the tire maximum width position, and the reinforcing cord layer is composed of the reinforcing member.

39. The tire according to claim 38, wherein the cord angle of the reinforcing cord layer is smaller than 10° with respect to the tire radial direction.

40. The tire according to claim 38, wherein the reinforcing cord layer extends at least from the end portion of the belt along the carcass to the outside of the bead core in the tire radial direction.

41. The tire according to claim 38, wherein the reinforcing cord layer extends from at least the end portion of the belt along the carcass to the outside of the bead core in the tire width direction.

42. The tire according to claim 38, wherein the twisting coefficient Nt defined by the formula of the polyester cord below:

$$Nt = \tan\theta = 0.001 \times N \times (0.125 \times D/\rho)^{1/2} \tag{1}$$

(wherein N represents the number of twist (/10 cm), ρ represents the density of the cord (g/cm$^3$), D is the total decitex (dtex) of the cord) is from 0.20 to 0.55.

43. The tire according to claim 38, wherein the total fineness of the polyester cord is from 2000 dtex to 5100 dtex.

44. The tire according to claim 38, wherein the carcass ply is composed of a rubberized cord layer, the cord being composed of a polyethylene terephthalate or cellulose fiber.

* * * * *